United States Patent
Satoyoshi

(10) Patent No.: US 9,866,747 B2
(45) Date of Patent: Jan. 9, 2018

(54) OPTICAL DISPLACEMENT MEASUREMENT SYSTEM, IMAGING CONDITION OPTIMIZATION METHOD, AND IMAGING CONDITION OPTIMIZATION PROGRAM

(71) Applicant: Keyence Corporation, Osaka (JP)

(72) Inventor: Hiroyuki Satoyoshi, Osaka (JP)

(73) Assignee: Keyence Corporation, Osaka (JP)

( * ) Notice: Subject to any disclaimer, the term of this patent is extended or adjusted under 35 U.S.C. 154(b) by 155 days.

(21) Appl. No.: 15/046,465

(22) Filed: Feb. 18, 2016

(65) Prior Publication Data
US 2016/0261791 A1 Sep. 8, 2016

(30) Foreign Application Priority Data

Mar. 4, 2015 (JP) .................................. 2015-042172

(51) Int. Cl.
| | |
|---|---|
| *H04N 5/232* | (2006.01) |
| *H04N 5/225* | (2006.01) |
| *G01B 11/24* | (2006.01) |
| *H04N 5/235* | (2006.01) |
| *G01B 11/00* | (2006.01) |
| *G01B 11/25* | (2006.01) |

(52) U.S. Cl.
CPC ......... *H04N 5/23216* (2013.01); *G01B 11/00* (2013.01); *G01B 11/24* (2013.01); *G01B 11/25* (2013.01); *H04N 5/2256* (2013.01); *H04N 5/2353* (2013.01); *H04N 5/23222* (2013.01); *H04N 5/23293* (2013.01)

(58) Field of Classification Search
CPC ......... G01B 11/25; G01B 11/24; G01B 11/00; H04N 5/23216; H04N 5/23222; H04N 5/23293; H04N 5/2353; H04N 5/2256
See application file for complete search history.

(56) References Cited

U.S. PATENT DOCUMENTS

| | | |
|---|---|---|
| 7,489,410 B2 | 2/2009 | Nishio |
| 7,667,857 B2 | 2/2010 | Nishio |
| 7,751,065 B2 | 7/2010 | Nishio et al. |
| 2008/0094643 A1* | 4/2008 | Nishio ................ G01B 11/026 356/623 |

FOREIGN PATENT DOCUMENTS

JP 2013-170838 A 9/2013

* cited by examiner

*Primary Examiner* — Huy T Nguyen
(74) *Attorney, Agent, or Firm* — Kilyk & Bowersox, P.L.L.C.

(57) ABSTRACT

There are provided an optical displacement measurement system, an imaging condition optimization method, and an imaging condition optimization program which facilitate setting of an optimal imaging condition. States of a plurality of imaging parameters for setting an imaging condition are set by an imaging setting unit. When the set state of any of the plurality of imaging parameters is changed, a plurality of pieces captured image data according to respective imaging conditions are generated by a light receiving unit. Profile data indicating a profile shape is generated by a profile generation unit based on each piece of generated captured image data. Based on each piece of generated profile data or captured image data corresponding to the profile data, a degree of reliability of a profile shape indicated by the profile data is calculated by a reliability calculation unit.

14 Claims, 31 Drawing Sheets

OPTICAL DISPLACEMENT MEASUREMENT SYSTEM, IMAGING CONDITION OPTIMIZATION METHOD, AND IMAGING CONDITION OPTIMIZATION PROGRAM

CROSS-REFERENCE TO RELATED APPLICATIONS

The present application claims foreign priority based on Japanese Patent Application No. 2015-042172, filed Mar. 4, 2015, the contents of which is incorporated herein by reference.

BACKGROUND OF THE INVENTION

1. Field of the Invention

The present invention relates to an optical displacement measurement system, an imaging condition optimization method, and an imaging condition optimization program.

2. Description of Related Art

To measure the shape of a measurement target (hereinafter referred to as a workpiece), an optical displacement measurement system of a triangulation method is sometimes used. According to such an optical displacement measurement system, first, an image of a workpiece is captured. The profile shape (contour shape) of the workpiece is measured based on image data of the workpiece generated by the imaging (for example, see JP 2013-170838 A).

According to an optical displacement measurement system of an optical cutting method described in JP 2013-170838 A, imaging is performed by strip-shaped light having a linear cross section being radiated on the surface of a workpiece, and the reflected light being received by a two-dimensional photodetector. Image data is generated based on the amount of received light of each pixel obtained by the photodetector. Profile data indicating the profile shape of the workpiece is calculated based on the peak position of the received light amount distribution of the image data. The shape of the workpiece is measured by using the calculated profile data.

An imaging condition is set at the time of capturing an image of a workpiece. The imaging condition is set by setting the states of imaging parameters such as the light intensity, the exposure condition of the photodetector, the light sensitivity, a detection threshold, and the like. To acquire an accurate profile shape of a workpiece, a user has to set an optimal imaging condition.

However, there is a large number of imaging parameters, and also the state of each imaging parameter is varied, and thus, depending on the combination of the states of the imaging parameters, there exists an extremely large number of imaging conditions. Also, it is difficult for the user to intuitively grasp how the profile shape is changed by a change in the state of which imaging parameter.

Accordingly, it is difficult for the user to find the combination of the states of the imaging parameters for setting the optimal imaging condition. Also, the user cannot determine whether or not the set imaging condition is the optimal condition.

SUMMARY OF THE INVENTION

An object of the present invention is to provide an optical displacement measurement system, an imaging condition optimization method, and an imaging condition optimization program which facilitate setting of an optimal imaging condition.

(1) An optical displacement measurement system according to one embodiment of the invention is an optical displacement measurement system of an optical cutting method for measuring a profile shape of a measurement target by a triangulation method, the optical displacement measurement system including a light projection unit for radiating light on the measurement target along one direction, a light receiving unit for receiving reflected light from the measurement target and for generating captured image data indicating an image of the measurement target based on an amount of received light, an imaging setting unit configured to set states of a plurality of imaging parameters for setting an imaging condition, an imaging control unit for controlling the light projection unit and/or the light receiving unit to generate a plurality of pieces of captured image data corresponding respectively to a plurality of imaging conditions by changing a state of any of the plurality of imaging parameters set by the imaging setting unit, a profile generation unit for generating profile data indicating a profile shape based on each piece of generated captured image data, and a reliability calculation unit for calculating, based on each piece of generated profile data or captured image data corresponding to the profile data, a degree of reliability of a profile shape indicated by the profile data.

According to the optical displacement measurement system, states of a plurality of imaging parameters for setting an imaging condition are set. When the set state of any of the plurality of imaging parameters is changed, a plurality of pieces of captured image data according to respective imaging conditions are generated. Profile data indicating a profile shape is generated based on each piece of generated captured image data. Based on each piece of generated profile data or captured image data corresponding to the profile data, the degree of reliability of a profile shape indicated by the profile data is calculated.

According to this configuration, pieces of captured image data are generated under a plurality of imaging conditions according to combinations of a plurality of states of the imaging parameters. Also, the degree of reliability of a profile shape corresponding to each piece of captured image data is calculated. Therefore, a user can determine which imaging condition is the optimal condition based on the profile shapes based on pieces of generated profile data or the calculated degrees of reliability. An optimal imaging condition can thereby be easily set.

(2) The imaging setting unit may change a state of one or more imaging parameters selected as an imaging parameter to be changed, among the plurality of imaging parameters.

According to this configuration, pieces of captured image data are generated under a plurality of imaging conditions in which the states of one or more selected imaging parameters are changed. An optimal imaging condition can thereby be set in a short time.

(3) One or more imaging parameters to be changed, among the plurality of imaging parameters, may be set as recommendations in the imaging setting unit, and a plurality of states to be changed of the one or more imaging parameters to be changed that are set as recommendations may be set as recommendations in the imaging setting unit, and the optical displacement measurement system may further include a first operation unit to be operated by a user to change the one or more imaging parameters to be changed that are set as recommendations or the plurality of states to be changed that are set as recommendations.

In many cases, it is difficult for an unskilled user to determine the imaging parameter to be changed among a plurality of imaging parameters, and to determine a plurality of states, of an imaging parameter, to be changed. According to the configuration described above, even in such a case, the imaging parameter to be changed and a plurality of states to be changed are set as recommendations, and a user can easily set an appropriate imaging condition. Moreover, a skilled user can set an optimal imaging condition by operating the first operation unit and changing the recommendation setting.

(4) The first operation unit may be configured to be able to specify one or more imaging parameters, and the imaging setting unit may select one or more imaging parameters as the imaging parameter to be changed, based on specification by the user by operation of the first operation unit.

In this case, the user can select one or more imaging parameters to be changed, by operating the first operation unit. Accordingly, the user can determine an optimal imaging condition where the state of a desired imaging parameter is changed.

(5) The first operation unit may be configured to be able to specify a plurality of states of each of the selected imaging parameters, and the imaging setting unit may change the states of each of the selected imaging parameters to a plurality of states specified by operation of the first operation unit.

In this case, the user can specify, for each of one or more selected parameters, a plurality of states to be changed, by operating the first operation unit. Accordingly, the user can determine an optimal imaging condition where the state of a desired imaging parameter is changed to a plurality of desired states.

(6) The plurality of imaging parameters may include a first imaging parameter and a second imaging parameter that is dependent on the first imaging parameter, the first operation unit may be configured to be able to set a state of the first imaging parameter, and the imaging setting unit may change a state of the second imaging parameter within a range where the state of the first imaging parameter set by the first operation unit is maintained.

In this case, the state of the second imaging parameter that is dependent on the first imaging parameter is changed within a range where the state of the first imaging parameter can be maintained. Accordingly, an optimal imaging condition where states of other imaging parameters including the second imaging parameter are changed while maintaining the state of the set first imaging parameter can be determined.

(7) The imaging control unit may operate in synchronization with a periodic reference signal, the first imaging parameter may include a period of the reference signal, and the second imaging parameter may include an exposure time of the light receiving unit.

In this case, the state of the exposure time is changed within a range where the state of the period of the reference signal can be maintained. Accordingly, an optimal imaging condition where the states of other imaging parameters including the exposure time are changed while maintaining the set state of the period of the reference signal can be determined.

(8) The imaging setting unit may determine an imaging condition corresponding to a profile shape with a highest degree of reliability among a plurality of degrees of reliability calculated by the reliability calculation unit as an imaging condition for the light projection unit and the light receiving unit.

In this case, the imaging condition at the time of acquisition of the profile shape with the highest degree of reliability is determined as the imaging condition for the light projection unit and the light receiving unit. Accordingly, in the later measurement of a profile shape, a profile shape can be acquired under the imaging condition at the time of acquisition of the profile shape with the highest degree of reliability.

(9) The optical displacement measurement system may further include a first display unit for displaying, based on a plurality of pieces of profile data generated by the profile generation unit, a plurality of profile shapes according, respectively, to a plurality of imaging conditions, and a second operation unit to be operated by a user to specify any of the plurality of profile shapes displayed by the first display unit, and the imaging setting unit may determine an imaging condition corresponding to the profile shape specified by operation of the second operation unit as an imaging condition for the light projection unit and the light receiving unit.

In this case, the user can specify a profile shape according to the most preferable imaging condition by visually checking a plurality of profile shapes displayed by the first display unit and by operating the second operation unit. Accordingly, in the later measurement of a profile shape, a profile shape can be acquired under the most preferable imaging condition.

(10) The first display unit may display an indicator indicating the degree of reliability calculated by the reliability calculation unit, together with a corresponding profile shape.

In this case, the user can objectively determine the imaging condition which is objectively the most preferable by visually checking the profile shape and the indicator.

(11) The first display unit may display, in descending order or ascending order of degrees of reliability, a plurality of indicators indicating a plurality of degrees of reliability calculated by the reliability calculation unit and a plurality of profile shapes.

In this case, the profile shape with the highest degree of reliability can be easily visually checked. Accordingly, the user can easily determine the most preferable imaging condition while taking into account the degree of reliability.

(12) The imaging control unit may control the light projection unit and the light receiving unit so as to perform generation of captured image data according to a determined imaging condition a plurality of times, the profile generation unit may sequentially generate profile data based on the captured image data obtained by generation of a plurality of times by the light receiving unit, and the optical displacement measurement system may further include a second display unit for displaying, while sequentially updating, a profile shape based on a plurality of pieces of profile data sequentially generated by the profile generation unit.

In this case, profile shapes acquired under the determined imaging condition are sequentially displayed by the second display unit while being updated. Here, by slightly changing the position and the attitude of the measurement target, the user may check whether or not an appropriate profile shape can be acquired even when the position and the attitude of the measurement target change. By determining the states of a plurality of imaging parameters so that an appropriate profile shape can be obtained even when the position and the attitude of the measurement target change, a highly robust imaging condition can be set.

(13) An imaging condition optimization method according to another embodiment of the invention is an imaging condition optimization method of an optical displacement measurement system of an optical cutting method for measuring a profile shape of a measurement target by a triangulation method, the optical displacement measurement system including a light projection unit for radiating light on the measurement target along one direction and a light receiving unit for receiving reflected light from the measurement target and for generating captured image data indicating an image of the measurement target based on an amount of received light, the imaging condition optimization method including the steps of setting states of a plurality of imaging parameters for setting an imaging condition, controlling the light projection unit and/or the light receiving unit to generate a plurality of pieces of captured image data corresponding respectively to a plurality of imaging conditions by changing a set state of any of the plurality of imaging parameters, generating profile data indicating a profile shape based on each piece of generated captured image data, and calculating, based on each piece of generated profile data or captured image data corresponding to the profile data, a degree of reliability of a profile shape indicated by the profile data.

According to the imaging condition optimization method, states of a plurality of imaging parameters for setting an imaging condition are set. When the set state of any of the plurality of imaging parameters is changed, a plurality of pieces captured image data according to respective imaging conditions are generated. Profile data indicating a profile shape is generated based on each piece of generated captured image data. Based on each piece of generated profile data or captured image data corresponding to the profile data, the degree of reliability of a profile shape indicated by the profile data is calculated.

According to this method, pieces of captured image data are generated under a plurality of imaging conditions according to combinations of a plurality of states of the imaging parameters. Also, the degree of reliability of a profile shape corresponding to each piece of captured image data is calculated. Therefore, the user can determine which imaging condition is the optimal condition based on the profile shapes based on pieces of generated profile data or the calculated degrees of reliability. An optimal imaging condition can thereby be easily set.

(14) An imaging condition optimization program according to still another embodiment of the invention is an imaging condition optimization program for causing a processing device to optimize an imaging condition of an optical displacement measurement system of an optical cutting method for measuring a profile shape of a measurement target by a triangulation method, the optical displacement measurement system including a light projection unit for radiating light on the measurement target along one direction and a light receiving unit for receiving reflected light from the measurement target and for generating captured image data indicating an image of the measurement target based on an amount of received light, the imaging condition optimization program causing the processing device to execute the processes of setting states of a plurality of imaging parameters for setting an imaging condition, controlling the light projection unit and/or the light receiving unit to generate a plurality of pieces of captured image data corresponding respectively to a plurality of imaging conditions by changing a set state of any of the plurality of imaging parameters, generating profile data indicating a profile shape based on each piece of generated captured image data, and calculating, based on each piece of generated profile data or captured image data corresponding to the profile data, a degree of reliability of a profile shape indicated by the profile data.

According to the imaging condition optimization program, states of a plurality of imaging parameters for setting an imaging condition are set. When the set state of any of the plurality of imaging parameters is changed, a plurality of pieces captured image data according to respective imaging conditions are generated. Profile data indicating a profile shape is generated based on each piece of generated captured image data. Based on each piece of generated profile data or captured image data corresponding to the profile data, the degree of reliability of a profile shape indicated by the profile data is calculated.

According to this program, pieces of captured image data are generated under a plurality of imaging conditions according to combinations of a plurality of states of the imaging parameters. Also, the degree of reliability of a profile shape corresponding to each piece of captured image data is calculated. Therefore, the user can determine which imaging condition is the optimal condition based on the profile shapes based on pieces of generated profile data or the calculated degrees of reliability. An optimal imaging condition can thereby be easily set.

According to the present invention, an optimal imaging condition of an optical displacement measurement system can be easily set.

DETAILED DESCRIPTION OF PREFERRED EMBODIMENTS

Hereinafter, an optical displacement measurement system of an optical cutting method will be described as an optical displacement measurement system according to an embodiment of the present invention with reference to the drawings.

Figure 1:
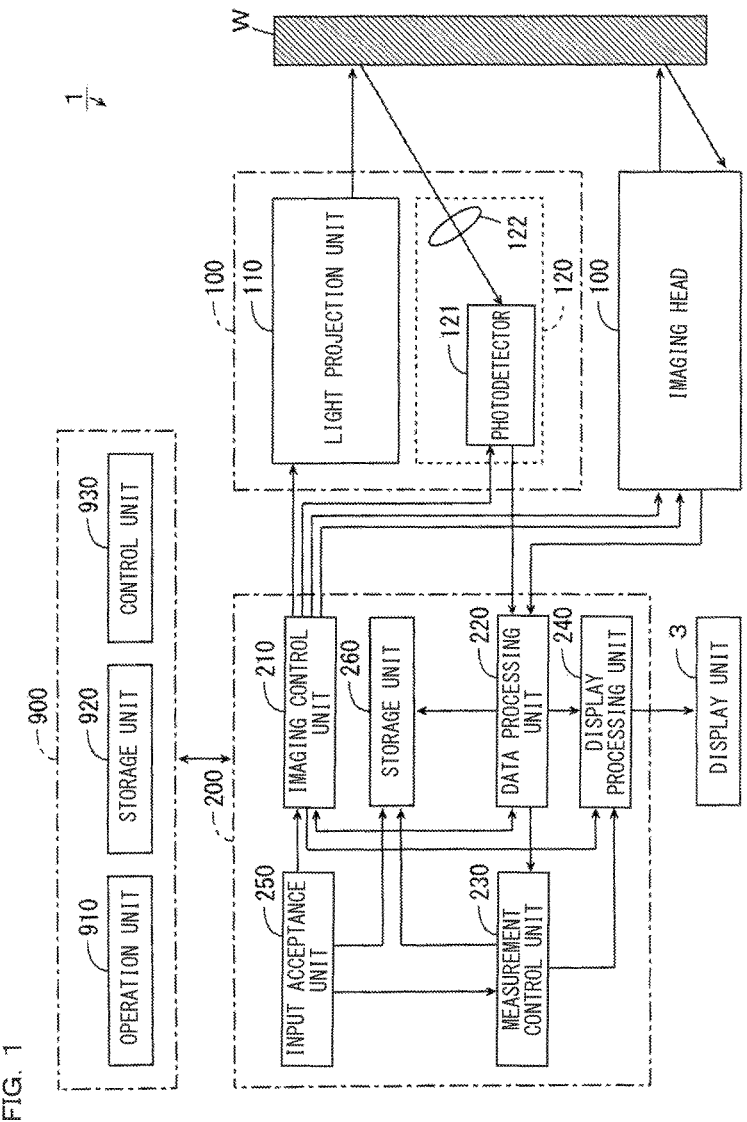
FIG. 1 is a block diagram showing a configuration of an optical displacement measurement system according to an embodiment of the present invention.
Figure 2:
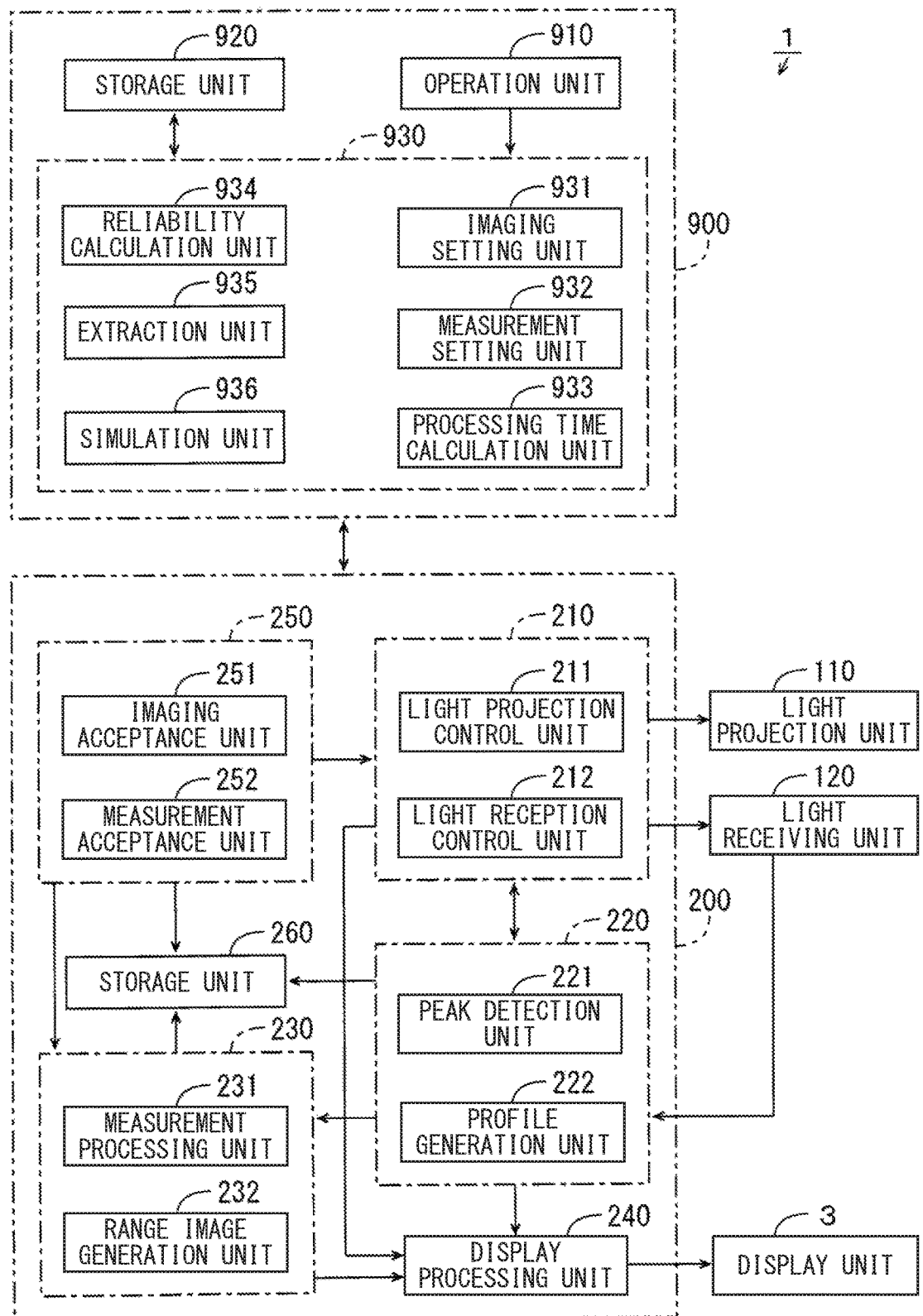
FIG. 2 is a block diagram showing a configuration of a processing device of the optical displacement measurement system in FIG. 1.

<1> Optical Displacement Measurement System (1) Configuration of Optical Displacement Measurement System FIG. 1 is a block diagram showing a configuration of an optical displacement measurement system according to an embodiment of the present invention. FIG. 2 is a block diagram showing a configuration of a processing device 200 of an optical displacement measurement system 1 in FIG. 1. As shown in FIG. 1, the optical displacement measurement system 1 includes a display unit 3, an imaging head 100, a processing device 200, and a PC (personal computer) 900. The display unit 3 is configured by a liquid crystal display panel or an organic EL (electroluminescent) panel, for example.

The imaging head 100 includes a light projection unit 110 and a light receiving unit 120, and is configured to be attachable/detachable with respect to the processing device 200. The imaging head 100 and the processing device 200 may be configured in an integrated manner. In this example, a plurality of imaging heads 100 may be connected to the processing device 200. In the example in FIG. 1, two imaging heads 100 are connected to the processing device 200.

The light projection unit 110 is configured to be able to irradiate a measurement target (hereinafter referred to as a workpiece) W with strip-shaped light extending in one direction. The light projection unit 110 may also be configured to be able to irradiate the workpiece W with light that is scanned in one direction, instead of strip-shaped light extending in one direction.

The light receiving unit 120 includes a photodetector 121 and a light receiving lens 122. Reflected light from the workpiece W enters the photodetector 121 through the light receiving lens 122. The photodetector 121 includes a CMOS (Complementary Metal Oxide Semiconductor) sensor, for example, and includes a plurality of pixels that are arranged two-dimensionally. The photodetector 121 generates, based on the amount of received light of each pixel, captured image data indicating a captured image of the workpiece W.

The processing device 200 includes an imaging control unit 210, a data processing unit 220, a measurement control unit 230, a display processing unit 240, an input acceptance unit 250, and a storage unit 260. Note that, at least some of the imaging control unit 210, the data processing unit 220, the measurement control unit 230, the display processing unit 240, and the input acceptance unit 250 may be provided inside the imaging head 100.

As shown in FIG. 2, the imaging control unit 210 includes a light projection control unit 211 and a light reception control unit 212. The light projection control unit 211 and the light reception control unit 212 operate in synchronization with a sampling signal. A sampling signal may be generated inside the processing device 200, or may be supplied to the imaging control unit 210 from outside the processing device 200.

The light projection control unit 211 controls light radiation timing of the light projection unit 110 based on a sampling signal. Also, the light projection control unit 211 controls the intensity and the like of light that is emitted by the light projection unit 110. The light reception control unit 212 controls light receiving timing of the light receiving unit 120 based on a sampling signal. Also, the light reception control unit 212 controls the exposure time and the light sensitivity of the light receiving unit 120, for example. In the following description, the sampling signal period will be referred to as the sampling period, and the sampling signal frequency will be referred to as the sampling frequency.

The data processing unit 220 includes a peak detection unit 221 and a profile generation unit 222. The peak detection unit 221 acquires captured image data generated by the light receiving unit 120, and detects a plurality of peak positions from the captured image data. Also, the captured image data acquired by the peak detection unit 221 can be output to an external device of the processing device 200 via an interface unit, not shown.

The profile generation unit 222 generates profile data indicating the profile shape of the workpiece W based on the plurality of peak positions detected by the peak detection unit 221. A profile number is assigned to the generated profile data as an identifier. As described above, the light projection unit 110 irradiates the workpiece W with strip-shaped light extending in one direction or light that is scanned in one direction, and the photodetector 121 of the light receiving unit 120 includes a plurality of pixels that are arranged two-dimensionally. Accordingly, the profile generation unit 222 can efficiently generate the profile data of the workpiece W.

The measurement control unit 230 includes a measurement processing unit 231 and a range image generation unit 232. The measurement processing unit 231 sets a measurement method for a measurement result based on a command signal from the PC 900, and also performs a measurement process on the profile data generated by the profile generation unit 222. The measurement process herein is a process of calculating a measurement result of a dimension (displacement) or the like of an arbitrary part of the surface of the workpiece W based on the profile data.

Also, an evaluation value, such as an allowance or a tolerance, for the measurement result can be registered in advance in the measurement processing unit 231. The measurement processing unit 231 determines whether or not the measurement result is satisfactory based on the evaluation value that is registered in advance.

The range image generation unit 232 generates range image data indicating a range image. A range image is an image showing, by color shade or pattern, the relationship between identifiers of a plurality of pieces of profile data generated by the profile generation unit 222 and a plurality of measurement results obtained by the measurement process.

The display processing unit 240 causes the display unit 3 to display various images such as a captured image based on captured image data, a profile shape based on profile data, and a range image based on range image data. Also, the display processing unit 240 causes the display unit 3 to display various measurement results measured by the measurement processing unit 231.

An imaging condition for the workpiece W can be set by determining the states of a plurality of imaging parameters to be described later. Also, a measurement method of the workpiece W can be set by determining the measurement portion of a profile shape, the specifics of measurement, and the like. In the following, setting of an imaging condition for the workpiece W will be referred to as imaging setting, and setting of a measurement method of a measurement result of the workpiece W will be referred to as measurement setting.

The input acceptance unit 250 includes an imaging acceptance unit 251 and a measurement acceptance unit 252. The imaging acceptance unit 251 receives, from the PC 900, a plurality of states of imaging parameters for the light projection unit 110 and the light receiving unit 120. Also, the imaging acceptance unit 251 supplies, to the imaging control unit 210, the plurality of states of imaging parameters which have been received. The imaging control unit 210 controls the light projection unit 110 and the light receiving unit 120 so as to generate captured image data under each imaging condition which has been set.

The measurement acceptance unit 252 receives, from the PC 900, a command signal indicating the specifics of a measurement method. Also, the measurement acceptance unit 252 supplies the received command signal to the measurement control unit 230. The measurement control unit 230 thereby performs measurement setting, and a measurement process that is based on the command signal supplied by the measurement acceptance unit 252.

A measurement result obtained by the measurement process, and the like are stored in the storage unit 260. Also, various pieces of information regarding the imaging condition supplied by the imaging acceptance unit 251 and the measurement method supplied by the measurement acceptance unit 252 are stored in the storage unit 260. Various pieces of information stored in the storage unit 260 are used in the processes described above that are performed by the data processing unit 220, the measurement control unit 230, and the like.

The PC 900 includes an operation unit 910, a storage unit 920, and a control unit 930. The operation unit 910 includes a keyboard and a pointing device, and may be operated by a user. As the pointing device, a mouse, a joystick, or the like is used. Also, a dedicated console may be used as the operation unit 910.

An imaging condition optimization program for performing an imaging condition optimization process described later, and a measurement simulation program for performing a measurement simulation process described later are stored in the storage unit 920. Also, various pieces of information regarding operation of the optical displacement measurement system 1 are stored in the storage unit 920.

The control unit 930 includes an imaging setting unit 931, a measurement setting unit 932, a processing time calculation unit 933, a reliability calculation unit 934, an extraction unit 935, and a simulation unit 936. Functions of the imaging setting unit 931, the processing time calculation unit 933, and the reliability calculation unit 934 are realized by the control unit 930 executing the imaging condition optimization program that is stored in the storage unit 920. Also, functions of the measurement setting unit 932, the extraction unit 935, and the simulation unit 936 are realized by the control unit 930 executing the measurement simulation program that is stored in the storage unit 920.

A user can perform imaging setting and measurement setting at the imaging setting unit 931 and the measurement setting unit 932, respectively, by operating the operation unit 910. The imaging setting unit 931 sets a plurality of imaging conditions based on a plurality of states of imaging parameters, and supplies the plurality of set imaging conditions to the imaging acceptance unit 251 of the processing device 200. The measurement setting unit 932 supplies a command signal indicating the specifics of a measurement method set in the measurement setting to the measurement acceptance unit 252 of the processing device 200.

The processing time calculation unit 933 calculates a processing time based on the set imaging condition. The processing time herein is the time from start of control of the imaging head 100 by the imaging control unit 210 based on a sampling signal, and decision of generation of one piece of captured image data, to generation of profile data from the captured image data.

The reliability calculation unit 934 calculates, based on profile data generated by the profile generation unit 222 or the corresponding captured image data, the level of reliability (the degree of reliability) of the profile shape. In this example, the degree of reliability is based on relative evaluation.

A user can select desired profile data based on a range image by operating the operation unit 910. The extraction unit 935 extracts the profile data selected by the user from the storage unit 920. The simulation unit 936 changes the measurement method for the profile data extracted by the extraction unit 935, and also performs simulation of the measurement process based on the measurement method after change.

The display processing unit 240 of the processing device 200 causes the display unit 3 to display the processing time calculated by the processing time calculation unit 933 and an indicator corresponding to the degree of reliability calculated by the reliability calculation unit 934. Also, the display processing unit 240 causes the display unit 3 to display a measurement result measured by the simulation unit 936.

In the embodiment described above, the processing device 200 and the PC 900 are separately provided, but this is not restrictive. The processing device 200 and the PC 900 may be provided in an integrated manner. Alternatively, some of the structural elements of the processing device 200 may be provided in the PC 900, or some of the structural elements of the PC 900 may be provided in the processing device 200. For example, the range image generation unit 232 of the processing device 200 may be provided in the PC 900, or the processing time calculation unit 933 of the PC 900 may be provided in the processing device 200.

(2) Summary of Operation

Figure 3:
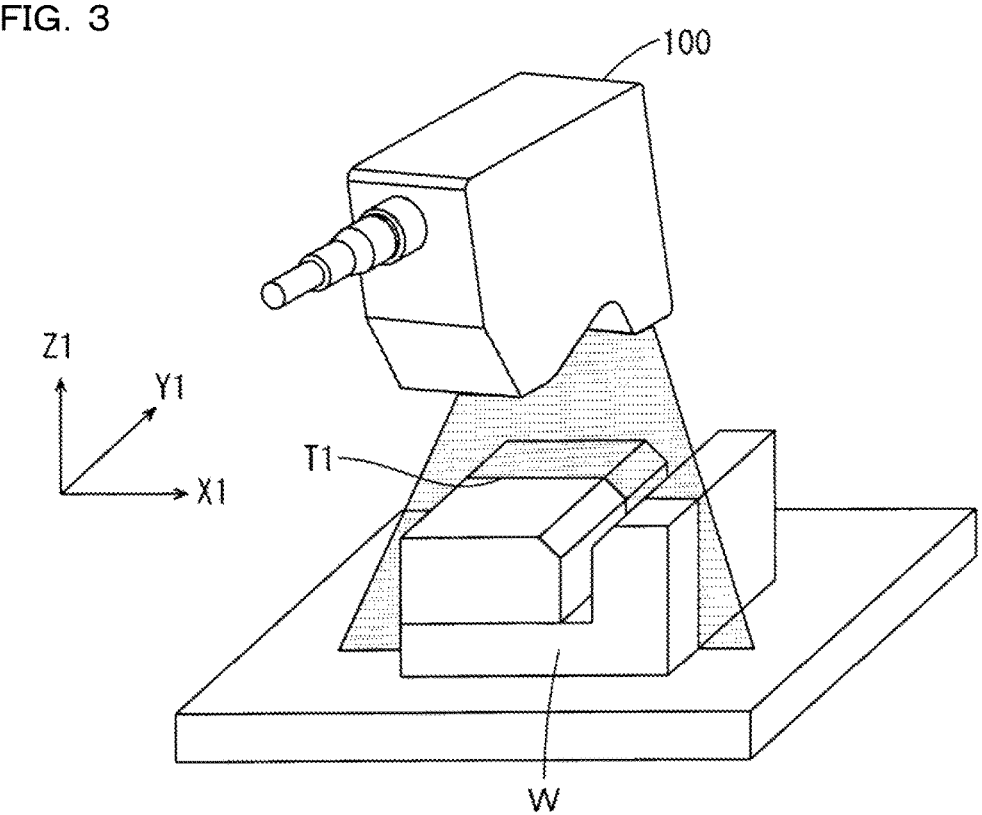
FIG. 3 is a perspective diagram of external appearances of an imaging head and a workpiece.
Figure 4:
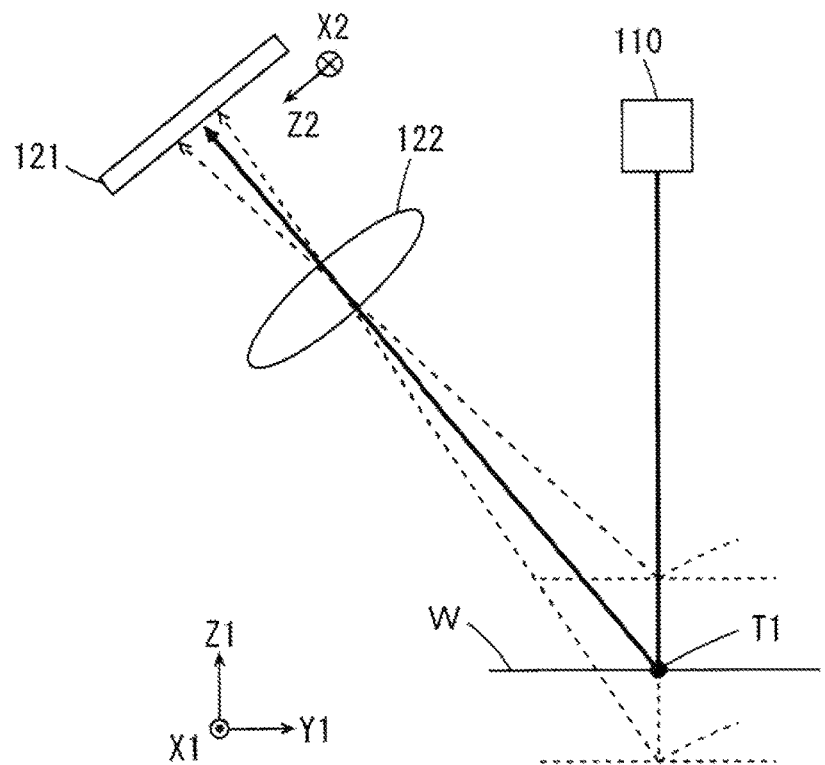
FIG. 4 is a diagram showing a relationship between a light irradiation position on a surface of a workpiece and a light incident position at a photodetector.
Figure 5:
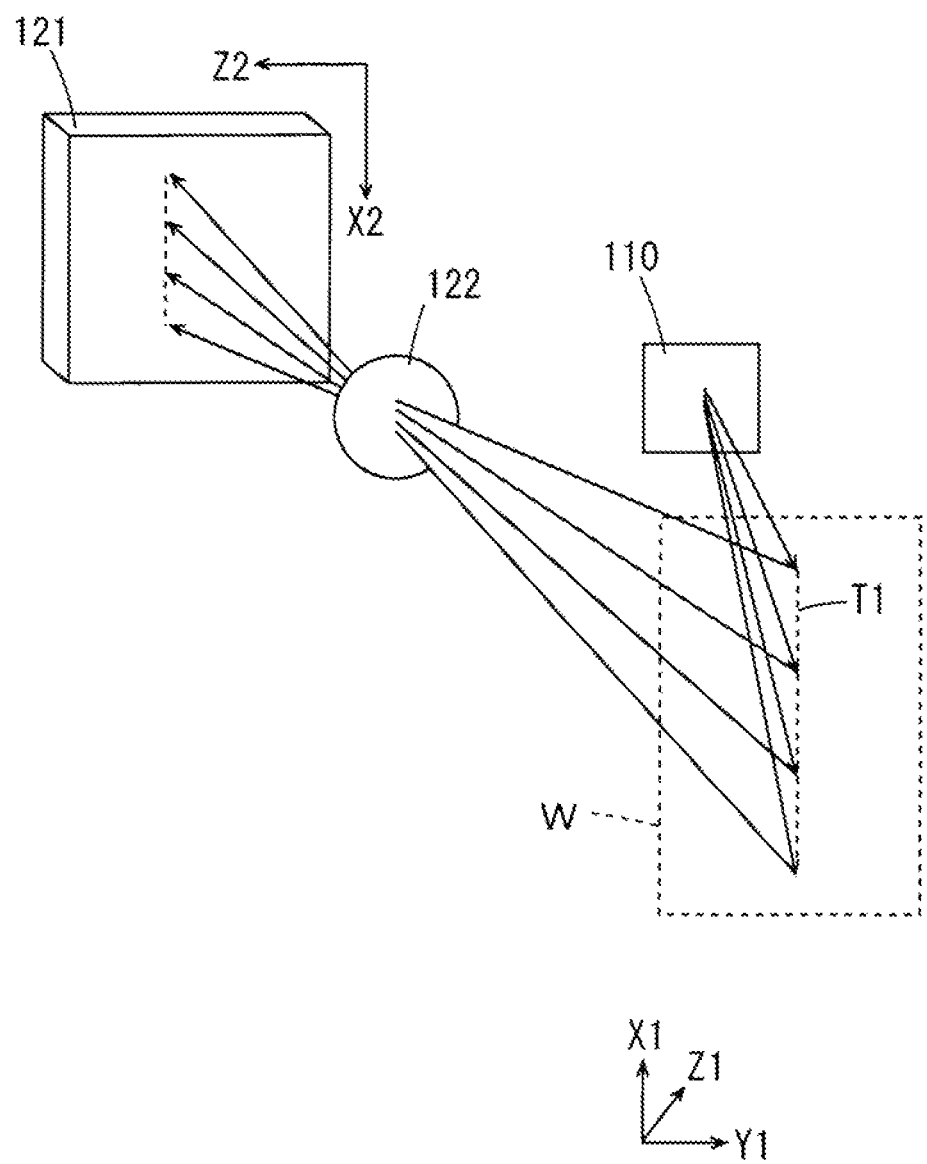
FIG. 5 is a diagram showing a relationship between a light irradiation position on a surface of a workpiece and a light incident position at the photodetector.

FIG. 3 is a perspective diagram of external appearances of the imaging head 100 and the workpiece W. FIGS. 4 and 5 are diagrams showing a relationship between a light irradiation position on the surface of the workpiece W and a light incident position at the photodetector 121. In FIGS. 3 to 5, two directions that are orthogonal to each other in the horizontal plane are defined as an X1 direction and a Y1 direction, and are shown by arrows X1 and Y1, respectively. Also, the perpendicular direction is defined as a Z1 direction, and is shown by an arrow Z1. Furthermore, in FIGS. 4 and 5, two directions that are orthogonal to each other on the light receiving surface of the photodetector 121 are defined as an X2 direction and a Z2 direction, and are shown by arrows X2 and Z2, respectively. The light receiving surface herein is a surface that is formed from a plurality of pixels of the photodetector 121.

The imaging head 100 irradiates the surface of the workpiece W with strip-shaped light along the X1 direction. A linear region, on the surface of the workpiece W, which is irradiated with the strip-shaped light is referred to as an irradiation region T1. As shown in FIG. 4, light that is reflected by the irradiation region T1 enters the photodetector 121 through the light receiving lens 122. In this case, if the reflection position of light at the irradiation region T1 is different in the Z1 direction, the incident position of reflected light to the photodetector 121 will be different in the Z2 direction.

Also, as shown in FIG. 5, if the reflection position of light at the irradiation region T1 is different in the X1 direction, the incident position of reflected light to the photodetector 121 will be different in the X2 direction. In this manner, the incident position of light on the photodetector 121 in the Z2 direction represents the position (height) of the irradiation region T1 in the Z1 direction, and the incident position of light on the photodetector 121 in the X2 direction represents the position in the X1 direction at the irradiation region T1.

Figure 6:
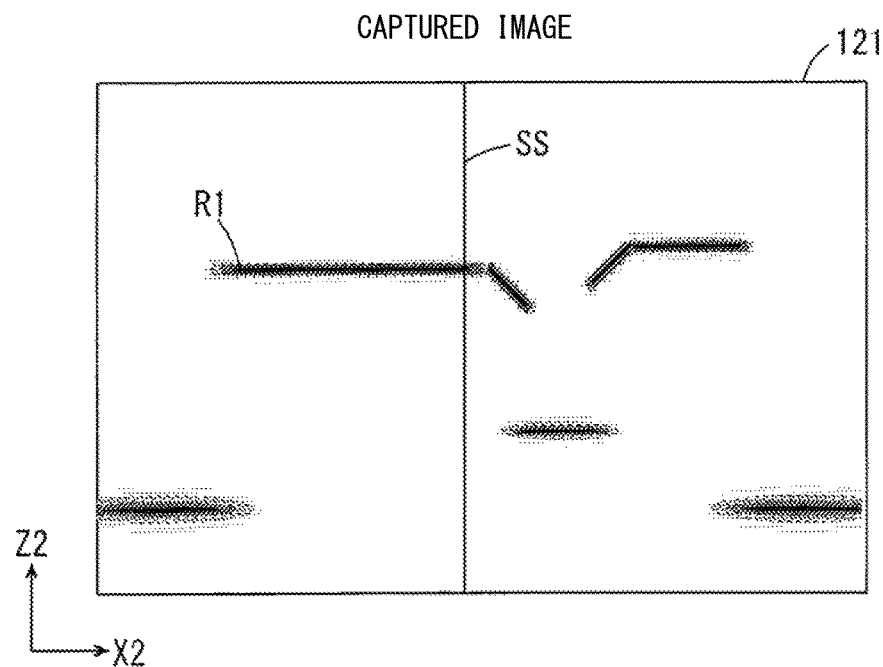
FIG. 6 is a diagram showing a received light amount distribution at a light receiving surface of the photodetector.

FIG. 6 is a diagram showing a received light amount distribution at the light receiving surface of the photodetector 121. Captured image data is generated based on the amount of received light of each pixel of the photodetector 121 in FIG. 6. A plurality of pixels of the photodetector 121 are two-dimensionally arranged along the X2 direction and the Z2 direction. Light that is reflected by the irradiation region T1 in FIG. 3 enters a light receiving region R1, which is shown in FIG. 6 by a dotted line. The amount of received light at the light receiving region R1 thereby becomes great. The received light amount distribution in FIG. 6 is output, as a digital received light signal, for each array SS of pixels (hereinafter referred to as a pixel array) along the Z2 direction. Captured image data for each pixel array SS is generated based on the output received light signal.

Figure 7:
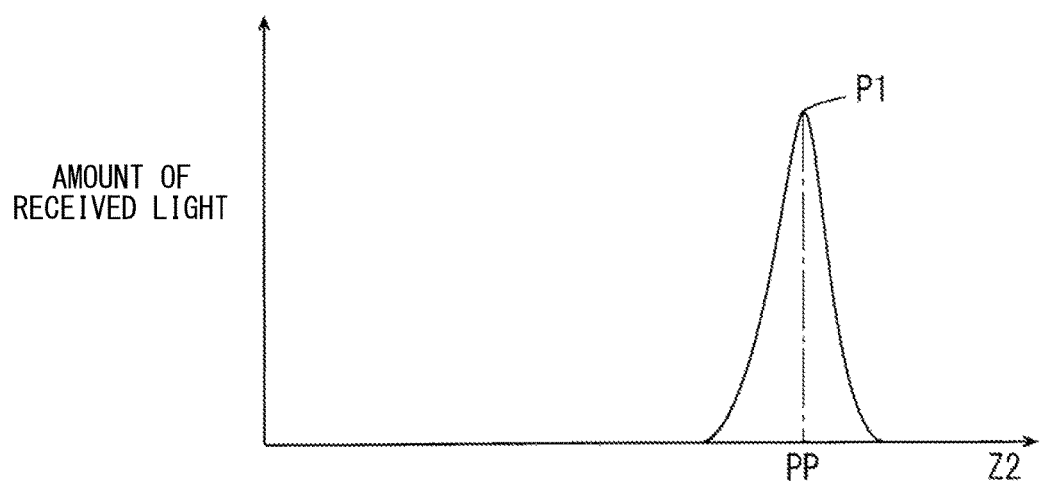
FIG. 7 is a diagram showing a received light amount distribution of one pixel array in FIG. 6.

FIG. 7 is a diagram showing a received light amount distribution of one pixel array SS in FIG. 6. In FIG. 7, the horizontal axis indicates a position in the Z2 direction, and the vertical axis indicates the amount of received light. As shown in FIG. 7, a peak (local maximum value) P1 corresponding to the light receiving region R1 in FIG. 6 appears in the received light amount distribution of one pixel array SS. A position PP of the peak P1 (hereinafter referred to as a peak position) indicates the height of the surface (reflection surface) of the workpiece W at the irradiation region T1.

One peak position PP is detected by the peak detection unit 221 in FIG. 2 for each of a plurality of received light amount distributions corresponding to a plurality of pixel arrays SS. Profile data indicating the profile shape (shape of the irradiation region T1) of the workpiece W is generated by the profile generation unit 222 in FIG. 2 based on the plurality of peak positions PP.

Figure 8:
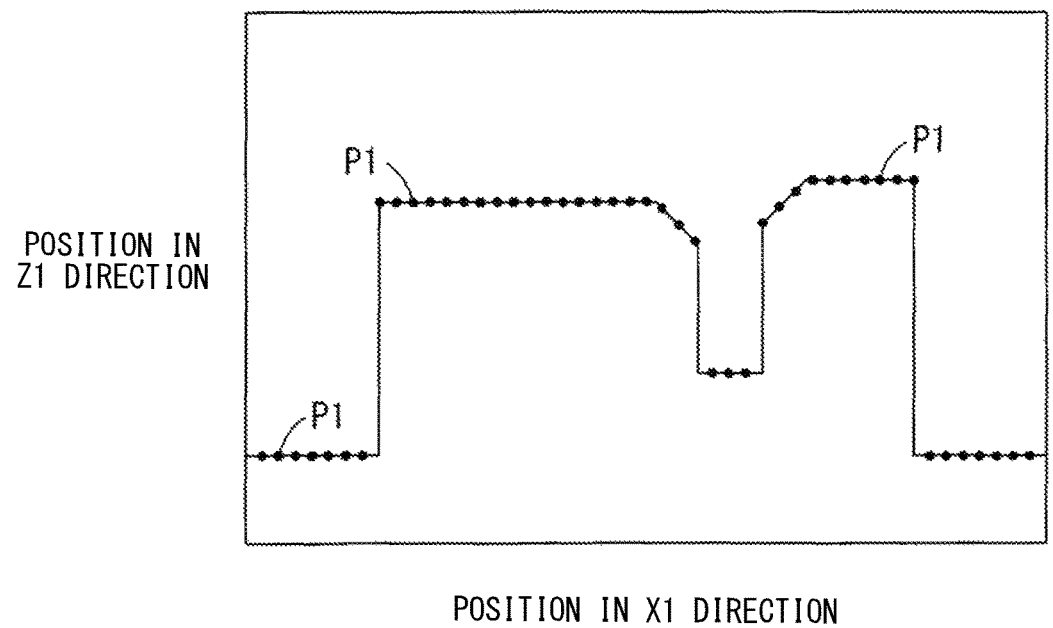
FIG. 8 is a diagram showing profile data.

FIG. 8 is a diagram showing the profile data. The horizontal axis in FIG. 8 indicates a position in the X1 direction (hereinafter referred to as an X-coordinate value), and the vertical axis in FIG. 8 indicates a position in the Z1 direction (hereinafter referred to as a Z-coordinate value). As shown by a solid line in FIG. 8, the profile data is formed from a plurality of peaks P1 and a plurality of pieces of data that are obtained by interpolating the plurality of peaks P1. Each piece of profile data shows a position in the X1 direction (X-coordinate value) and a position in the Z1 direction (Z-coordinate value). This profile data represents the profile shape of the workpiece W.

The profile data generated by the profile generation unit 222 is supplied to the display processing unit 240 in FIG. 2. Image data based on the profile data is generated by the display processing unit 240, and the generated image data is supplied to the display unit 3 in FIG. 2. The display unit 3 displays the profile shape based on the image data which has been supplied.

Figure 9:
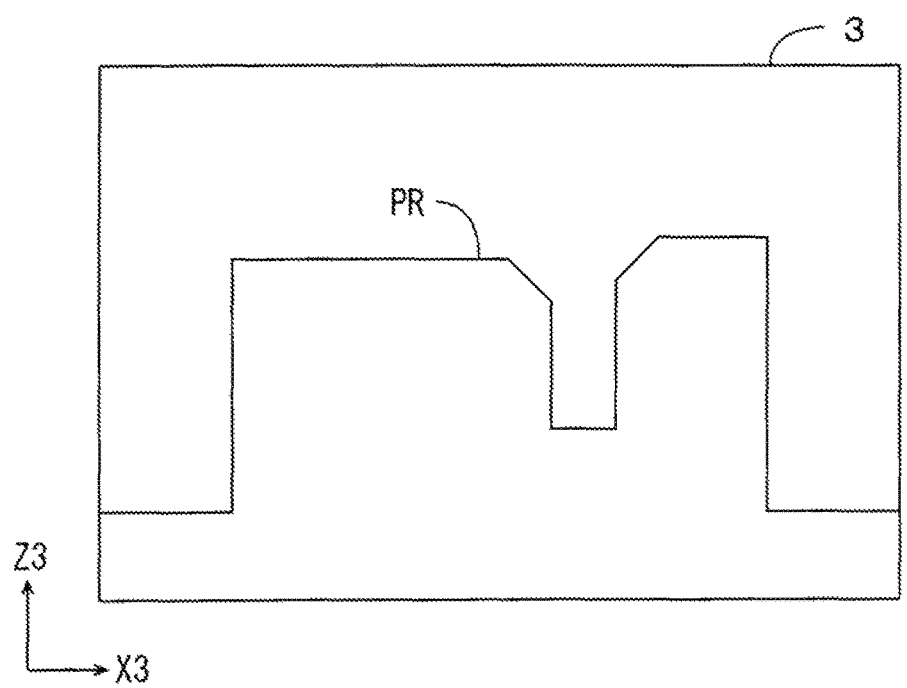
FIG. 9 is an example display, on a display unit, based on the profile data.

FIG. 9 is an example display, on the display unit 3, based on the profile data. In the example in FIG. 9, a profile shape PR of the workpiece W in FIG. 2 is shown substantially at the center of the display unit 3. An X3 direction and a Z3 direction corresponding respectively to the X1 direction and the Z1 direction described above are defined on the screen of the display unit 3. In this state, a user can perform measurement setting for the workpiece W on the screen of the display unit 3. Details will be given later.

Figure 10:
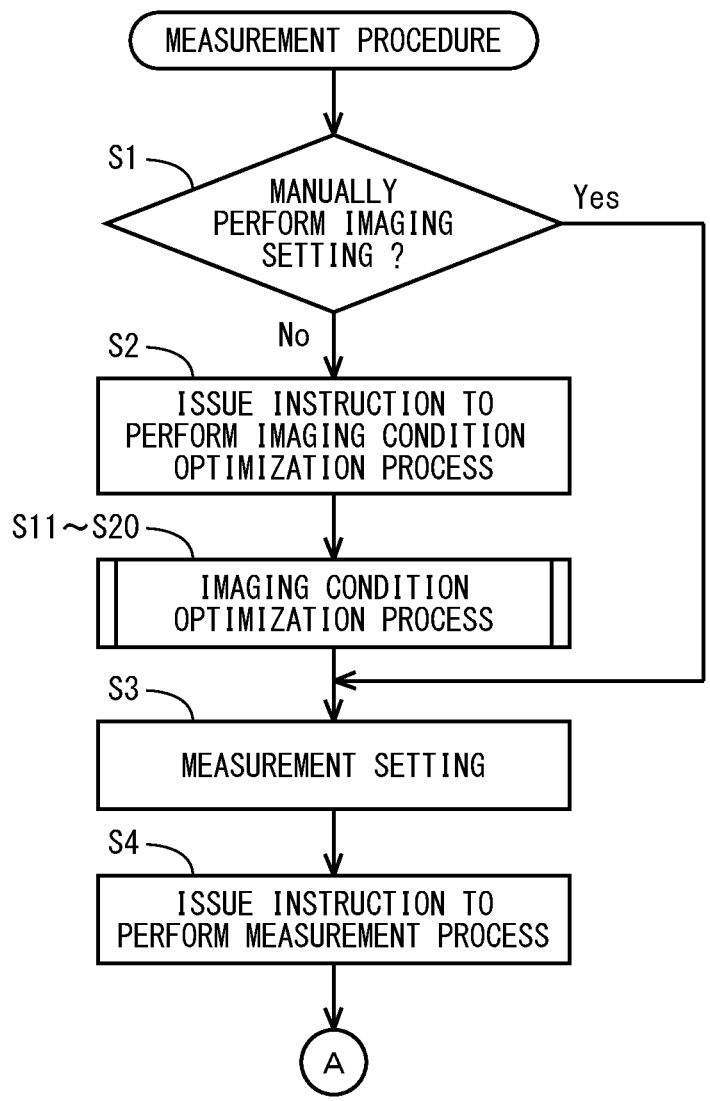
FIG. 10 is a flow chart showing a measurement procedure.
Figure 11:
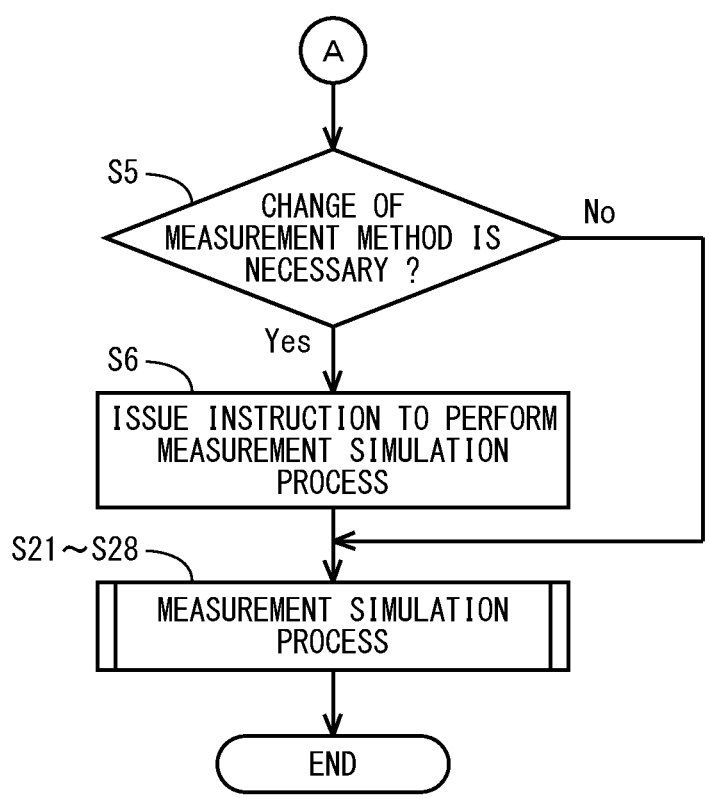
FIG. 11 is a flow chart showing the measurement procedure.

FIGS. 10 and 11 are flow charts showing a measurement procedure. In the following, a measurement procedure for the profile shape of a workpiece W will be described with reference to FIGS. 1, 2, 10 and 11.

First, a user determines whether or not to manually perform imaging setting (step S1). When it is determined in step S1 to manually perform imaging setting, the user proceeds to the process in step S3. When it is determined in step S1 not to manually perform imaging setting, the user instructs the PC 900 to perform an imaging condition optimization process described later. In this case, an imaging condition optimization process is performed by the PC 900 (steps S11 to S20 in FIGS. 17 and 18 described later). The imaging setting is thus performed.

After the imaging setting is performed, the user performs measurement setting (step S3). Next, the user instructs the processing device 200 to perform a measurement process (step S4). Accordingly, a measurement result of the profile shape of the workpiece W is acquired by the measurement processing unit 231 of the processing device 200 based on the measurement method which has been set.

Then, the user visually checks the acquired measurement result, and determines whether or not change of the measurement method is necessary (step S5). When it is determined in step S5 that change of the measurement method is not necessary, the user ends the measurement procedure.

When it is determined in step S5 that change of the measurement method is necessary, the user instructs the PC 900 to perform a measurement simulation process described later (step S6). In this case, a measurement simulation process is performed by the PC 900 (steps S21 to S28 in FIGS. 33 and 34 described later). The measurement method is thus changed, and simulation of the measurement process is performed based on the measurement method after change. Then, the user ends the measurement procedure.

<2> Imaging Setting

(1) Procedure of Imaging Setting

The optical displacement measurement system 1 is used to periodically and sequentially measure the dimensions (displacements) of common parts of a plurality of workpieces W of the same type which are conveyed by a belt conveyor at a constant speed, for example. In such an application, imaging setting has to be optimally performed according to the type of the workpiece in order to acquire an accurate profile shape of the workpiece.

In the following, the procedure of imaging setting will be described. Note that, in the case where a plurality of imaging heads 100 are connected to the processing device 200, common imaging setting can be collectively performed for the plurality of imaging heads 100, or imaging setting can be separately performed for the plurality of imaging heads 100.

Figure 12:
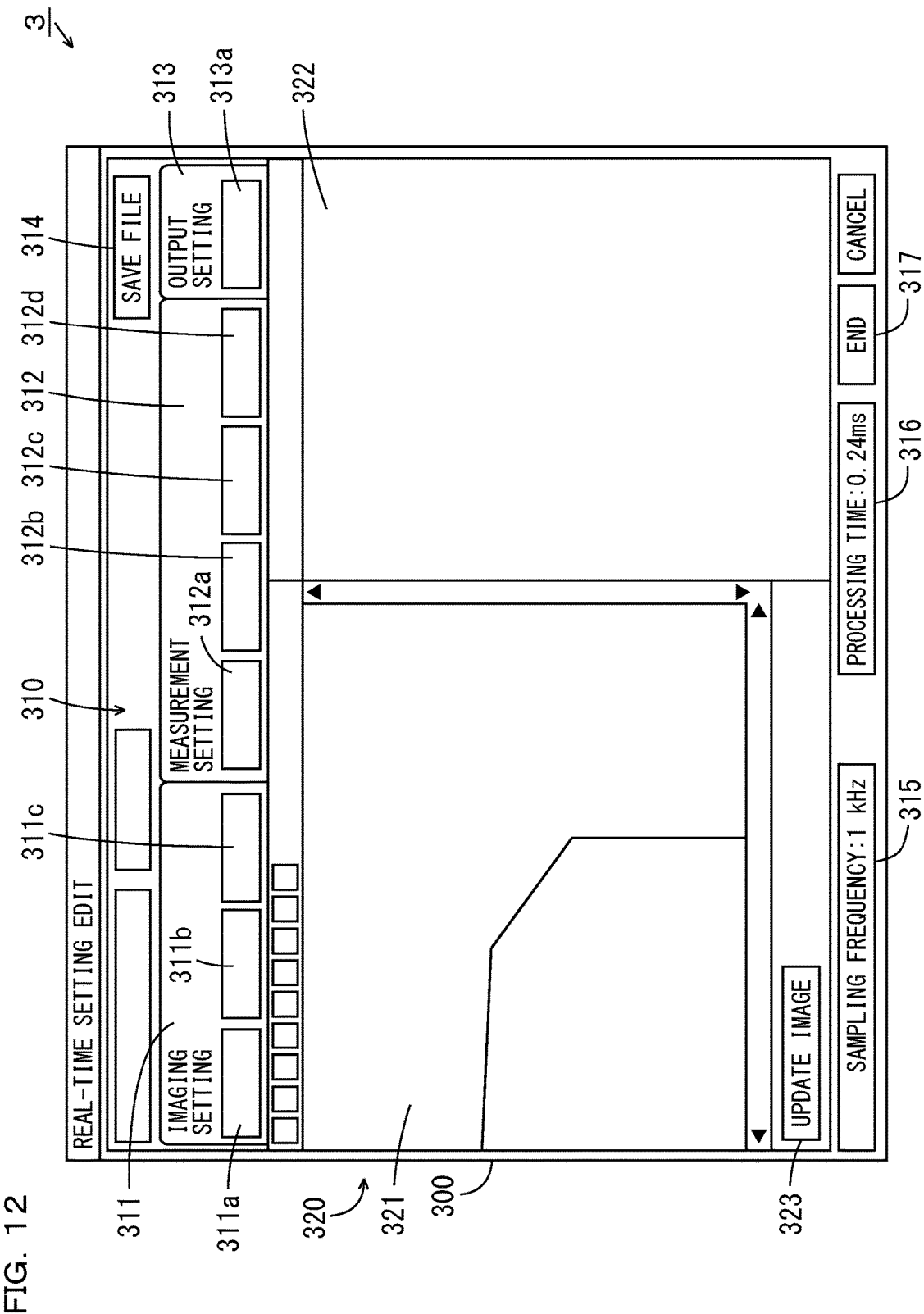
FIG. 12 is a diagram showing a settings edit screen displayed by the display unit.

FIG. 12 is a diagram showing a settings edit screen displayed by the display unit 3. A settings edit screen 300 is displayed by the display unit 3 at the time of both imaging setting and measurement setting. As shown in FIG. 12, a common display field 310 and an individual display field 320 are displayed in the settings edit screen 300. In this example, the common display field 310 is divided and displayed at the upper part and the lower part of the settings edit screen 300. The present invention is not limited thereto, and the common display field 310 may be displayed at the upper part, the lower part or the like of the settings edit screen 300 without being divided.

An image display field 321, a setting input field 322, and an image update button 323 are displayed in the individual display field 320. The image display field 321 and the setting input field 322 are arranged horizontally next to each other substantially at the center of the settings edit screen 300. A captured image, a profile shape or the like is displayed in the individual display field 320.

When the image update button 323 is operated, captured image data is newly generated under the current imaging condition. A captured image displayed in the image display field 321 is updated based on the generated captured image data. Various input fields are displayed in the setting input field 322 based on operation of the common display field 310.

In the common display field 310 at the upper part of the settings edit screen 300, an imaging setting field 311, a measurement setting field 312, an output setting field 313, a file save button 314, and the like are displayed. In the common display field 310 at the lower part of the settings edit screen 300, a sampling frequency display field 315, a processing time display field 316, an end button 317, and the like are displayed.

A trigger setting button 311a, an imaging setting button 311b, and a profile button 311c are displayed in the imaging setting field 311. The imaging setting field 311 is mainly operated at the time of imaging setting. Note that, the profile button 311c may be operated in measurement setting in addition to imaging setting.

When the trigger setting button 311a is operated, an input field for the sampling frequency is displayed in the setting input field 322 as an imaging parameter. In this example, in the case where the sampling frequency is not set, the input field is displayed in the setting input field 322 when the settings edit screen 300 is displayed by the display unit 3, even if the trigger setting button 311a is not operated.

The sampling frequency is decided according to the period of measurement of a plurality of workpieces W. A user can set the decided sampling frequency in the imaging setting unit 931 in FIG. 2 by performing a predetermined operation in the setting input field 322. The set sampling frequency is displayed in the sampling frequency display field 315.

When the imaging setting button 311b is operated after the sampling frequency is set, input fields for a plurality of imaging parameters (hereinafter referred to as parameter input fields) are displayed in the setting input field 322. In this example, a parameter input field includes a simple parameter input field for inputting an imaging parameter by a simple operation, and a parameter detail input field for inputting an imaging parameter in a detailed manner.

The user can set a plurality of imaging parameters in the imaging setting unit 931 by performing predetermined operations in the setting input field 322. Processing time is calculated by the processing time calculation unit 933 in FIG. 2 based on the plurality of set imaging parameters. The calculated processing time is displayed in the processing time display field 316. Details of the imaging parameter will be given later.

When the profile button 311c is operated, an input field for performing various settings on generated profile data is displayed in the setting input field 322. The user can set various processes, such as a smoothing process and a filtering process, on the profile data by performing a predetermined operation in the setting input field 322. When the end button 317 is operated, imaging setting is ended. Details of the measurement setting field 312, the output setting field 313, and the file save button 314 will be given later.

(2) Imaging Parameter

Figure 13:
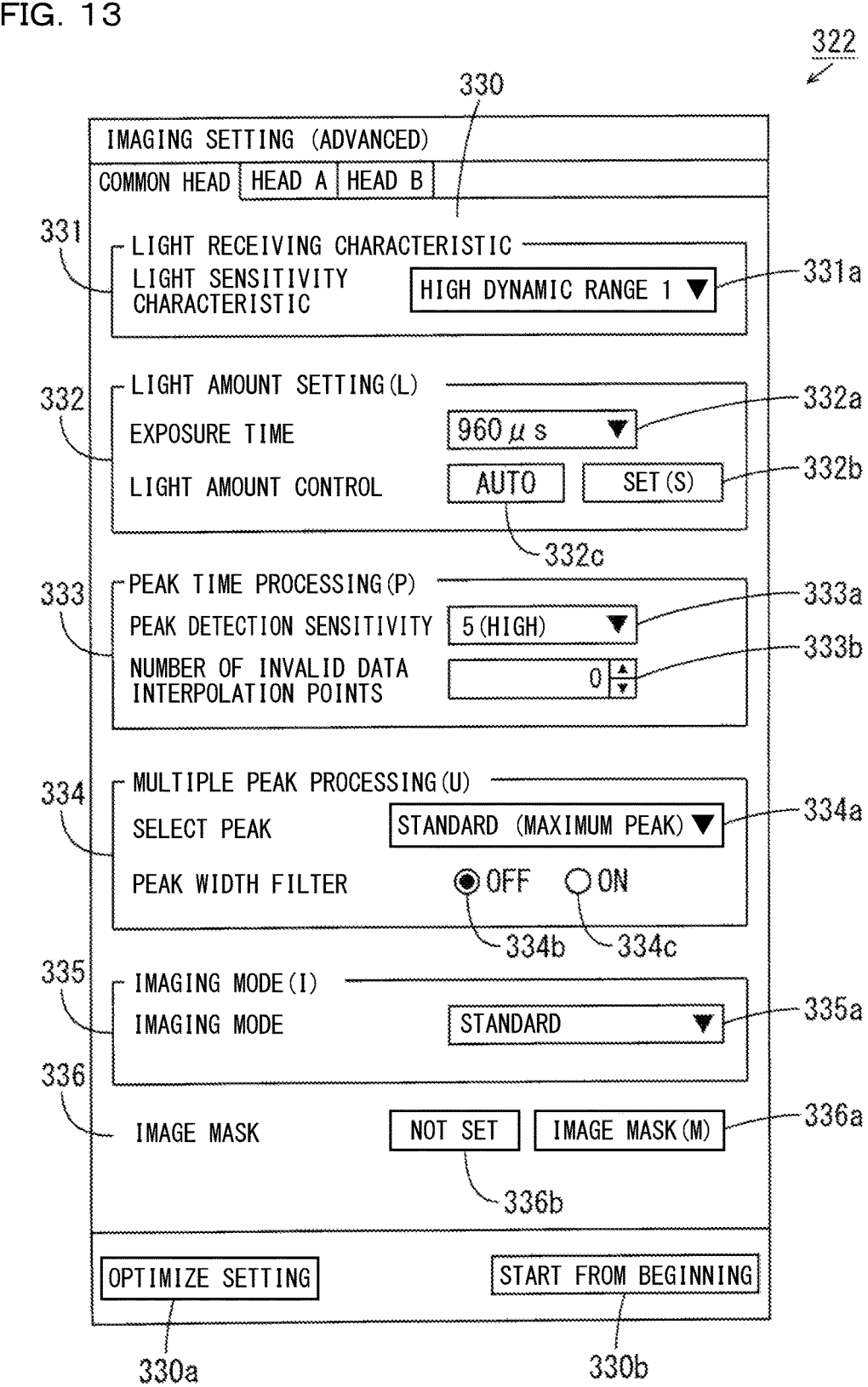
FIG. 13 is a diagram showing an example of a parameter detail input field.
Figure 14:
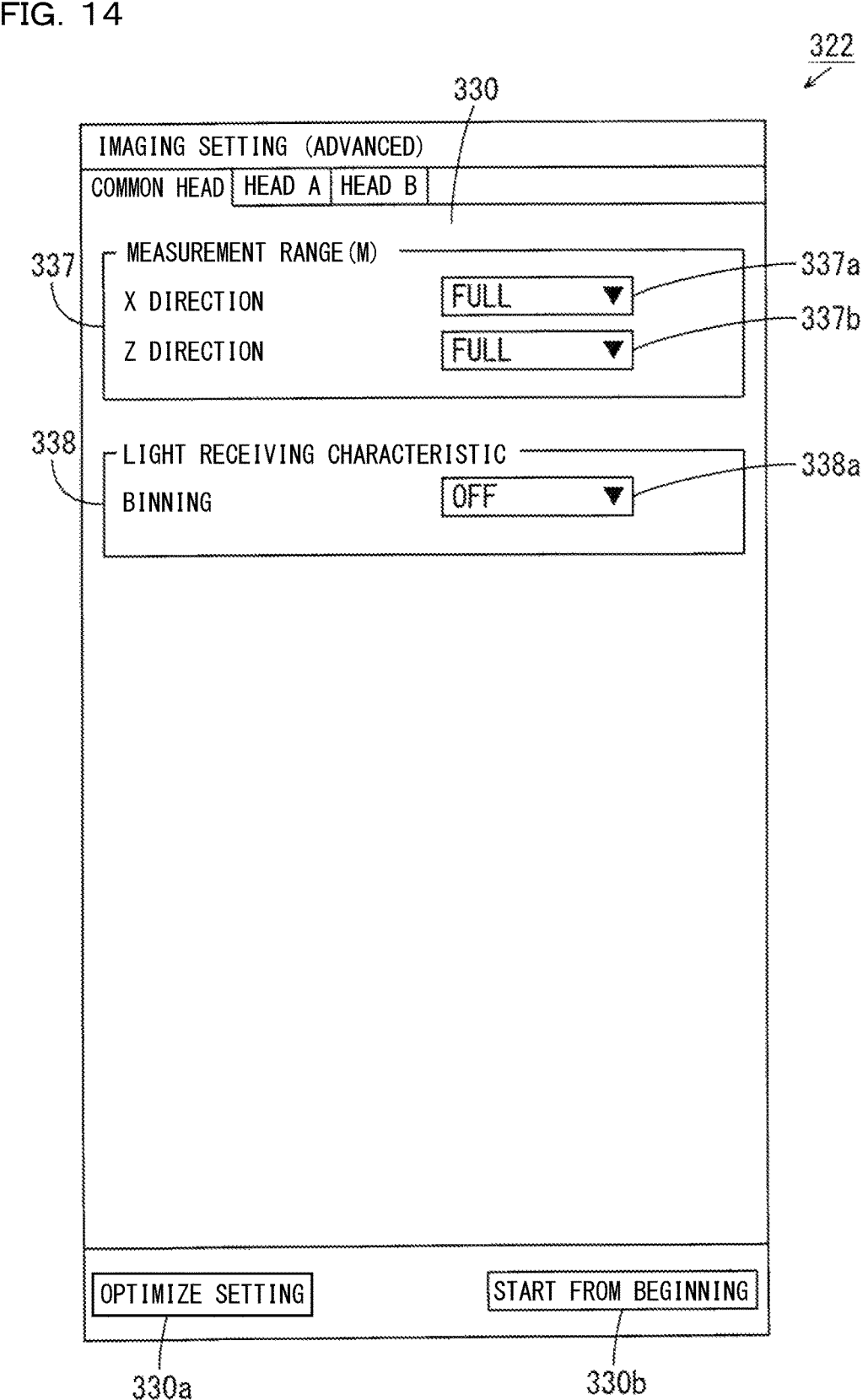
FIG. 14 is a diagram showing another example of the parameter detail input field.

In this example, when the imaging setting button 311b in FIG. 12 is operated, a simple parameter input field, not shown, is displayed in the setting input field 322. When a predetermined operation is performed in the simple parameter input field, the parameter detail input field is displayed in the setting input field 322, instead of the simple parameter input field. FIG. 13 is a diagram showing an example of the parameter detail input field. FIG. 14 is a diagram showing another example of the parameter detail input field.

As shown in FIG. 13, a light receiving characteristic field 331, a light amount setting field 332, a peak time processing field 333, a multiple peak processing field 334, an imaging mode field 335, and an image mask field 336 are displayed in a parameter detail input field 330 according to an example. Also, a setting optimization button 330a and a redo button 330b are displayed in the parameter detail input field 330.

When the redo button 330b is operated, the simple parameter input field, not shown, is displayed in the setting input field 322, instead of the parameter detail input field 330. The setting optimization button 330a is also displayed in the simple parameter input field. When the setting optimization button 330a is operated, a custom search screen 500 in FIG. 15 described later is displayed by the display unit 3. Details will be given later.

A light sensitivity characteristic pull-down menu 331a is displayed in the light receiving characteristic field 331. A user can select the light sensitivity of the photodetector 121 in FIG. 1 from the light sensitivity characteristic pull-down menu 331a. The light sensitivity characteristic herein indicates the transfer characteristic of the amount of received light of each pixel of the photodetector 121 and the pixel value of each pixel of captured image data. By changing the light sensitivity characteristic, it becomes possible to measure a workpiece W whose reflectivity is different depending on the measurement portion, for example. The light sensitivity includes "high accuracy", "high dynamic range 1", "high dynamic range 2", and "high dynamic range 3", for example.

An exposure time pull-down menu 332a, a light amount setting button 332b, and a light amount control field 332c are displayed in the light amount setting field 332. A user can select the exposure time of the photodetector 121 in FIG. 1 from the exposure time pull-down menu 332a. The exposure time includes 15 μs, 30 μs, 60 μs, 120 μs, 240 μs, 480 μs, 960 μs, 1920 μs, 5 ms, and 10 ms, for example.

Also, a user can set the intensity of light to be emitted by the light projection unit 110 arbitrarily or to an automatic mode, by operating the light amount setting button 332b. The set intensity of light is displayed in the light amount control field 332c. In the example in FIG. 13, the automatic mode is set for the intensity of light. In the automatic mode, the intensity of light is controlled in such a way that the amount of light on the entire photodetector 121 becomes constant.

A peak detection sensitivity pull-down menu 333a and an invalid data interpolation point number input field 333b are displayed in the peak time processing field 333. A user can select, from the peak detection sensitivity pull-down menu 333a, the sensitivity at the time of detection of a peak position from captured image data by the peak detection unit 221 in FIG. 2. The peak detection sensitivity includes five stages, "1", "2", "3", "4", and "5" in the order from the lowest.

The peak detection unit 221 detects, as a peak position, the position of a peak higher than the amount of received light corresponding to the set sensitivity. Accordingly, in the case where the amount of received light of all the pixels in an arbitrary pixel array SS (FIG. 6) is at or below the amount of received light corresponding to the set sensitivity, the part of the profile data corresponding to the pixel array SS is invalid. A user can input, in the invalid data interpolation point number input field 333b, the upper limit of the number of interpolations for the invalid data of the profile data. When the number of continuous invalid parts is at or below the number that is input in the invalid data interpolation point number input field 333b, the profile generation unit 222 in FIG. 2 interpolates the invalid parts and generates profile data.

A peak selection pull-down menu 334a and peak width filter check boxes 334b and 334c are displayed in the multiple peak processing field 334. An arbitrary pixel array SS (FIG. 6) may include a plurality of peak positions. A user can select a method for selecting one true peak position from the plurality of peak positions from the peak selection pull-down menu 334a. The method for selecting a peak position includes "standard (maximum peak)", "NEAR", "FAR", "remove X multiple reflection", "remove Y multiple reflection", and "invalid data".

According to "standard (maximum peak), a peak position with the largest amount of received light is selected as the true peak position. According to "NEAR", a peak position appearing at the top in the Z2 direction in FIG. 6 (at the right end in the Z2 direction in FIG. 7) is selected as the true peak position. According to "FAR", a peak position appearing at the bottom in the Z2 direction in FIG. 6 (at the left end in the Z2 direction in FIG. 7) is selected as the true peak position.

According to "remove X multiple reflection", a plurality of light beams are used, and light that is reflected directly by the workpiece W and light that is multi-reflected in the X1 direction in FIG. 3 are identified. The plurality of light beams may be emitted by the light projection unit 110 in FIG. 1, or may be emitted by another light source, not shown, different from the light projection unit 110. A peak position corresponding to the multi-reflected light is removed, and a peak corresponding to the directly reflected light is selected as the true peak position.

According to "remove Y multiple reflection", the same process as "remove X multiple reflection" is performed except that a peak position corresponding to multi-reflected light in the Y1 direction in FIG. 3, and not in the X1 direction, is removed. According to "invalid data", a true peak position is not selected. Accordingly, the part of the profile data corresponding to the pixel array SS is made invalid.

A user can switch between on and off of a peak width filter by specifying one of the peak width filter check boxes 334b and 334c. In the case where the peak width filter is set to be on, if the width of a received light amount distribution at the peak position PP in FIG. 7 (hereinafter referred to as a peak width) is greater than a predetermined cut-off value, the peak positions are removed from candidates for the true peak position. Accordingly, a method for selecting the true peak position is performed on the remaining peak position candidates. In this example, the cut-off value for the peak width takes a fixed value, but this is not restrictive. The cut-off value may be set by a user.

An imaging mode pull-down menu 335a is displayed in the imaging mode field 335. A user can select the imaging mode of the light receiving unit 120 in FIG. 1 from the imaging mode pull-down menu 335a. The imaging mode includes "standard", "multiple illumination (synthesize): 3×", "multiple illumination (synthesize): 5×", "multiple illumination (optimize light amount): 2×", and "multiple illumination (optimize light amount): 4×", for example.

According to "standard", light is emitted once by the light projection unit 110 in FIG. 1 and light is received once by the light receiving unit 120 in FIG. 1 for generation of one piece of captured image data. That is, imaging is performed once to generate one piece of captured image data.

According to "multiple illumination (synthesize): 3×", imaging is performed three times while changing the intensity of light. Then, pieces of captured image data obtained by the imaging performed three times are synthesized to generate captured image data showing a captured image with few overexposed and underexposed areas. According to "multiple illumination (synthesize): 5×", the same process as "multiple illumination (synthesize): 3×" is performed except that the number of times of imaging is five instead of three.

According to "multiple illumination (optimize light amount): 2×", imaging is performed two times while the light projection unit 110 and the light receiving unit 120 in FIG. 1 are controlled in such a way that the overall amount of light becomes constant. Then, captured image data by the last imaging when control is expected to be most stable is selected as the true captured image data. According to "multiple illumination (optimize light amount): 4×", the same process as "multiple illumination (optimize light amount): 2×" is performed except that the number of times of imaging is four instead of two.

An image mask button 336a and an image mask display field 336b are displayed in the image mask field 336. A mask to be set in a captured image is referred to as an image mask. A user can select whether or not to set an image mask in a captured image, by operating the image mask button 336a. In the case of setting an image mask, the user can further set the shape and the arrangement position of the image mask.

The peak position corresponding to the part of a captured image where the image mask is set is removed from candidates for the true peak position at the time of generation of profile data. Accordingly, a method for selecting the true peak position is performed on the remaining peak position candidates. Setting/non-setting of an image mask is displayed in the image mask display field 336b. In the example in FIG. 13, an image mask is not set.

As shown in FIG. 14, in the parameter detail input field 330 according to another example, a measurement range field 337 and a light receiving characteristic field 338 are displayed instead of the light receiving characteristic field 331, the light amount setting field 332, the peak time processing field 333, the multiple peak processing field 334, the imaging mode field 335, and the image mask field 336 in FIG. 13.

An X-direction pull-down menu 337a and a Z-direction pull-down menu 337b are displayed in the measurement range field 337. The X direction and the Z direction in the measurement range field 337 refer to the X2 direction and the Z2 direction in FIG. 6, respectively. A user can select the generation range of captured image data in the X2 direction and the Z2 direction from the X-direction pull-down menu 337a and the Z-direction pull-down menu 337b, respectively. The generation range of captured image data includes "FULL", "MIDDLE", and "SMALL", for example.

According to "FULL", captured image data corresponding to the entire light receiving surface of the photodetector 121 in FIG. 6 is generated. According to "MIDDLE" and "SMALL", captured image data corresponding to a part of the light receiving surface of the photodetector 121 is generated. The generation range of captured image data according to "SMALL" is smaller than the generation range of captured image data according to "MIDDLE".

A binning pull-down menu 338a is displayed in the light receiving characteristic field 338. A user can select whether or not to set a binning process for captured image data to be generated, by operating the binning pull-down menu 338a. In the case of setting the binning process, the user can further set the level of the binning process. In the example in FIG. 14, the binning process is not set.

(3) Optimization of Imaging Condition

As described above, there is a large number of imaging parameters, and also there are various states for each imaging parameter. Accordingly, there is an extremely large number of imaging conditions based on the combinations of the states of the imaging parameters. Moreover, it is difficult for a user to intuitively grasp a change in which state of which imaging parameter would cause the profile shape to be generated to change in what way. Therefore, it is difficult for a user to find the combination of the states of imaging parameters which would render the optimal imaging condition. Also, a user cannot determine whether or not a set imaging condition is the optimal condition.

Accordingly, the imaging setting unit 931 in FIG. 2 controls the imaging head 100 in such a way as to perform imaging while changing the states of various imaging parameters. Also, the reliability calculation unit 934 in FIG. 2 calculates, based on each piece of generated captured image data or the corresponding profile data, the degree of reliability of the profile shape. In the following, performing imaging while changing the states of the imaging parameters will be referred to as retrieval of an imaging condition.

Figure 15:
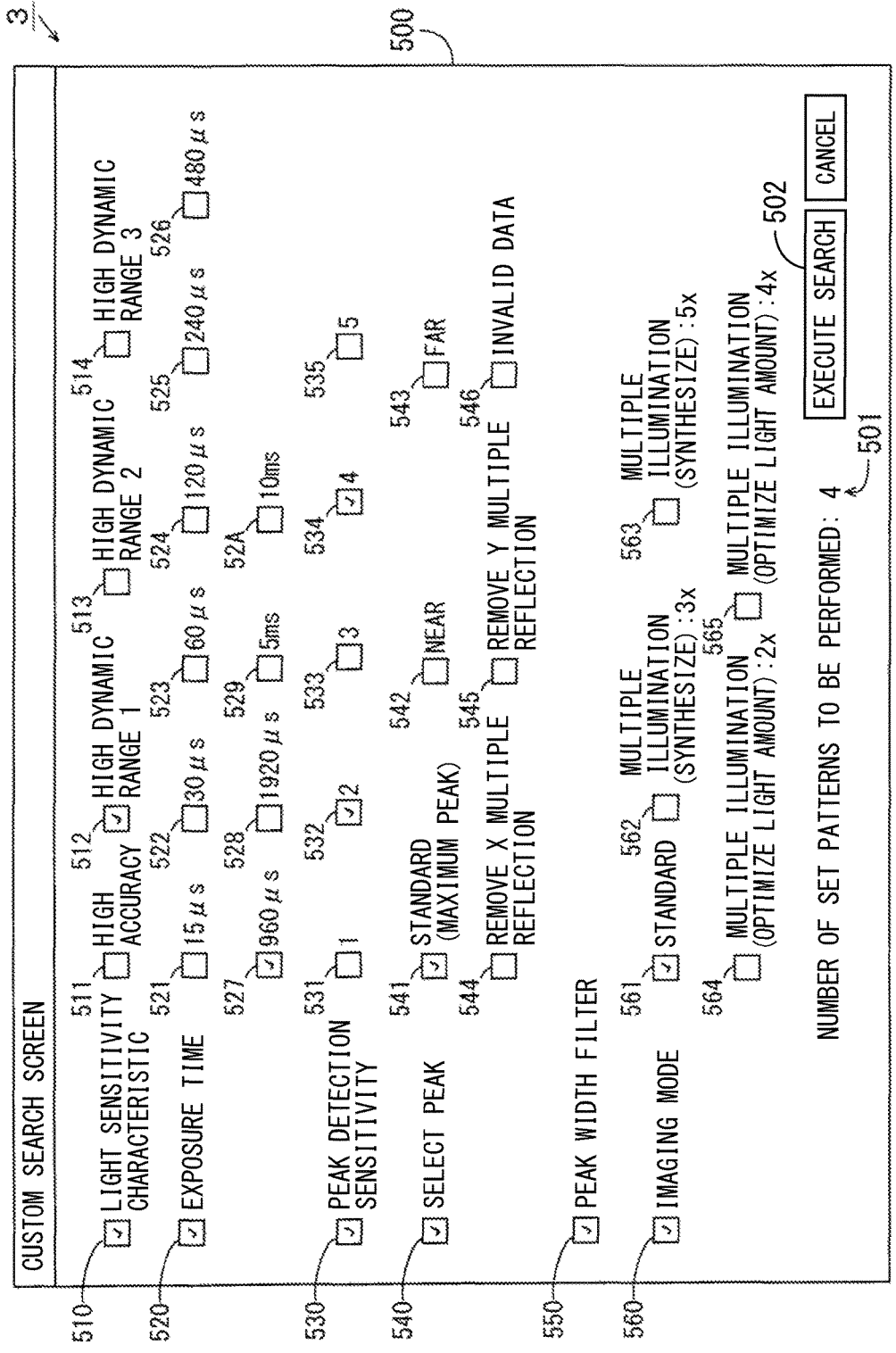
FIG. 15 is a diagram showing a custom search screen displayed by the display unit.

A user can cause the display unit 3 to display an imaging condition optimization screen 400 in FIG. 16, described later, by operating the simple parameter input field, not shown, or the setting optimization button 330a in the parameter detail input field 330 in FIG. 13 or FIG. 14. Also, a user can cause the display unit 3 to further display the custom search screen 500 (FIG. 15) used for retrieving the optimal imaging condition, by operating a custom search button 412 (FIG. 16) on the imaging condition optimization screen 400. FIG. 15 is a diagram showing the custom search screen 500 to be displayed by the display unit 3.

As shown in FIG. 15, light sensitivity characteristic check boxes 510 to 514, exposure time check boxes 520 to 529, and 52A, and peak detection sensitivity check boxes 530 to 535 are displayed in the custom search screen 500. Also, peak selection check boxes 540 to 546, peak width filter check box 550, and imaging mode check boxes 560 to 565 are displayed in the custom search screen 500. Furthermore, an execution pattern number display field 501 and a search execution button 502 are displayed in the custom search screen 500.

The light sensitivity characteristic check boxes 511 to 514 correspond, respectively, to "high accuracy", "high dynamic range 1", "high dynamic range 2", and "high dynamic range 3" regarding the light sensitivity. A user can specify at least one of the light sensitivity characteristic check boxes 511 to 514 after specifying the light sensitivity characteristic check box 510. The light sensitivity corresponding to the specified check box among the light sensitivity characteristic check boxes 511 to 514 is selected as the state of the retrieval-target imaging parameter.

The exposure time check boxes 521 to 529, and 52A correspond, respectively, to 15 μs, 30 μs, 60 μs, 120 μs, 240 μs, 480 μs, 960 μs, 1920 μs, 5 ms, and 10 ms regarding the exposure time. A user can specify at least one of the exposure time check boxes 521 to 529, and 52A after specifying the exposure time check box 520. The exposure time corresponding to the specified check box among the exposure time check boxes 521 to 52A is selected as the state of the retrieval-target imaging parameter.

Now, it is necessary to appropriately set the sampling period according to the period of measurement of a plurality of workpieces W in order to appropriately capture images of a plurality of workpieces W that are conveyed by a belt conveyor or the like. However, if the exposure time of the photodetector 121 is too long, it is not possible to maintain the set sampling period. Accordingly, in the present embodiment, the retrieval range for the state of the exposure time is limited to a range in which a sampling period which is already set can be maintained.

The peak detection sensitivity check boxes 531 to 535 correspond, respectively, to "1", "2", "3", "4", and "5" regarding peak detection sensitivity. A user can specify at least one of the peak detection sensitivity check boxes 531 to 535 after specifying the peak detection sensitivity check box 530. The peak detection sensitivity corresponding to the specified check box among the peak detection sensitivity check boxes 531 to 535 is selected as the state of the retrieval-target imaging parameter.

The peak selection check boxes 541 to 546 correspond, respectively, to "standard (maximum peak)", "NEAR", "FAR", "remove X multiple reflection", "remove Y multiple reflection", and "invalid data" regarding the method for selecting a peak position. A user can specify at least one of the peak selection check boxes 541 to 546 after specifying the peak selection check box 540. The method corresponding to the specified check box among the peak selection check boxes 541 to 546 is selected as the state of the retrieval-target imaging parameter.

The peak width filter check box 550 corresponds to setting of a peak width filter. A user can specify the peak width filter check box 550. In the case where the peak width filter check box 550 is specified, both on and off of the peak width filter are selected as the state of the retrieval-target imaging parameter.

The imaging mode check boxes 561 to 565 correspond, respectively, to "standard", "multiple illumination (synthesize): 3×", "multiple illumination (synthesize): 5×", "multiple illumination (optimize light amount): 2×", and "multiple illumination (optimize light amount): 4×" regarding the imaging mode. A user can specify at least one of the imaging mode check boxes 561 to 565 after specifying the imaging mode check box 560. The imaging mode corresponding to the specified check box among the imaging mode check boxes 561 to 565 is selected as the state of the retrieval-target imaging parameter.

As described above, a user can select one or a plurality of states of a plurality of imaging parameters by specifying a check box corresponding to the desired imaging parameter on the custom search screen 500. Note that, with respect to the state of an imaging parameter which is not selected on the custom search screen 500, the current state of the imaging parameter is inherited. When the states of a plurality of imaging parameters are selected, imaging conditions of a plurality of patterns including combinations of a plurality of states of a plurality of imaging parameters which have been selected are established.

In the example in FIG. 15, two states ("2" and "4") are selected as the peak detection sensitivity, and two states (on and off of the peak width filter) are selected as the peak width filter. Furthermore, one state is selected for each of other imaging parameters. Accordingly, the number of patterns of established imaging conditions is four. The number of patterns of established imaging conditions is displayed in the execution pattern number display field 501. When the search execution button 502 or an optimize button 413 in FIG. 16 described later is operated in this state, retrieval of an imaging condition is performed.

As described above, when the setting optimization button 330a in the parameter detail input field 330 in FIG. 13 or the like is operated, an imaging condition optimization screen (FIG. 16) for optimizing the imaging condition is displayed by the display unit 3. FIG. 16 is a diagram showing the imaging condition optimization screen 400 displayed by the display unit 3.

Figure 16:
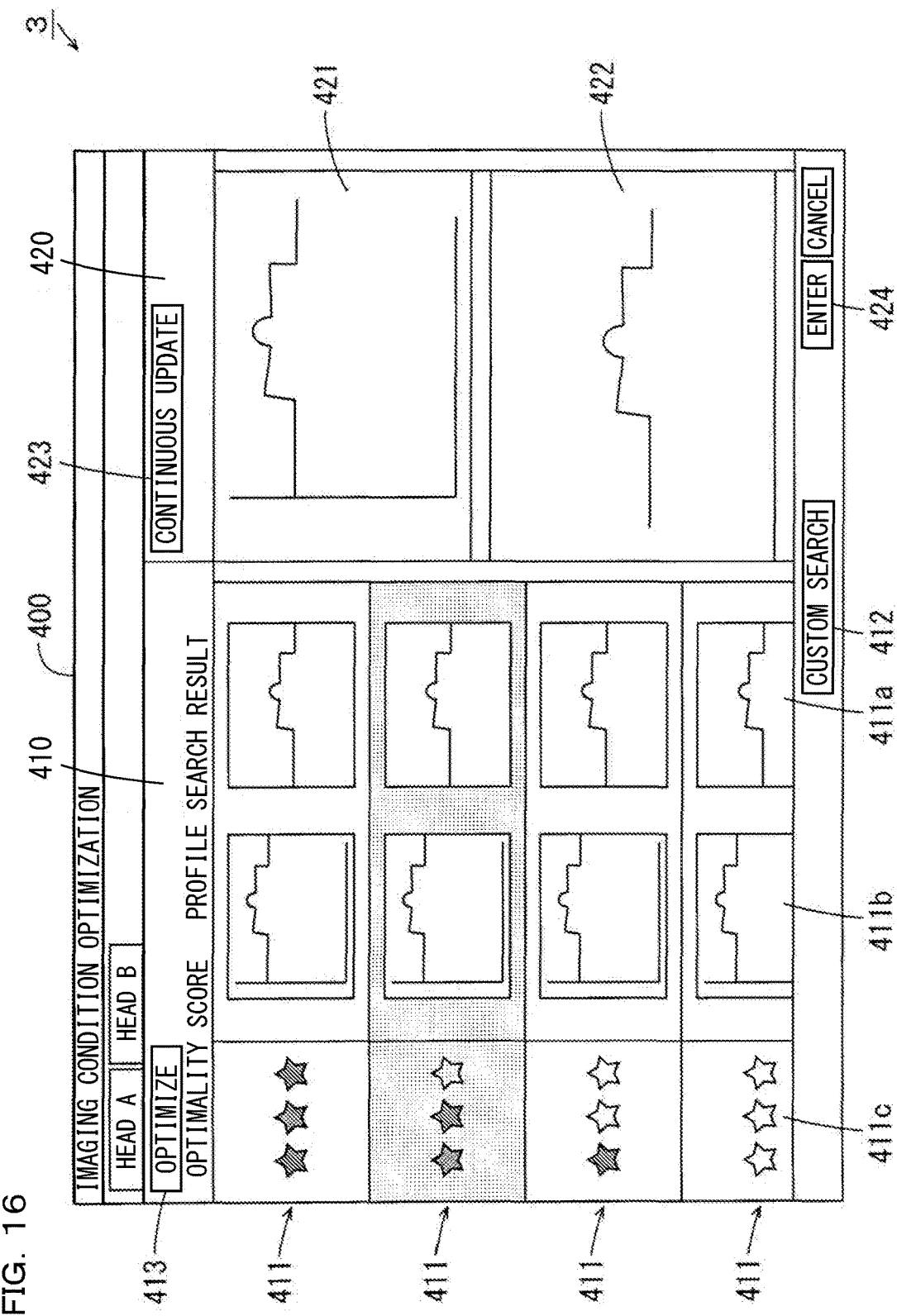
FIG. 16 is a diagram showing an imaging condition optimization screen displayed by the display unit.

As shown in FIG. 16, a result display region 410 and a selected image display region 420 are displayed arranged horizontally next to each other in the imaging condition optimization screen 400. The custom search button 412 and the optimize button 413 are displayed, respectively, at the lower part and the upper part of the result display region 410. As described above, when the custom search button 412 is operated, the custom search screen 500 in FIG. 15 is further displayed by the display unit 3. When the optimize button 413 is operated, imaging is performed while changing the states of a plurality of imaging parameters.

In many cases, an unskilled user has difficulty determining the imaging parameter to be changed among a plurality of imaging parameters by operating the custom search screen 500, and also has difficulty making determination regarding a plurality of states of the imaging parameter to be changed. Accordingly, one or more imaging parameters to be changed are set as recommendations in the imaging setting unit 931 in FIG. 2 among a plurality of imaging parameters. Also, a plurality of states to be changed are set as recommendations for the one or more parameters set in advance. According to such a configuration, a user may easily perform retrieval of an imaging condition by operating the optimize button 413 even in a case where an imaging parameter to be changed and a plurality of states to be changed are not specified on the custom search screen 500.

Also, a skilled user can arbitrarily change the recommended setting regarding one or more imaging parameters to be changed and can arbitrarily change the recommended setting regarding a plurality of states to be changed by operating the operation unit 910 in FIG. 2. Accordingly, retrieval of a more detailed imaging condition can be performed.

A plurality of result display fields 411 are displayed, substantially at the center of the result display region 410, next to one another in the vertical direction and in a manner capable of being scrolled in the vertical direction. The plurality of result display fields 411 correspond, respectively, to the imaging conditions of a plurality of patterns which have been established on the custom search screen 500. A captured image display field 411a, a profile shape display field 411b, and a score display field 411c are displayed next to one another in the horizontal direction in each result display field 411.

A captured image based on captured image data acquired by the peak detection unit 221 in FIG. 2 under a corresponding imaging condition is displayed in each captured image display field 411a. A profile shape based on profile data generated by the profile generation unit 222 in FIG. 2 from corresponding captured image data is displayed in each profile shape display field 411b.

An indicator corresponding to the degree of reliability (score) calculated by the reliability calculation unit 934 in FIG. 2 based on corresponding captured image data or profile data is displayed in the score display field 411c. In the example in FIG. 16, the degree of reliability is on one to three scales, and is shown by the number of star-shaped indicators. The degree of reliability may be shown by a numerical value instead of the number of indicators.

The degree of reliability is calculated by analyzing profile data. In the present embodiment, the degree of reliability is calculated based on the number of pieces of invalid data in profile data or the continuity of the profile shape, for example. In the case where there are a plurality of profile shapes with approximately the same degree of reliability, a plurality of pieces of captured image data corresponding to respective profile shapes are analyzed so as to differentiate the degrees of reliability of the plurality of profile shapes from one another. In the present embodiment, the degree of reliability of a profile shape is calculated based on the height of contrast of a captured image or the size of the peak of captured image data, for example. Note that, a plurality of degrees of reliability being approximately the same means that the difference among the plurality of degrees of reliability is smaller than a specific degree decided in advance.

A plurality of result display fields 411 are displayed from the top to the bottom in the descending order of the degree of reliability. This makes it easy to visually recognize the profile shape with the highest degree of reliability. A plurality of result display fields 411 may be alternatively displayed from the top to the bottom in the ascending order of the degree of reliability.

Next, the most preferable imaging condition among a plurality of imaging conditions which have been retrieved is selected. Here, the imaging setting unit 931 in FIG. 2 can select the imaging condition with the highest degree of reliability as the most preferable imaging condition. On the other hand, sometimes, a captured image of a desired part of a workpiece W is appropriately acquired under an imaging condition other than the imaging condition with the highest degree of reliability. Accordingly, a user can select the most preferable imaging condition by specifying one of a plurality of result display fields 411 in the result display region 410. In the example in FIG. 16, the result display field 411 which is displayed second from the top is selected.

A captured image display field 421 and a profile shape display field 422 are displayed, arranged next to each other in the vertical direction, substantially at the center of the selected image display region 420. A successive update button 423 and an enter button 424 are displayed, respectively, at the upper part and the lower part of the selected image display region 420. A captured image and a profile shape corresponding to the selected imaging condition are displayed in the captured image display field 421 and the profile shape display field 422, respectively. That is, the captured image in the captured image display field 411a is displayed in the captured image display field 421, and the profile shape in the profile shape display field 411b is displayed in the profile shape display field 422.

When the successive update button 423 is operated, the captured image and the profile shape displayed, respectively, in the captured image display field 421 and the profile shape display field 422 are sequentially updated by imaging being performed under a selected imaging condition. In this state, a user can check whether or not an appropriate captured image can be acquired even when the position and the attitude of a workpiece W are changed, by slightly changing the position and the attitude of the workpiece W to be captured. That is, whether or not the robustness of the imaging condition is high can be checked.

Furthermore, a combination of states of imaging parameters for increasing the robustness of the imaging condition can be further retrieved. A user can set a highly robust imaging condition by determining the states of a plurality of imaging parameters in such a way that an appropriate profile shape can be acquired even when the position and the attitude of a workpiece W are changed.

Therefore, appropriate profile shapes can be acquired even if a plurality of workpieces W which are sequentially conveyed to the imaging region of the imaging head 100 are not arranged at perfectly constant intervals or even if the attitudes of a plurality of workpieces W are not completely the same. When the enter button 424 is operated in a state where an imaging condition is selected, an optimal imaging condition is established.

A user can select two or more imaging conditions from a plurality of imaging conditions which have been retrieved, and can newly retrieve the selected imaging conditions. At the time of new retrieval of an imaging condition, the part of the workpiece W to be captured may be changed, or the states of some of the imaging parameters may be changed. The degree of reliability obtained in the previous retrieval may be taken into account with respect to the degree of reliability which is obtained by the new retrieval of the imaging condition. For example, the degree of reliability which is obtained by the new retrieval of the imaging condition may be the total (including the weighted total) with the degree of reliability obtained by the previous retrieval. By repeatedly retrieving the imaging condition, imaging setting with higher degree of reliability can be performed.

(4) Imaging Condition Optimization Process

Figure 17:
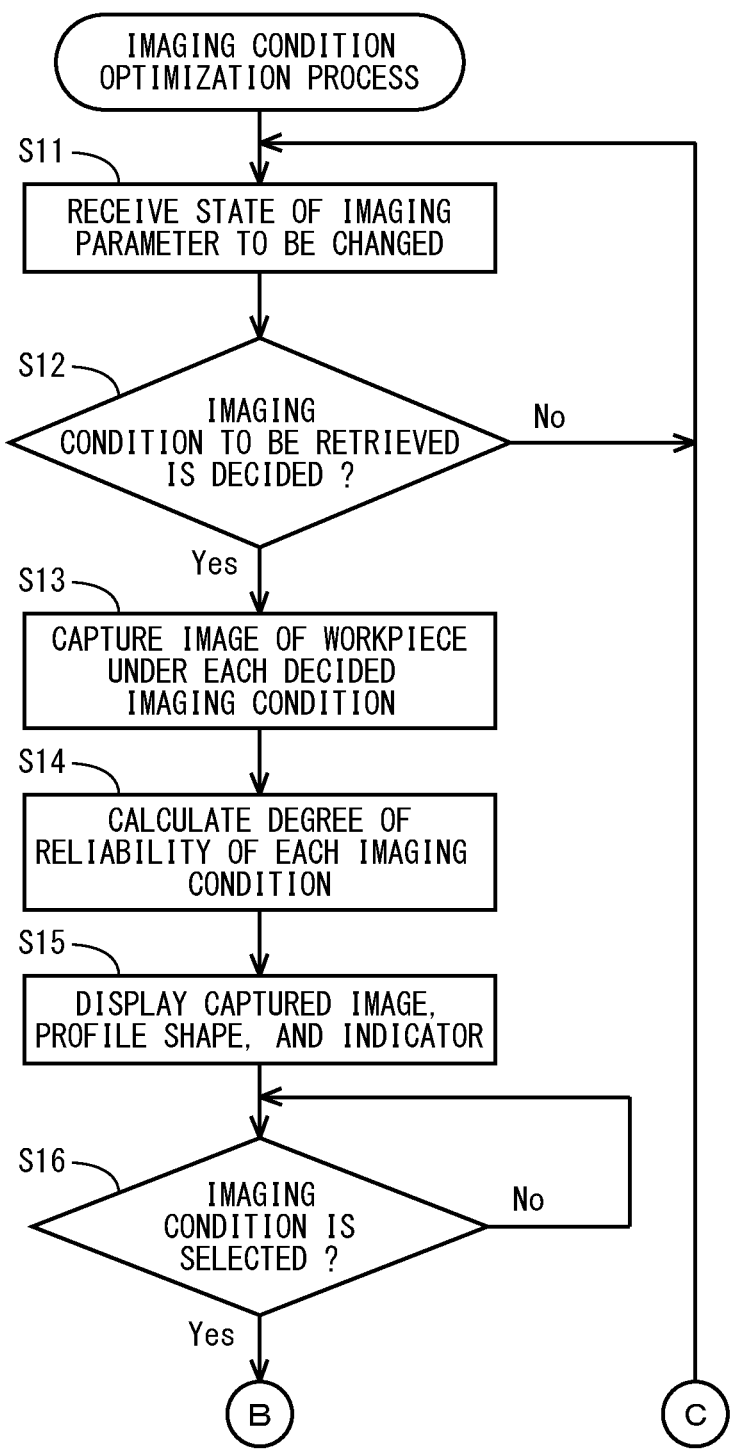
FIG. 17 is a flow chart showing an imaging condition optimization process.
Figure 18:
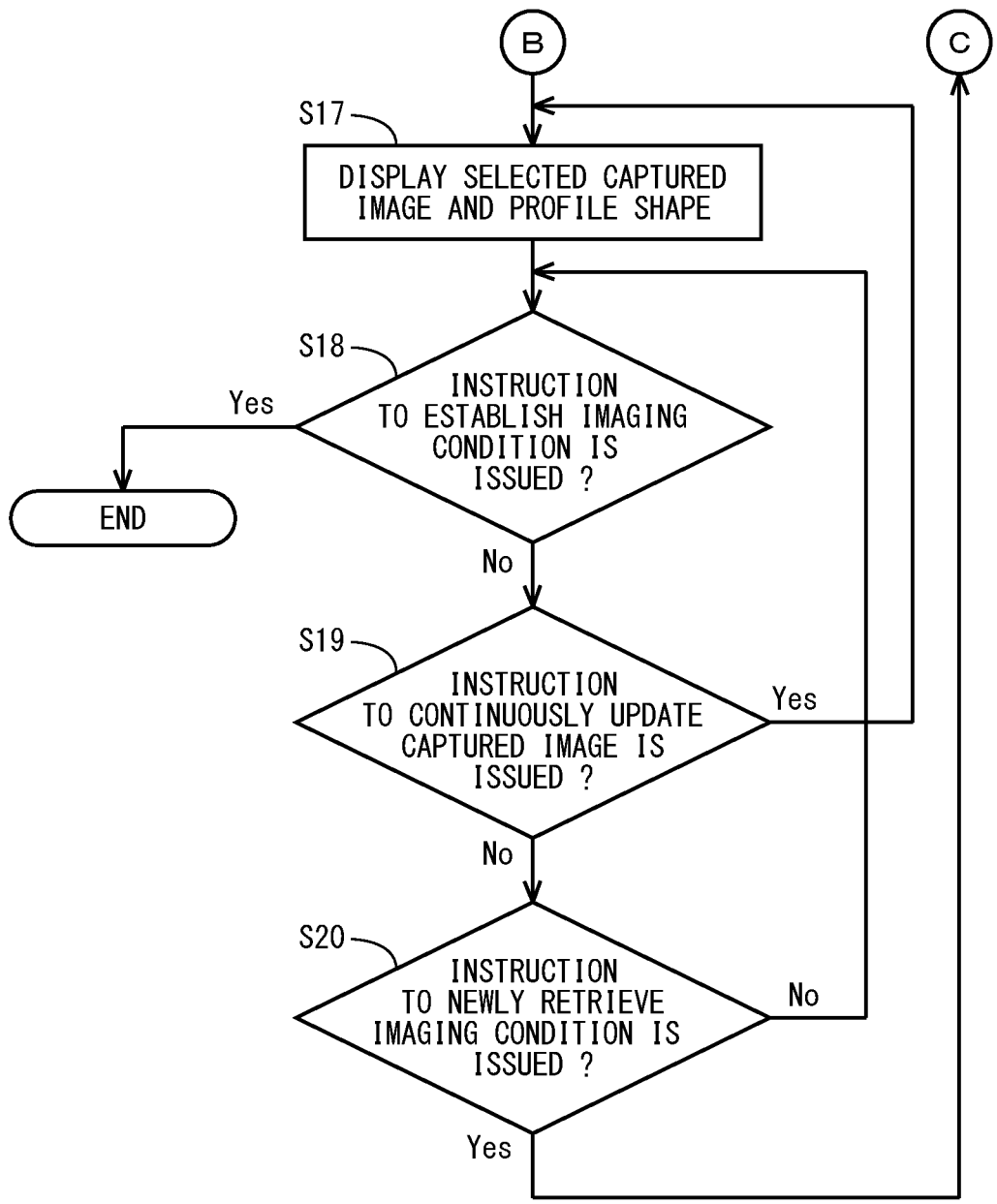
FIG. 18 is a flow chart showing the imaging condition optimization process.

FIGS. 17 and 18 are flow charts showing an imaging condition optimization process. In the following, an imaging condition optimization process by the PC 900 will be described with reference to FIGS. 1, 2, 17, and 18. The PC 900 performs the imaging condition optimization process by controlling the processing device 200 based on an imaging condition optimization program.

First, the PC 900 receives, on the custom search screen 500 in FIG. 15, the state of an imaging parameter to be changed (step S11). In the case where an imaging parameter to be changed and a plurality of states to be changed are set as recommendations, the process in step S11 may be omitted. Next, the PC 900 determines whether or not imaging conditions to be retrieved are decided (step S12). A user can decide the imaging conditions to be retrieved by operating the search execution button 502 in FIG. 15 or the optimize button 413 in FIG. 16.

When it is determined in step S12 that imaging conditions are not decided, the PC 900 returns to the process in step S11. When it is determined in step S12 that imaging conditions are decided, the PC 900 controls the imaging head 100 to capture an image of a workpiece W under each imaging condition which has been decided (step S13). Next, the PC 900 calculates the degree of reliability of each imaging condition (step S14). Then, the PC 900 displays an acquired captured image, a profile shape, and an indicator corresponding to the calculated degree of reliability in the result display field 411 on the imaging condition optimization screen 400 in FIG. 16 (step S15).

Next, the PC 900 determines whether or not one of the retrieved imaging conditions is selected (step S16). Selection of an imaging condition may be performed by the PC 900 based on the calculated degrees of reliability, or may be performed by the user. When it is determined in step S16 that an imaging condition is not selected, the PC 900 stands by until an imaging condition is selected. When it is determined in step S16 that an imaging condition is selected, the PC 900 displays a captured image and a profile shape according to the selected imaging condition in the selected image display region 420 in FIG. 16 (step S17).

Next, the PC 900 determines whether or not an instruction to establish the imaging condition is issued (step S18). The user can issue an instruction to establish the imaging condition by operating the enter button 424 in FIG. 16. When it is determined in step S18 that an instruction to establish the imaging condition is not issued, the PC 900 determines whether or not an instruction for successive update of the captured image is issued (step S19). The user can issue an instruction for successive update of the captured image by operating the successive update button 423 in FIG. 16.

When it is determined in step S19 that an instruction for successive update of the captured image is issued, the PC 900 returns to the process in step S17. The PC 900 repeats the processes from step S17 to step S19 until the instruction for successive update of the captured image is stopped. The user can change the position and the attitude of the workpiece W while observing the displayed captured image and profile shape, respectively, in the captured image display field 421 and the profile shape display field 422 in FIG. 16. Whether or not the robustness of the selected imaging conditions is high can be thereby checked.

When it is determined in step S19 that an instruction for successive update of the captured image is not issued, the PC 900 determines whether or not an instruction for new retrieval of imaging conditions is issued (step S20). The user can issue an instruction for new retrieval of imaging conditions by operating the search execution button 502 in FIG. 15 or the optimize button 413 in FIG. 16.

When it is determined in step S20 that an instruction for new retrieval of imaging conditions is issued, the PC 900 returns to the process in step S11. Retrieval of imaging conditions is thereby performed again while taking into account the degrees of reliability of the already retrieved imaging conditions. When it is determined in step S20 that an instruction for new retrieval of imaging conditions is not issued, the PC 900 returns to the process in step S18. Then, the processes from step S18 to S20 are repeated until an instruction to establish the imaging conditions is issued. When it is determined in step S18 that an instruction to establish the imaging conditions is issued, the PC 900 ends the imaging condition optimization process.

(5) Effects

According to the optical displacement measurement system 1 of the present embodiment, states of a plurality of imaging parameters for setting imaging conditions are set by the imaging setting unit 931. When the set state of any of the plurality of imaging parameters is changed, a plurality of pieces of captured image data according to respective imaging conditions are generated by the light receiving unit 120.

Profile data indicating a profile shape is generated by the profile generation unit 222 based on each of the pieces of generated captured image data. The degree of reliability of the profile shape indicated by each of the pieces of generated profile data is calculated by the reliability calculation unit 934 based on the profile data or the captured image data corresponding to the profile data.

According to the configuration, pieces of captured image data are generated under a plurality of imaging conditions corresponding to combinations of a plurality of states of the imaging parameters. Also, the degree of reliability of the profile shape corresponding to each piece of captured image data is calculated. Accordingly, a user can determine which imaging condition is the optimal condition based on the profile shapes based on the pieces of generated profile data or the calculated degrees of reliability. An optimal imaging condition can be thereby easily set.

Also, by operating the operation unit 910, a user can select one or more imaging parameters to be changed, and can specify a plurality of states to be changed for each of the one or more selected parameters. A user can thereby determine an optimal imaging condition where the state of a desired imaging parameter is changed to a plurality of desired states.

Furthermore, by operating the operation unit 910, a user can set the state of a specific imaging parameter determined in advance, such as the sampling frequency. The search ranges of other imaging parameters which are dependent on the specific imaging parameter are limited to ranges in which the state of the set specific imaging parameter may be maintained. An example of other imaging parameters is the exposure time of the photodetector 121. An optimal imaging condition where the state of the specific imaging parameter is maintained and the states of one or more other selected imaging parameters are changed can be thereby determined.

<3> Measurement Setting (1) Procedure of Measurement Setting

After imaging setting is performed, measurement setting has to be performed to measure the dimension (displacement) of a common part of a plurality of workpieces W of the same type. In the following, the procedure of measurement setting will be described with reference to the settings edit screen 300 in FIG. 12. Note that, similar to imaging setting, in the case where a plurality of imaging heads 100 are connected to the processing device 200, common measurement setting may be collectively performed for the plurality of imaging heads 100, or measurement setting may be separately performed for the plurality of imaging heads 100.

A master registration button 312a, a position correction button 312b, a profile mask button 312c, and an OUT measurement setting button 312d are displayed in the measurement setting field 312. The measurement setting field 312 is operated at the time of performing measurement setting. As described above, the profile button 311c in the imaging setting field 311 is sometimes used in measurement setting.

Figure 19:
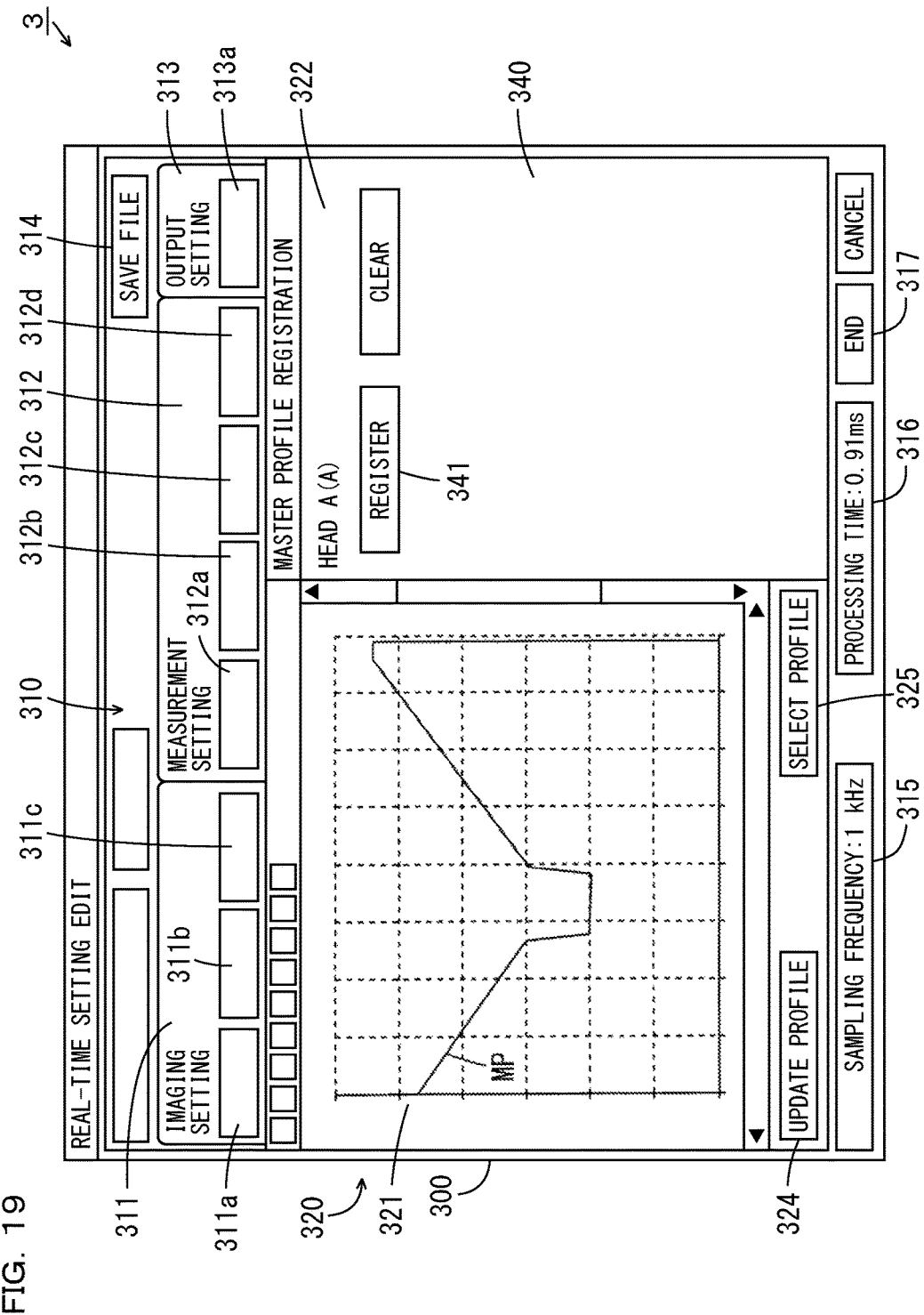
FIG. 19 is a diagram showing the settings edit screen when a master registration button is operated.

FIG. 19 is a diagram showing the settings edit screen 300 when the master registration button 312a is operated. As shown in FIG. 19, when the master registration button 312a is operated, a profile update button 324 and a profile selection button 325 are displayed in the individual display field 320, instead of the image update button 323 in FIG. 12. Also, a master profile registration field 340 is displayed in the setting input field 322.

When the profile update button 324 is operated, new captured image data is generated under the current imaging condition, and also profile data is generated based on the generated captured image data. A profile shape displayed in the image display field 321 is updated based on the generated profile data. Also, when the profile selection button 325 is operated, a profile shape is displayed in the image display field 321 based on desired profile data generated up to this point.

A registration button 341 is displayed in the master profile registration field 340. When the registration button 341 is operated, profile data indicating the profile shape which is displayed in the image display field 321 is registered as master profile data. The master profile data is used in the setting for a common measurement part of a plurality of profile shapes of the same type. Also, the master profile data is used in position correction and setting of a profile mask described later. In the following, a profile shape that is displayed based on the master profile data will be referred to as a master profile shape MP.

When the OUT measurement setting button 312d is operated, an input field for performing setting for a measurement part of a profile shape displayed in the image display field 321 is displayed in the setting input field 322. Also, when the OUT measurement setting button 312d is operated in a state where master profile data is registered, an input field for performing setting for a measurement part of a master profile shape MP is displayed in the setting input field 322.

A user can select one measurement mode from measurement modes of a plurality of types by performing a predetermined operation on the setting input field 322. The measurement modes include a height measurement mode, a width measurement mode, a position measurement mode, a step measurement mode, a cross-sectional area measurement mode, an arc curvature measurement mode, an angle measurement mode, and the like. In the following, the procedure of setting a measurement mode will be described. Furthermore, in each measurement mode, circularity, flatness or the like of a part of the profile shape may also be evaluated by using a measurement result.

Figure 20:
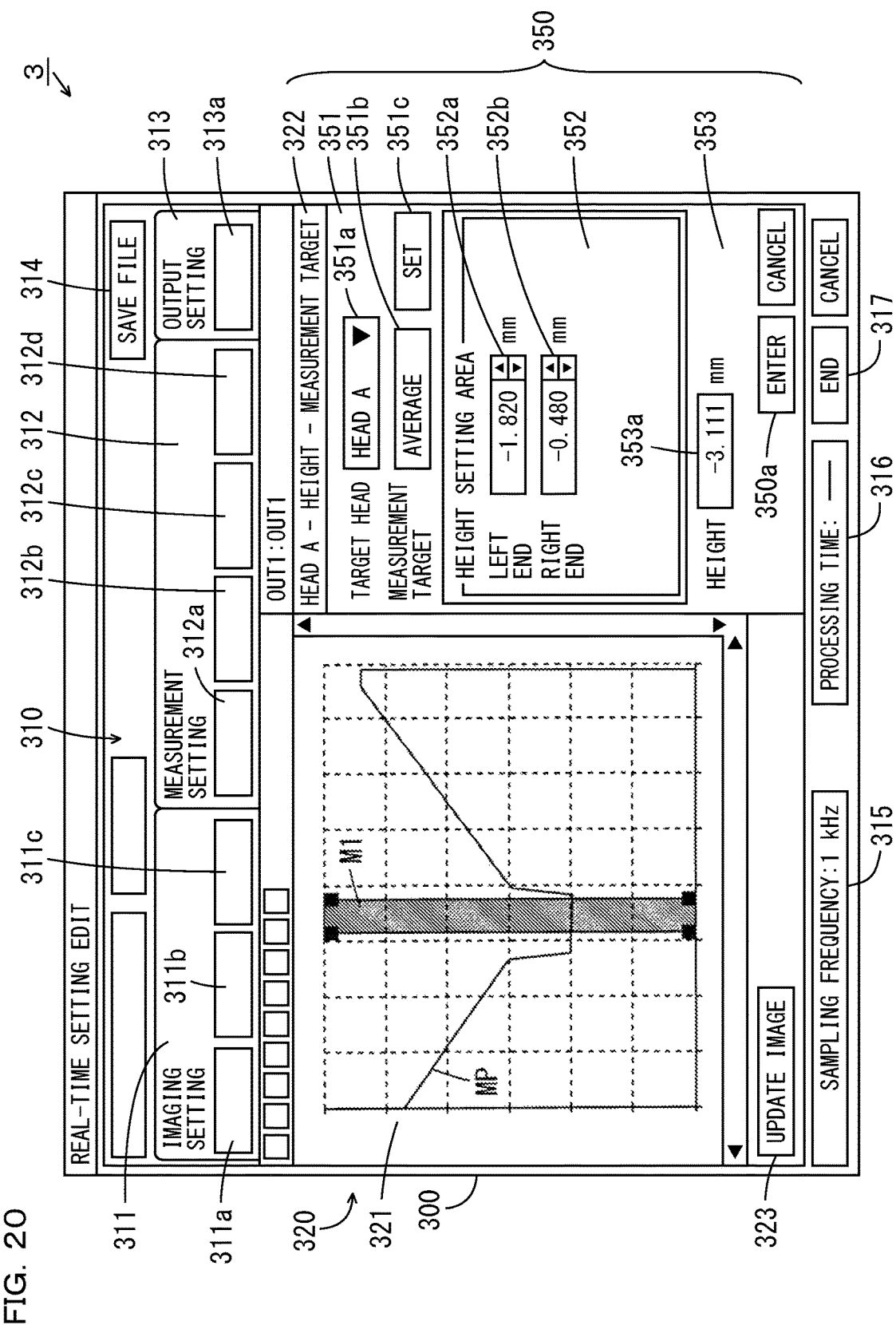
FIG. 20 is a diagram showing the settings edit screen when a height measurement mode is selected.

FIG. 20 is a diagram showing the settings edit screen 300 when the height measurement mode is selected. As shown in FIG. 20, when the height measurement mode is selected, a measurement target display field 350 is displayed in the setting input field 322. A measurement target input field 351, a measurement range input field 352, a measurement result output field 353, and an enter button 350a are displayed in the measurement target display field 350. Furthermore, a measurement range display indicator M1 indicating the measurement range of a profile shape is displayed in the image display field 321. The profile shape used in the description of FIG. 20 is the master profile shape MP.

A target head pull-down menu 351*a*, a measurement target setting field 351*b*, and a measurement target setting button 351*c* are displayed in the measurement target input field 351. A user can select an imaging head 100 for performing measurement setting from the target head pull-down menu 351*a*. The imaging heads 100 includes "head A", "head B", and "common", for example. The "head A" and the "head B" herein refer to one or the other of two imaging heads 100 connected to the processing device 200.

A left end input field 352*a* and a right end input field 352*b* are displayed in the measurement range input field 352. A user inputs numerical values in the left end input field 352*a* and the right end input field 352*b*. The left end and the right end of the measurement range of the master profile shape MP displayed in the image display field 321 are thereby set. In this case, the position and the size of the measurement range display indicator M1 are changed so as to show a measurement range according to the numerical values input in the left end input field 352*a* and the right end input field 352*b*.

Alternatively, a user can set the left end and the right end of the measurement range by operating the position and the size of the measurement range display indicator M1 displayed in the image display field 321. In this case, the numerical values in the left end input field 352*a* and the right end input field 352*b* change according to the position and the size of the measurement range display indicator M1. In this example, the measurement range display indicator M1 has a rectangular shape, but the present invention is not limited thereto. The measurement range display indicator M1 may be two lines extending in the vertical direction in a manner showing the left end and the right end of the measurement range, for example. Alternatively, the measurement range display indicator M1 may be a line, an arrow, or the like extending in the horizontal direction in a manner showing the left end and the right end of the measurement range.

A measurement target, of the master profile shape MP, included in the measurement range set by the measurement range input field 352 is displayed in the measurement target setting field 351*b* in the measurement target input field 351. In the case where the height measurement mode is selected as the measurement mode, a user may set "average", "maximum", or "minimum" as the measurement target by operating the measurement target setting button 351*c*. In the example shown in FIG. 20, "average" is set as the measurement target. In this case, the average value of the profile data of the part, of the master profile shape MP, included in the measurement range is calculated by the measurement processing unit 231 in FIG. 2.

The measurement result output field 353 includes a measurement result display field 353*a*. The value of the measurement target calculated by the measurement processing unit 231 is displayed in the measurement result display field 353*a*. In this example, the value that is displayed in the measurement result display field 353*a* is the average height of the part, of the master profile shape MP, included in the measurement range, the height being from a preset position. A preset position may be arbitrarily set by a user. When the enter button 350*a* is operated, setting of this measurement mode (height measurement mode) is ended.

Figure 21:
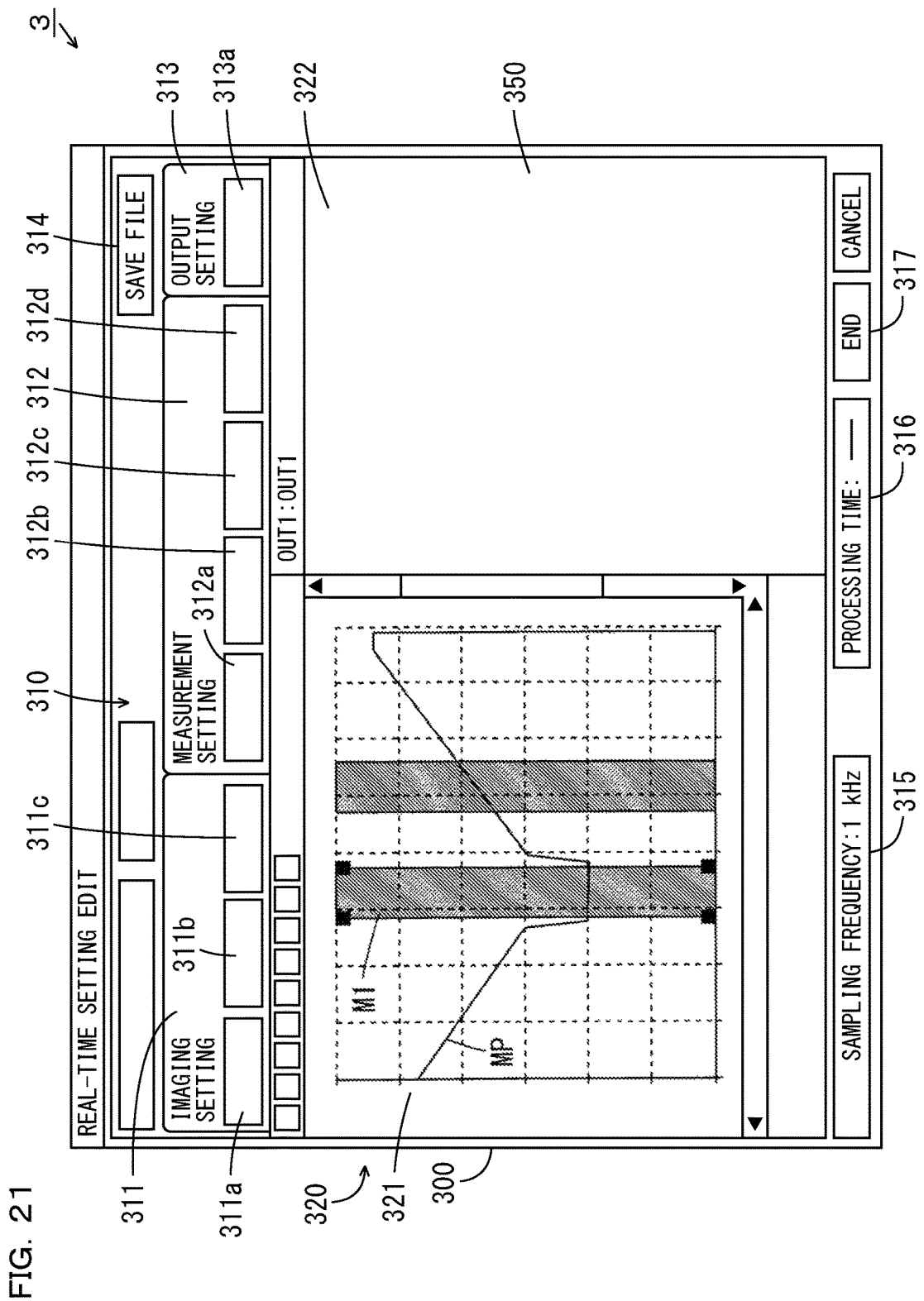
FIG. 21 is a diagram showing the settings edit screen when an angle measurement mode is selected.
Figure 22:
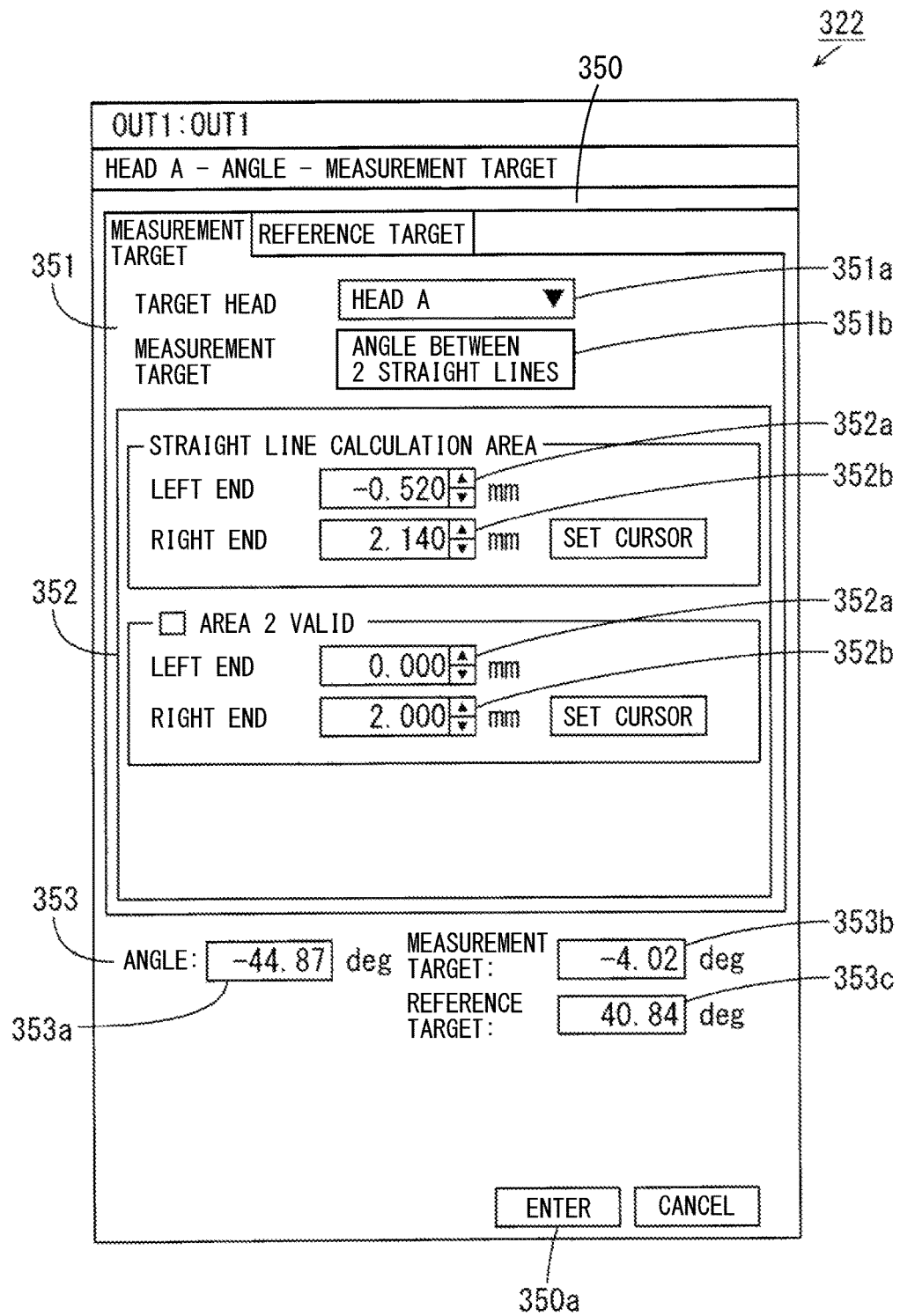
FIG. 22 is a diagram showing a measurement target display field displayed in a setting input field in FIG. 21.

FIG. 21 is a diagram showing the settings edit screen 300 when the angle measurement mode is selected. FIG. 22 is a diagram showing the measurement target display field 350 displayed in the setting input field 322 in FIG. 21. The measurement target display field 350 when the angle measurement mode is selected is the same as the measurement target display field 350 when the height measurement mode is selected except for the following points.

As shown in FIG. 22, an angle is displayed in the measurement target setting field 351*b* as the measurement target, instead of "average" or the like. In the example in FIG. 22, "angle between two straight lines" is displayed in the measurement target input field 351. Also, in the example in FIG. 22, the measurement target setting button 351*c* in FIG. 20 is not displayed.

Two sets of the left end input field 352*a* and the right end input field 352*b* are displayed in the measurement range input field 352. Accordingly, the measurement range can be set for two parts of the master profile shape MP. In the example in FIG. 22, two sets of the left end input field 352*a* and the right end input field 352*b* are displayed in the measurement range input field 352.

When one of the sets of the left end input field 352*a* and the right end input field 352*b* or the corresponding measurement range display indicator M1 is operated, a measurement range is set on a part of the master profile shape MP. In this case, the angle of a part, of the master profile shape MP, included in the measurement range to a predetermined reference line is calculated by the measurement processing unit 231 in FIG. 2. In this example, the reference line is a straight line extending in the horizontal direction. Also, in this example, the other of the sets of the left end input field 352*a* and the right end input field 352*b* is not used.

Two measurement result display fields 353*b* and 353*c* are displayed in the measurement result output field 353, in addition to the measurement result display field 353*a*. The angle between a part of the master profile shape MP and the reference line is displayed in the measurement result display field 353*b*. Also, the angle between another part, of the master profile shape MP, set in advance as a reference target and the reference line is displayed in the measurement result display field 353*c*. In this example, a predetermined part, of the master profile shape MP, which is greatly inclined is set as the reference target.

The angle between one part and another part, of the master profile shape MP, set respectively as the measurement range and as the reference target is displayed in the measurement result display field 353*a*. That is, the difference between the angles displayed in the measurement result display fields 353*b* and 353*c* is displayed in the measurement result display field 353*a*. When the enter button 350*a* is operated, setting of this measurement mode (angle measurement mode) is ended.

The measurement target display fields for other measurement modes, such as a width measurement mode, are the same as the measurement target display fields 350 in FIGS. 20 and 22 except for the measurement target displayed in the measurement target setting field 351*b*. In the measurement target setting field in the measurement target display field for the width measurement mode, the edge level of the master profile shape MP, an intersection point of two lines, an inflection point, or the like is displayed as the measurement target.

When the end button 317 is operated after completion of setting of a measurement mode, the measurement setting is ended. Supplementary setting regarding a filtering process, a position correction process, a profile masking process, and the like may be added to the measurement setting.

A terminal/storage button 313*a* is displayed in the output setting field 313. When the terminal/storage button 313*a* is operated, an input field for performing various settings regarding output and saving of data is displayed in the setting input field 322. A user can perform setting regarding an assignment operation of an input/output terminal, not shown, of the processing device 200 by performing a predetermined operation on the setting input field 322. Also, a user can perform setting regarding saving of data in the storage unit 260 in FIG. 2 on the data processing unit 220 or the measurement control unit 230 by performing a predetermined operation on the setting input field 322.

When the file save button 314 is operated, data is saved in the storage unit 920 of the PC 900 connected to the input/output terminal of the processing device 200. A measurement simulation process described later can be thereby performed on the saved data. As a result, a measurement result by a changed measurement method can be acquired.

Furthermore, in a case where a measurement simulation program is installed in another personal computer different from the PC 900, the measurement simulation process can be performed by using the other personal computer. Accordingly, a user can perform the measurement simulation process also in an environment different from the environment where the optical displacement measurement system 1 is installed. Therefore, a user can acquire a measurement result by a changed measurement method by performing the measurement simulation process also in an environment different from the environment where the optical displacement measurement system 1 is installed.

(2) Supplementary Measurement Setting (a) Filtering Process

With the measurement setting described above, if an unnecessary part is included in the profile shape, an inappropriate measurement result may be obtained. An unnecessary part included in a profile shape can be removed by performing a desired filtering process on profile data.

When the profile button 311*c* in FIG. 12 is operated after desired profile data is generated, a profile setting field for setting a filtering process for the profile data is displayed in the setting input field 322. In this example, profile setting includes a simple profile setting field for setting a filtering process by a simple operation, and a profile detail setting field for setting a filtering process in a detailed manner.

Figure 23:
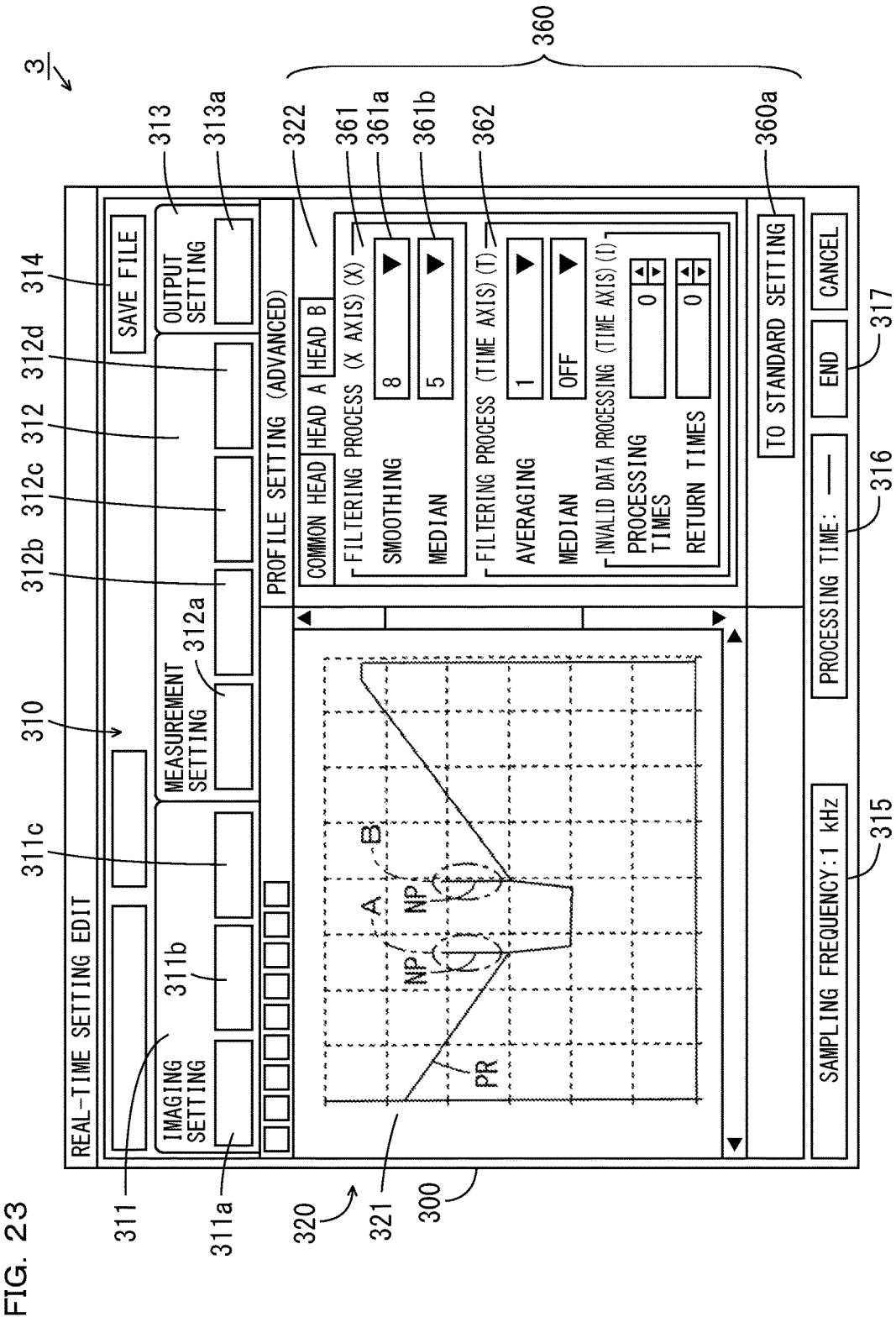
FIG. 23 is a diagram showing a profile detail setting field.

In this example, when the profile button 311*c* is operated, the simple profile setting field, not shown, is displayed in the setting input field 322. When a predetermined operation is performed on the simple profile setting field, the profile detail setting field is displayed in the setting input field 322, instead of the simple profile setting field. FIG. 23 is a diagram showing the profile detail setting field.

A profile shape PR based on desired profile data is displayed in the image display field 321 in FIG. 23. The profile shape PR in FIG. 23 includes noise portions NP protruding in a discontinuous manner, as shown by a portion A and a portion B.

As shown in FIG. 23, a spatial filtering setting field 361 for setting a filtering process for profile data along an X axis (X3 direction in FIG. 9) is displayed in a profile detail setting field 360. Note that, a temporal filtering setting field 362 for setting a filtering process for profile data along a time axis is displayed in the profile detail setting field 360. Also, a standard settings button 360*a* for displaying a simple profile setting field, not shown, in the setting input field 322, instead of the profile detail setting field 360, is displayed in the profile detail setting field 360.

A smoothing pull-down menu 361*a* and a median pull-down menu 361*b* are displayed in the spatial filtering setting field 361. A user can select the levels of the smoothing process and the median process in the spatial filtering process from the smoothing pull-down menu 361*a* and the median pull-down menu 361*b*. When the filtering process is set, the measurement processing unit 231 in FIG. 2 performs the filtering process on the profile data. By selecting appropriate smoothing process and median process, noise portions NP can be removed from the profile shape PR.

(b) Position Correction Process

The position of a workpiece W at the time of registration of the master profile data and the position of the workpiece W to be actually measured do not necessarily perfectly coincide with each other. If imaging is performed in a state where the position of a workpiece W at the time of registration of the master profile data and the position of the workpiece W to be actually measured are shifted from each other, an inappropriate measurement result is possibly obtained.

Figure 24:
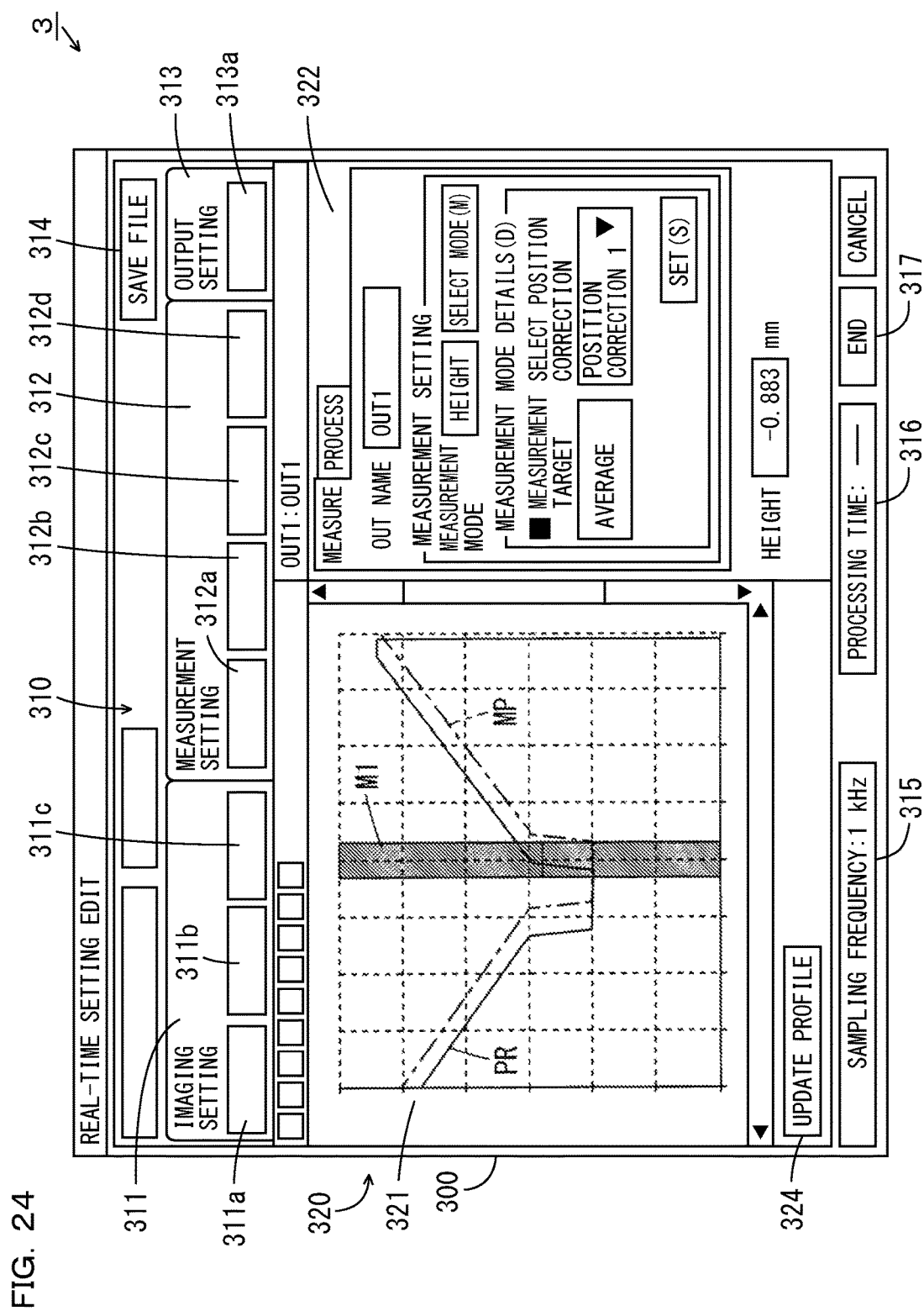
FIG. 24 is a diagram showing the display unit displaying a master profile shape and a profile shape.

FIG. 24 is a diagram showing the display unit 3 displaying a master profile shape MP and a profile shape PR. In the example in FIG. 24, the position of the master profile shape MP and the position of the profile shape PR are shifted from each other. Accordingly, the measurement range set for the master profile shape MP (measurement range display indicator M1) is not coincident with the measurement range of the profile shape PR to be actually measured. By performing a position correction process on the master profile data, the measurement range of the master profile shape MP can be made to coincide with the measurement range of the profile shape PR to be actually measured.

When the position correction button 312*b* is operated, a position correction field for setting the position correction process for the profile data is displayed in the setting input field 322. A user can select one correction mode from a plurality of types of correction modes by performing a predetermined operation on the position correction field, not shown, in the setting input field 322. The correction modes include an X-correction mode, a Z-correction mode, a ZX-correction mode, an XZ-correction mode, a θ-correction mode, an Xθ-correction mode, and the like. Note that, an X direction and a Z direction in the setting of the correction modes refer to the X3 direction and the Z3 direction in FIG. 9, respectively.

In the X-correction mode, the position of the measurement range in the X3 direction is corrected. In the Z-correction mode, the position of the measurement range in the Z3 direction is corrected. In the ZX-correction mode, the position of the measurement range in the Z3 direction is corrected, and then the position of the measurement range in the X3 direction is corrected. In the XZ-correction mode, the position of the measurement range in the X3 direction is corrected, and then the position of the measurement range in the Z3 direction is corrected. In the θ-correction mode, the rotation angle of the measurement range is corrected. In the Xθ-correction mode, the position of the measurement range in the X3 direction is corrected, and then the rotation angle of the measurement range is corrected.

Figure 25:
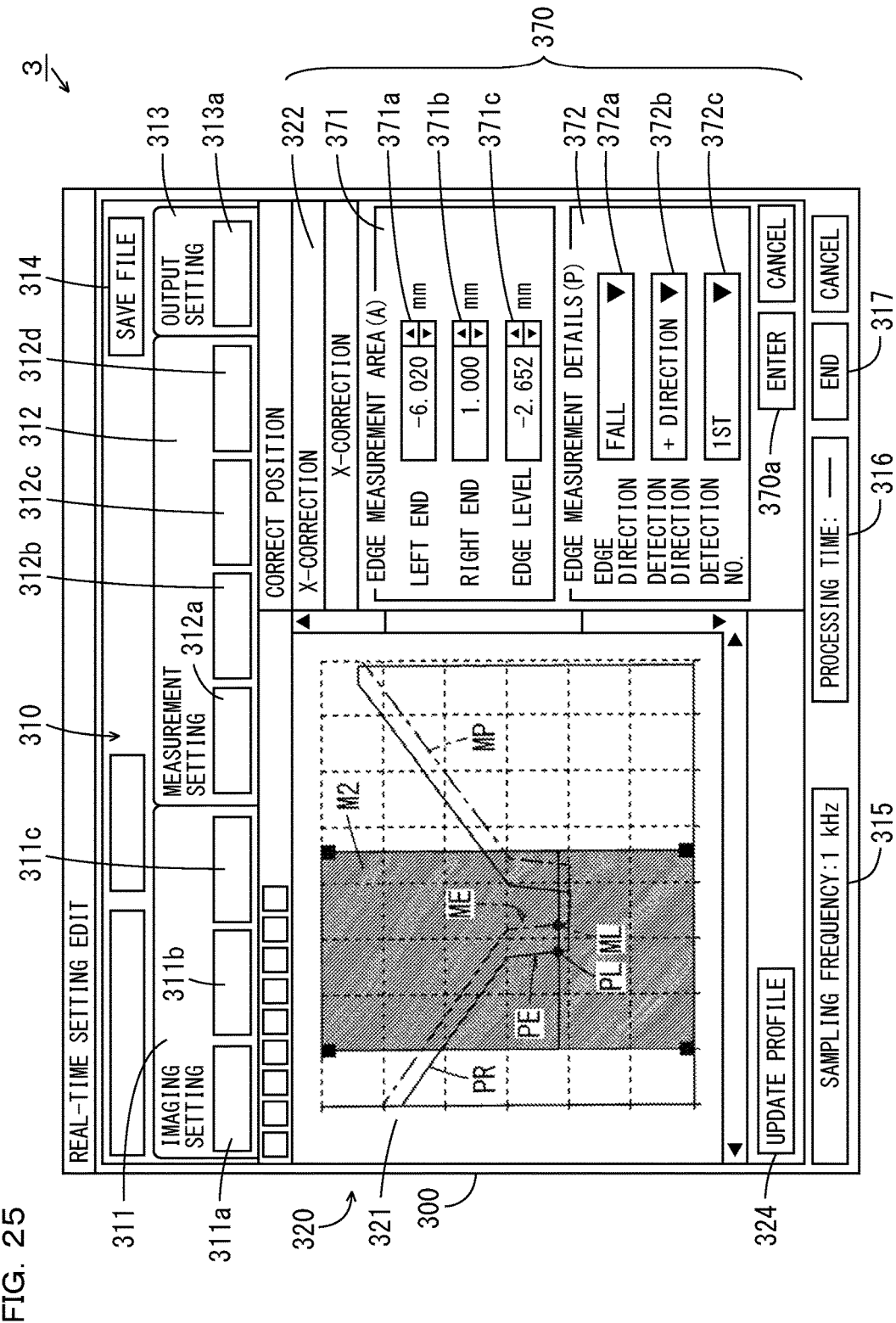
FIG. 25 is a diagram showing the settings edit screen when an X-correction mode is selected.

FIG. 25 is a diagram showing the settings edit screen 300 when the X-correction mode is selected. As shown in FIG. 25, when the X-correction mode is selected, an X correction field 370 is displayed in the setting input field 322. An edge measurement area field 371, an edge measurement detail field 372, and an enter button 370*a* are displayed in the X correction field 370. Also, a correction range display indicator M2 indicating the correction range of the master profile shape MP is displayed in the image display field 321.

A left end input field 371*a*, a right end input field 371*b*, and an edge level input field 371*c* are displayed in the edge measurement area field 371. A user inputs numerical values in the left end input field 371*a* and the right end input field 371*b*. The left end and the right end of the correction range of the master profile shape MP displayed in the image display field 321 are thereby set. In this case, the position and the size of the correction range display indicator M2 are changed so as to show a correction range according to the numerical values input in the left end input field 371*a* and the right end input field 371*b*.

Alternatively, a user can set the correction range by operating the position and the size of the correction range display indicator M2 displayed in the image display field 321. In this case, the numerical values in the left end input field 371*a* and the right end input field 371*b* change according to the position and the size of the correction range display indicator M2. In this example, the correction range display indicator M2 has a rectangular shape, but the present invention is not limited thereto. The correction range display indicator M2 may be two lines extending in the vertical direction in a manner showing the left end and the right end of the correction range, for example. Alternatively, the correction range display indicator M2 may be a line, an arrow, or the like extending in the horizontal direction in a manner showing the left end and the right end of the correction range.

An edge ME of the master profile shape MP is detected in the set correction range. The edge ME of the master profile shape MP is a part, of the master profile shape MP, that steeply rises or that steeply falls. A user inputs a numerical value in the edge level input field 371*c*. The height of the master profile shape MP at the edge ME (hereinafter referred to as an edge level ML) is thereby set.

In the case where there are a plurality of edges in the correction range, one edge ME is specified by operation of the edge measurement detail field 372. An edge direction pull-down menu 372*a*, a detection direction pull-down menu 372*b*, and a detection No. pull-down menu 372*c* are displayed in the edge measurement detail field 372. A user can select the edge direction from the edge direction pull-down menu 372*a*. The edge direction includes "rise" and "fall".

Furthermore, a user can select the detection direction from the detection direction pull-down menu 372*b*. The detection direction includes "+ direction" and "− direction". The "+ direction" is a direction, on the image display field 321, from the left to the right, and the "− direction" is a direction, on the image display field 321, from the right to the left. Furthermore, a user can select a detection number from the detection No. pull-down menu 372*c*.

In the example in FIG. 25, "fall" is selected as the edge direction, "+ direction" is selected as the detection direction, and "1st" is selected as the detection number. In this case, the part, of the master profile shape MP, which is the first rise along the direction from the left to the right in the correction range is detected as the edge ME. Also, the height, of the edge ME, specified in the edge level input field 371*c* is taken as the edge level ML. When the enter button 370*a* is operated, setting of the correction mode (X-correction mode) is ended. Also, when the end button 317 is operated, setting for the position correction process is ended.

In the case where the position correction process is set, the position correction process is performed by the measurement processing unit 231 in FIG. 2. In the position correction process, an edge PE of a profile shape PR corresponding to the edge ME of the master profile shape MP is detected in the correction range. Also, an edge level PL corresponding to the edge level ML of the edge ME is detected from the edge PE.

The master profile shape MP is moved in the X3 direction so as to make the position of the edge level ML in the X3 direction coincide with the position of the edge level PL in the X3 direction. Herein, the measurement range set for the master profile shape MP is also moved in the X3 direction together with the master profile shape MP. Accordingly, the master profile shape MP and the profile shape PR are overlapped with each other, and also the measurement range of the master profile shape MP is made coincident with the measurement range of the profile shape PR to be actually measured.

Note that, a plurality of correction ranges can be set for the master profile shape MP. Also, in the case where a plurality of measurement ranges are set for the master profile shape MP, the plurality of measurement ranges can be made to correspond to the plurality of correction ranges. In this case, at the time of the position correction process, each measurement range moves together with the part, of the master profile shape MP, of the corresponding correction range. Each measurement range of the master profile shape MP can be thereby made to coincide with the measurement range of the profile shape PR to be actually measured.

(c) Profile Masking Process

In the following, a mask to be set on the master profile shape MP will be referred to as a profile mask. In the case where an unnecessary part is included in the measurement range set for the master profile shape MP, the measurement result of the measurement method described above may be inappropriate. Accordingly, a desired profile masking process may be performed on the master profile shape MP, and measurement may be performed by removing an unnecessary part included in the measurement range.

Figure 26:
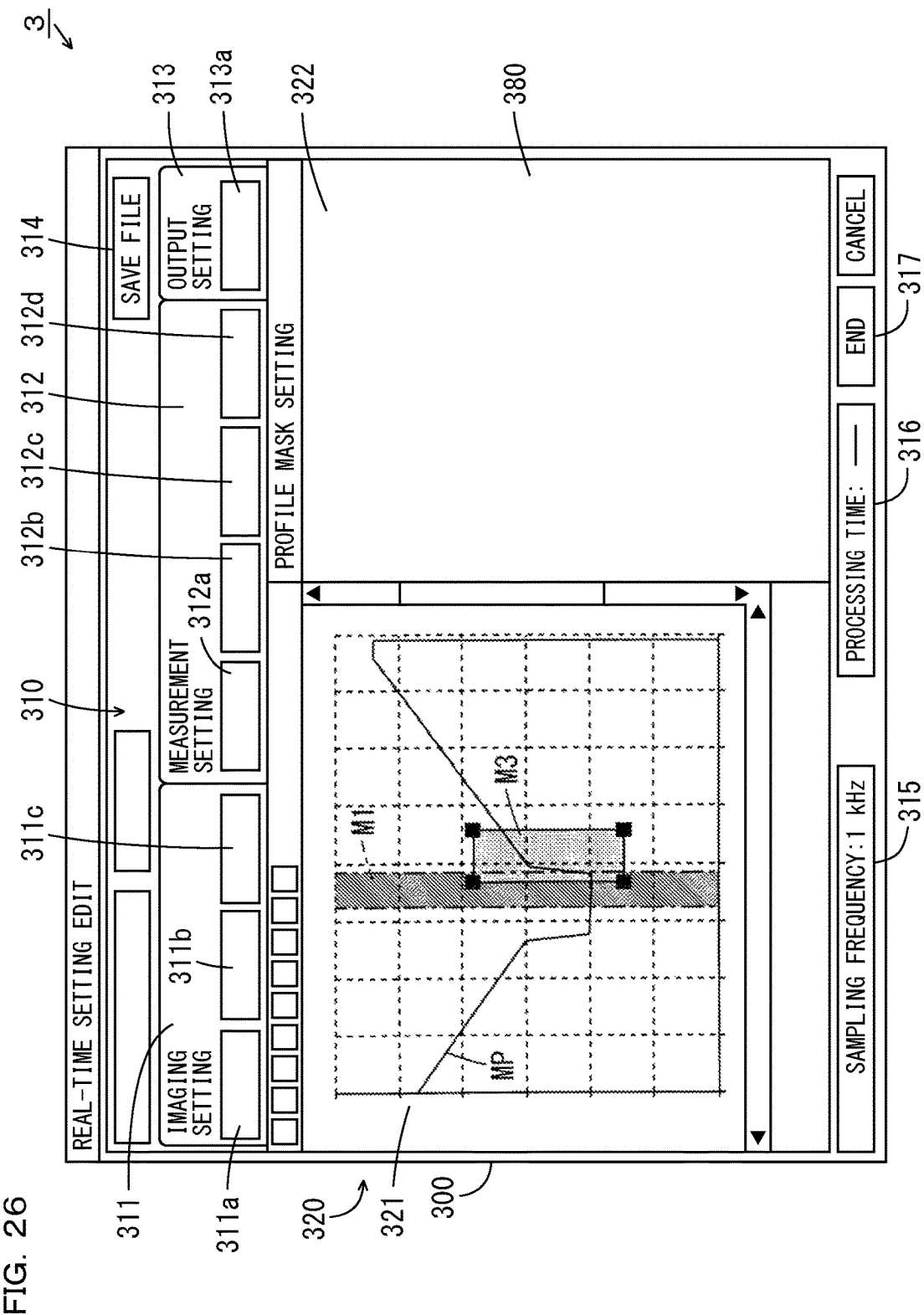
FIG. 26 is a diagram showing the settings edit screen when a profile mask button is operated.
Figure 27:
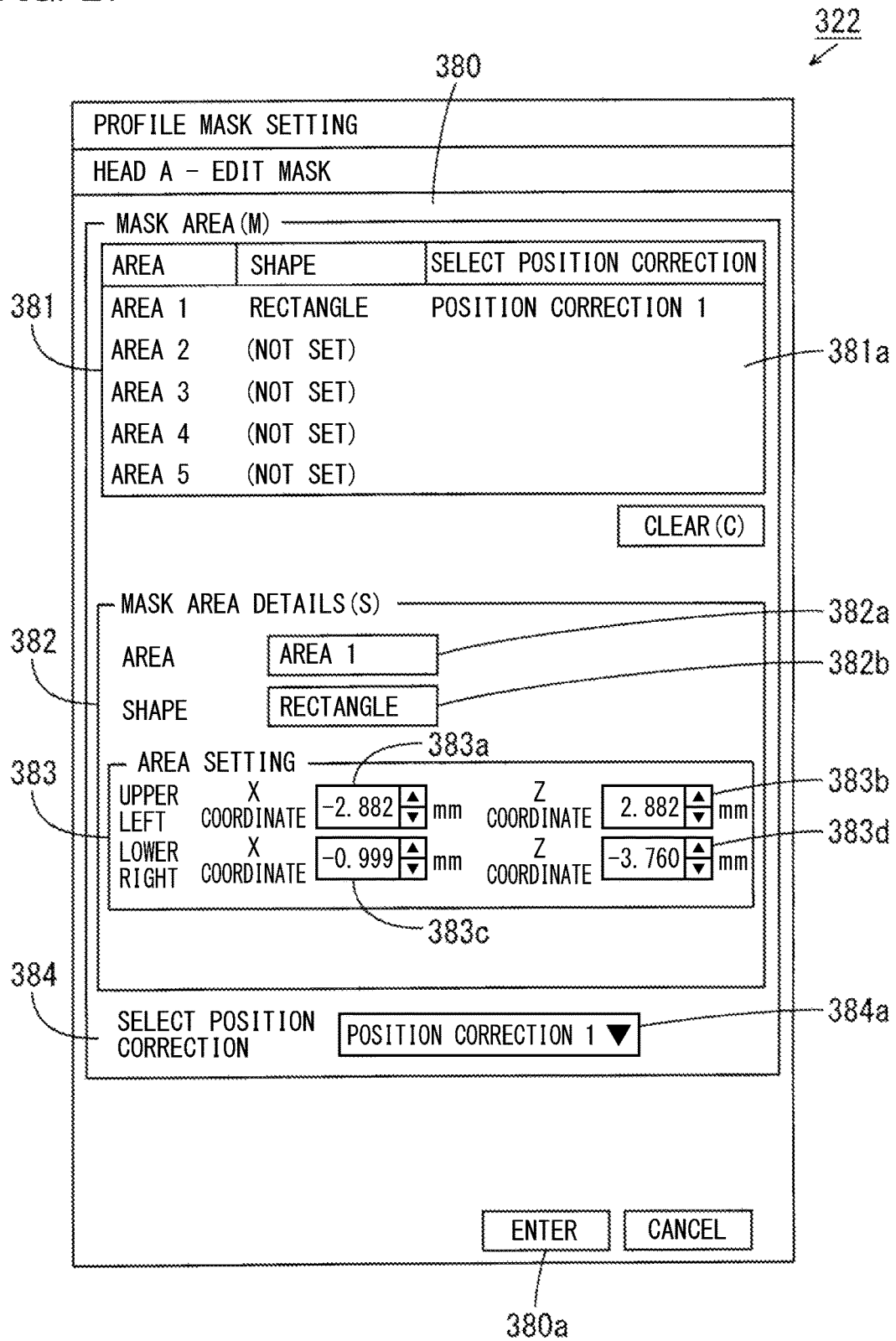
FIG. 27 is a diagram showing a profile mask setting field displayed in a setting input field in FIG. 26.

When the profile mask button 312*c* is operated after master profile data is registered in FIG. 19, a profile mask setting field for setting the profile masking process for the master profile shape MP is displayed in the setting input field 322. FIG. 26 is a diagram showing the settings edit screen 300 when the profile mask button 312*c* is operated. FIG. 27 is a diagram showing a profile mask setting field 380 to be displayed in the setting input field 322 in FIG. 26.

As shown in FIG. 26, a mask range display indicator M3 indicating the range where a profile mask is to be set (hereinafter referred to as a mask range) is displayed in the image display field 321. As shown in FIG. 27, a mask area field 381, a mask area detail field 382, an area setting field 383, a position correction selection field 384, and an enter button 380*a* are displayed in the profile mask setting field 380.

A mask area list 381*a* giving details of each profile mask is displayed in the mask area field 381. Details of a profile mask include the mask range, the shape, and the corresponding correction range. A user can select a desired profile mask to be set from a plurality of profile masks by operating the mask area list 381*a*.

A user can set the details of a profile mask selected in the mask area field 381, by operating the mask area detail field 382. Specifically, an area display field 382*a* and a shape display field 382*b* are displayed in the mask area detail field 382. The mask range and the shape of the profile mask selected in the mask area field 381 are displayed in the area display field 382*a* and the shape display field 382*b*, respectively. A user can set a rectangular shape, a circular shape, or any other shape as the shape of the profile mask by operating the shape display field 382*b*. In the example in FIG. 27, the shape of the profile mask is set to a rectangle.

A user can set the mask range by operating the area setting field 383. Specifically, in the case where the shape of the profile mask is a rectangle, an upper-left X-coordinate input field 383*a*, an upper-left Z-coordinate input field 383*b*, a lower-right X-coordinate input field 383*c*, and a lower-right Z-coordinate input field 383*d* are displayed in the area setting field 383. The X-coordinate and the Z-coordinate in the area setting field 383 refer to a position in the X3 direction and a position in the Z3 direction in FIG. 9. A user inputs numerical numbers in the upper-left X-coordinate input field 383*a*, the upper-left Z-coordinate input field 383*b*, the lower-right X-coordinate input field 383*c*, and the lower-right Z-coordinate input field 383*d*. The positions of four corners of the rectangular mask range are thereby set.

In this case, the position and the size of the mask range display indicator M3 are changed to indicate a mask range according to the numerical values input in the upper-left X-coordinate input field 383*a*, the upper-left Z-coordinate input field 383*b*, the lower-right X-coordinate input field 383*c*, and the lower-right Z-coordinate input field 383*d*. Alternatively, a user can set the positions of the four corners of the rectangular mask range by operating the position and the size of the mask range display indicator M3 displayed in the image display field 321. In this case, the numerical values in the upper-left X-coordinate input field 383*a*, the upper-left Z-coordinate input field 383*b*, the lower-right X-coordinate input field 383*c*, and the lower-right Z-coordinate input field 383*d* change according to the position and the size of the mask range display indicator M3.

Note that, in the case where the shape of the profile mask is another shape, other input fields are displayed in the area setting field 383, instead of the upper-left X-coordinate input field 383*a*, the upper-left Z-coordinate input field 383*b*, the lower-right X-coordinate input field 383*c*, and the lower-right Z-coordinate input field 383*d*. For example, in the case where the shape of the profile mask is circular, a center coordinate input field and a radius (diameter) input field for setting the center position and the radius (or the diameter) of the mask range are displayed.

A user can set the correction range to be associated with the profile mask selected in the mask area field 381, by operating the position correction selection field 384. Specifically, a position correction selection pull-down menu 384*a* is displayed in the position correction selection field 384. A user can select the correction range to be associated with the profile mask from the position correction selection pull-down menu 384*a*.

When the enter button 380*a* is operated, setting of the selected profile mask is ended. Also, when the end button 317 in FIG. 26 is operated, setting of the profile masking process is ended.

The master profile shape MP is displayed in the image display field 321 in FIG. 26. Also, a measurement range set for measurement of a flat part of the master profile shape MP is indicated in the image display field 321 by the measurement range display indicator M1. In the example in. FIG. 26, an edge part continuous with the flat part of the master profile shape MP is also included in the measurement range. Accordingly, the height of the flat part cannot be measured accurately.

Accordingly, as shown in FIG. 26, the mask range indicated by the mask range display indicator M3 is set in such a way that the edge part is included but almost no flat part is included. In this case, the measurement processing unit 231 in FIG. 2 calculates the height after removing the profile data of the part, of the master profile shape MP, included in the mask range from the profile data of the part, of the master profile shape MP, included in the measurement range. The height of the flat part of the master profile shape MP can be thereby accurately measured.

Furthermore, the mask range is associated with a correction range. Accordingly, the mask range moves together with the part, of the master profile shape MP, in the corresponding correction range. Therefore, even in the case where the position of the master profile shape MP and the position of the profile shape to be actually measured do not coincide with each other, measurement can be performed by removing the unnecessary part included in the measurement range of the profile shape.

(3) Change of Measurement Method (a) Range Image

After the measurement setting described above is performed, measurement of a plurality of workpieces W of the same type is sequentially performed. Here, the measurement method is sometimes determined to be not appropriate during measurement of a workpiece W or after the measurement is ended. In such a case, a conventional optical displacement measurement system is required to reproduce the situation at the time of the measurement, perform measurement setting again, and then perform measurement of the workpiece W again, and re-check the measurement result. However, there is no guarantee that the situation at the time of measurement can be accurately reproduced. Even if the situation at the time of measurement is accurately reproduced, the measurement method is required to be changed on a trial-and-error basis and measurement of the workpiece W is required to be repeated to optimize the measurement method. This increases the burden on the user.

Accordingly, the extraction unit 935 (FIG. 2) extracts desired profile data from range image data generated by the range image generation unit 232 (FIG. 2). The simulation unit 936 (FIG. 2) changes the measurement method of the profile data extracted by the extraction unit 935, and performs simulation. In the following, simulation of the measurement process will be described.

Figure 28:
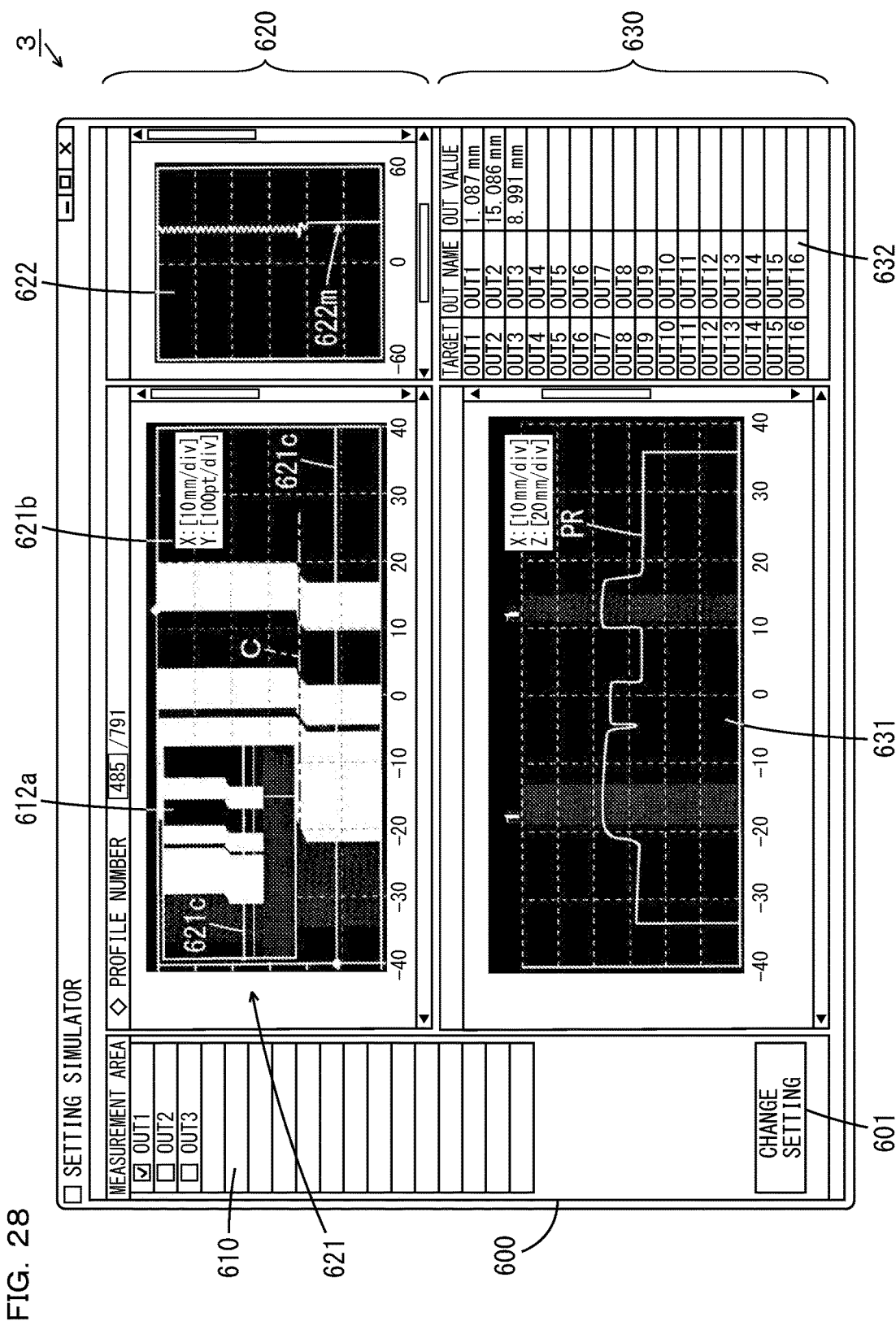
FIG. 28 is a diagram showing a settings simulator screen displayed by the display unit.

FIG. 28 is a diagram showing a settings simulator screen displayed by the display unit 3. A user can cause the display unit 3 to display a settings simulator screen 600 in FIG. 28 by performing a predetermined operation on the display unit 3. As shown in FIG. 28, a measurement area display region 610, a measurement result display region 620, and a selected result display region 630 are displayed in the settings simulator screen 600. Also, a setting change button 601 is displayed in the settings simulator screen 600.

A list showing a plurality of measurement ranges is displayed in the measurement area display region 610. The measurement result display region 620 and the selected result display region 630 are arranged next to the measurement area display region 610 while being vertically next to each other. A range image display field 621 and a trend graph display field 622 are arranged horizontally next to each other in the measurement result display region 620. The range image display field 621 includes an entire image display field 621*a* and a partial image display field 621*b*. The entire image display field 621*a* is arranged within the partial image display field 621*b*.

A range image for a measurement range selected from the measurement area display region 610 is displayed in the entire image display field 621*a*. A part of the range image in the entire image display field 621*a* is enlarged and displayed in the partial image display field 621*b*. In the example in FIG. 28, the horizontal axis of the range image indicates the range (width) of a workpiece W in the X1 direction (FIG. 3), and the vertical axis of the range image indicates the profile number. Shading in black and white of the range image indicates the range (height) of the workpiece W in the Z1 direction (FIG. 3).

A trend graph is displayed in the trend graph display field 622. The trend graph displays, by a waveform extending in a vertical direction, a change over time of a measurement result for the range image in the partial image display field 621b (display in a trend). In this example, the measurement result is the difference in the heights (step) of two measurement ranges that are set. A user can easily know whether or not the measurement method was appropriate by observing the trend graph displayed in the trend graph display field 622.

A cursor 621c that extends in the horizontal direction and that can be moved in the vertical direction is displayed in the entire image display field 621a and the partial image display field 621b. A user can specify, on the range image, profile data corresponding to a desired measurement result by operating the operation unit 910 in FIG. 2 and moving the cursor 621c in the vertical direction. When the setting change button 601 is operated in a state where profile data is specified on the range image, a settings change screen 300A in FIG. 29, described later, is displayed by the display unit 3.

Also, a user can search for a measurement result that satisfies a specific condition (hereinafter referred to as a search condition) from the trend graph. The search condition is, for example, that a measurement result is within a certain allowable range, that a measurement result exceeds a certain allowable range, that a measurement result is within a tolerance range, or that a measurement result exceeds a tolerance range. A measurement result whose measurement method should be changed can be thereby easily retrieved.

When a search for a measurement result is performed, a marker 622m is displayed at a part, of the trend graph, satisfying the search condition, and the part, of the trend graph, satisfying the search condition is thereby displayed in a distinguishable manner. Also, the cursor 621c in the range image display field 621 moves to a position on the range image corresponding to the position of the marker 622m in the trend graph display field 622. Accordingly, a user can easily identify and specify, on the range image or the trend graph, profile data corresponding to a desired measurement result whose measurement method should be changed.

A profile shape display field 631 and a selected result display field 632 are displayed horizontally next to each other in the selected result display region 630. A profile shape PR which is based on the profile data specified on the range image in the range image display field 621 or on the trend graph in the trend graph display field 622 is displayed in the profile shape display field 631. A user can visually check whether or not the measurement method should be changed, by observing the profile shape PR displayed in the profile shape display field 631.

A list showing the measurement results for a measurement range of the profile shape PR displayed in the profile shape display field 631 is displayed in the selected result display field 632. A statistical value of a plurality of measurement results can also be displayed in the selected result display field 632.

(b) Measurement Process Simulation

It is assumed, as in the example in FIG. 20, that a measurement range is set, in measurement setting, at a flat part of the master profile shape MP in order to measure the height of the flat part of a workpiece W. However, if there is a defect in the set measurement method, such as a case where the measurement range is too great, an unnecessary edge part continuous with the flat part of the profile shape PR may be included in the measurement range depending on the workpiece W.

In such a case, as shown by the part below a dot-dash line C in the partial image display field 621b, a measurement result different from the initial part (above the dot-dash line C) is obtained. Accordingly, the measurement method is preferably changed in the following manner for the profile data corresponding to the measurement result for below the dot-dash line C in the partial image display field 621b.

Figure 29:
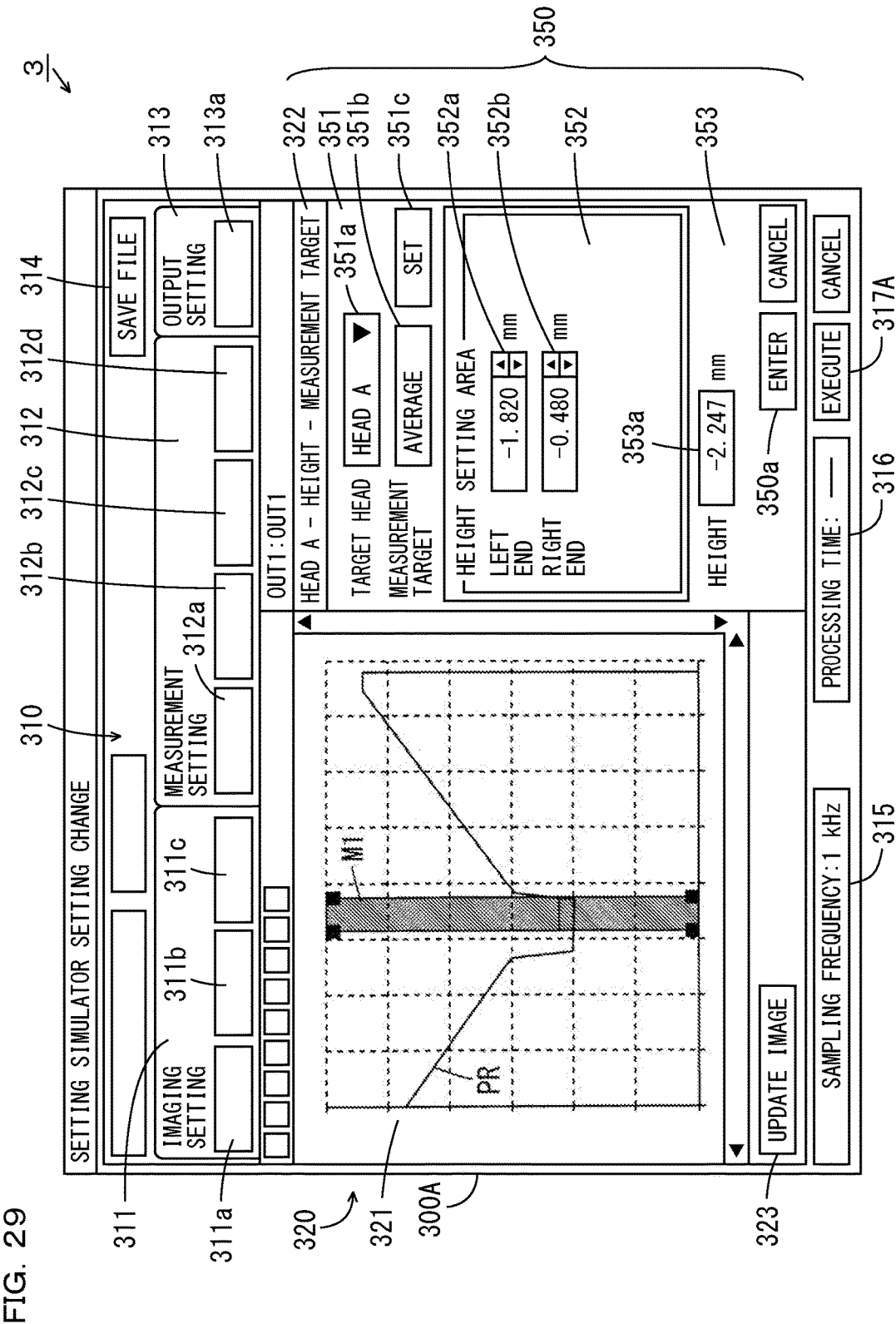
FIG. 29 is a diagram showing a settings change screen displayed by the display unit.

FIG. 29 is a settings change screen displayed by the display unit 3. When the setting change button 601 is operated in a state where profile data is specified on the range image in FIG. 28, the settings change screen 300A in FIG. 29 is displayed by the display unit 3.

As shown in FIG. 29, the display contents on the settings change screen 300A are the same as the display contents on the settings edit screen 300 except that an execution button 317A is displayed instead of the end button 317 in FIG. 12, FIG. 20, and the like. Accordingly, the same reference signs are assigned to the display contents on the settings change screen 300A as to the display contents on the settings edit screen 300. In the example in FIG. 29, an OUT measurement setting button 312d is operated. Accordingly, a measurement target display field 350 is displayed in a setting input field 322.

The extraction unit 935 in FIG. 2 extracts the profile data specified on the range image in FIG. 28. A profile shape PR that is based on the profile data extracted by the extraction unit 935 is displayed in the image display field 321 in FIG. 29. When the measurement setting field 312 or the profile button 311c in the imaging setting field 311 is operated, the simulation unit 936 in FIG. 2 changes the measurement method of the profile data extracted by the extraction unit 935.

Note that, states of imaging parameters cannot be changed on the settings change screen 300A. That is, the trigger setting button 311a and the imaging setting button 311b cannot be operated. Accordingly, the trigger setting button 311a and the imaging setting button 311b are displayed in gray-out.

In the example in FIG. 29, the measurement range is too great, and an unnecessary edge part that is continuous with a flat part of the profile shape PR is included in the measurement range. In such a case, the measurement range input field 352 may be operated to change the setting of the measurement range so as to not include the unnecessary edge part. Alternatively, similar to the example in FIG. 26, a mask range including the edge part but including almost no flat part can be additionally set.

When the execution button 317A is operated after the measurement method is changed in the above manner, the simulation unit 936 simulates the measurement process based on the measurement method after change. Accordingly, a measurement result equivalent to the measurement result of a case where measurement setting is appropriately performed can be obtained. A range image updated based on the measurement result obtained by the simulation is displayed in the range image display field 621 in FIG. 28. A user can visually check whether or not the measurement result is appropriate by observing the updated range image.

Figure 30:
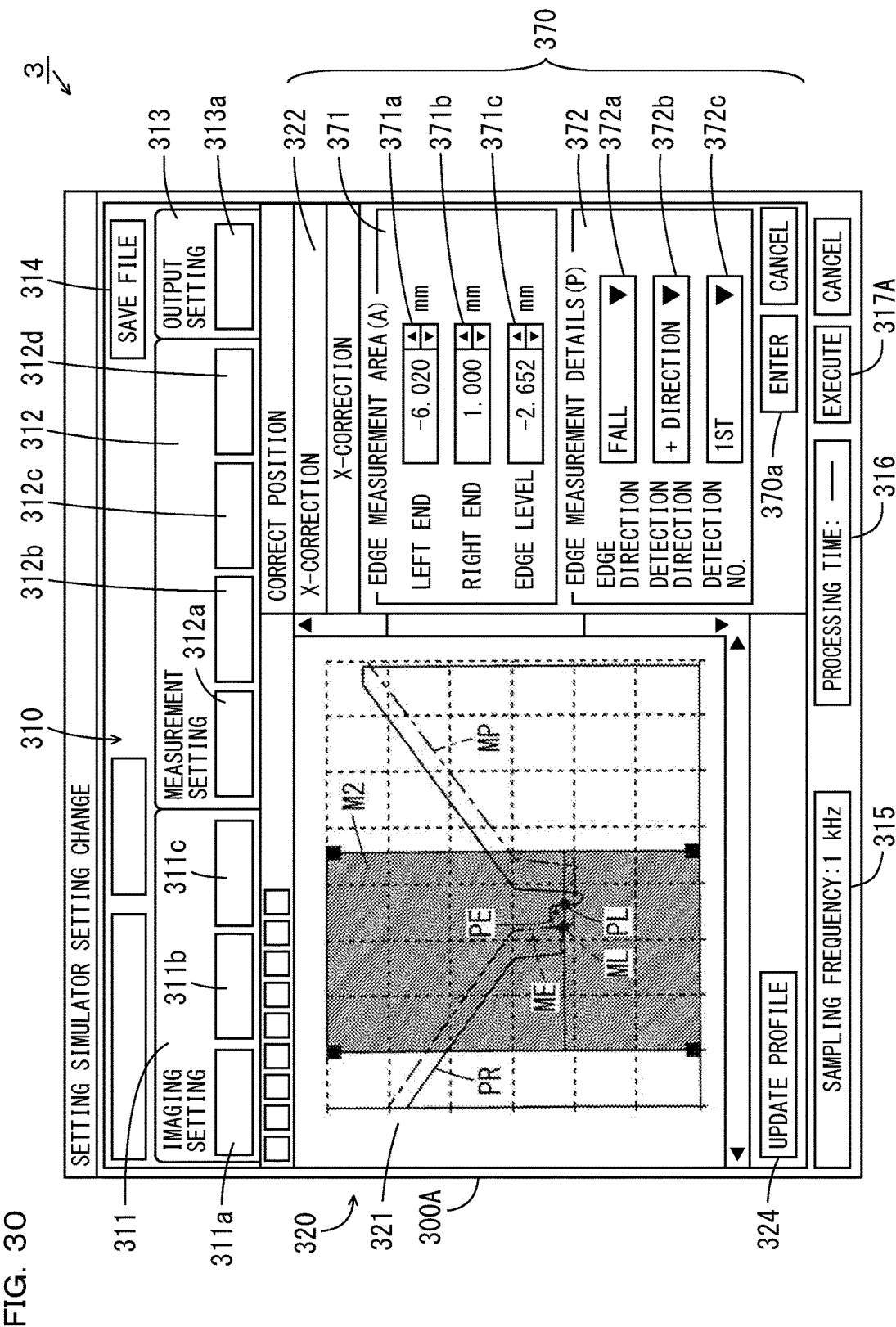
FIG. 30 is a diagram for describing another example of change of a measurement method.
Figure 31:
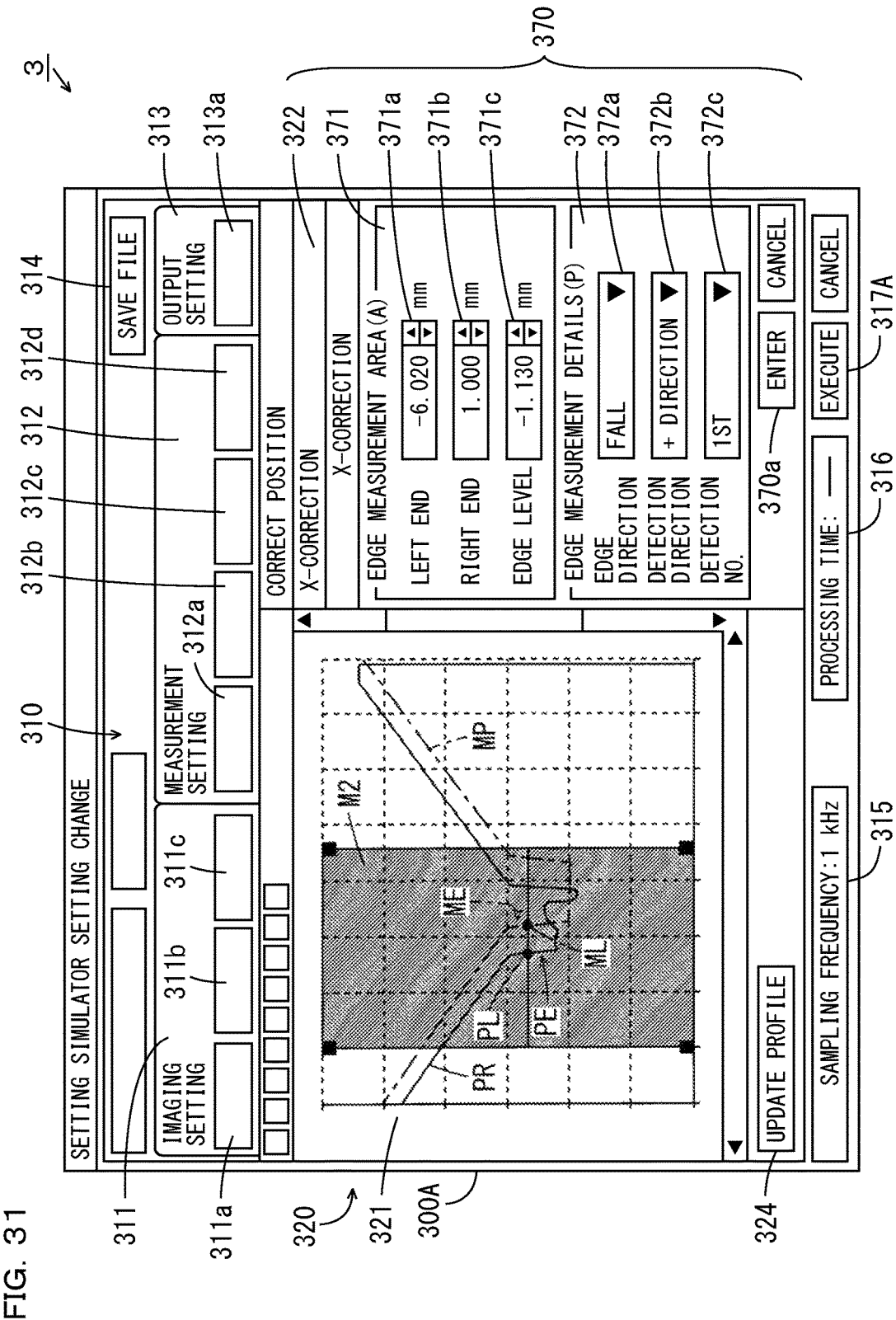
FIG. 31 is a diagram for describing another example of change of a measurement method.

FIGS. 30 and 31 are diagrams for describing another example of change of the measurement method. A settings change screen 300A in FIGS. 30 and 31 is the same as the settings edit screen 300 in FIG. 25 except that an execution button 317A is displayed instead of the end button 317. In the case where a distortion occurs at a part, of a profile shape PR, corresponding to the periphery of an edge ME of a master profile shape MP, as in the example in FIG. 30, a part different from a desired part is possibly detected as an edge PE of the profile shape PR. In this case, an appropriate position correction process is not performed in the measurement process, and an appropriate measurement result is not obtained.

Accordingly, the setting for the edge level ML of the master profile shape MP can be changed by simulation. In the example in FIGS. 30 and 31, there is no great distortion at the part, of the profile shape PR, corresponding to the relatively upper part of the edge ME of the master profile shape MP. Therefore, the edge level ML of the master profile shape MP is set to be higher than in the example in FIG. 30. Accordingly, the edge PE of the profile shape PR can be appropriately detected as in the example in FIG. 31. As a result, an appropriate position correction process can be performed in the simulation of the measurement process.

As further another example of change of the measurement method, settings for the master profile data can be changed by operation of the settings change screen 300A in FIGS. 29 to 31. Also, addition or change of a filtering process, a measurement target, or a measurement mode can be performed.

The measurement processing unit 231 in FIG. 2 can determine, for each range image, whether or not the measurement result is satisfactory, based on an evaluation value such as an allowance or a tolerance regarding the measurement result. A user can select a range image whose measurement method should be changed, by checking the determination results for the range images.

Figure 32:
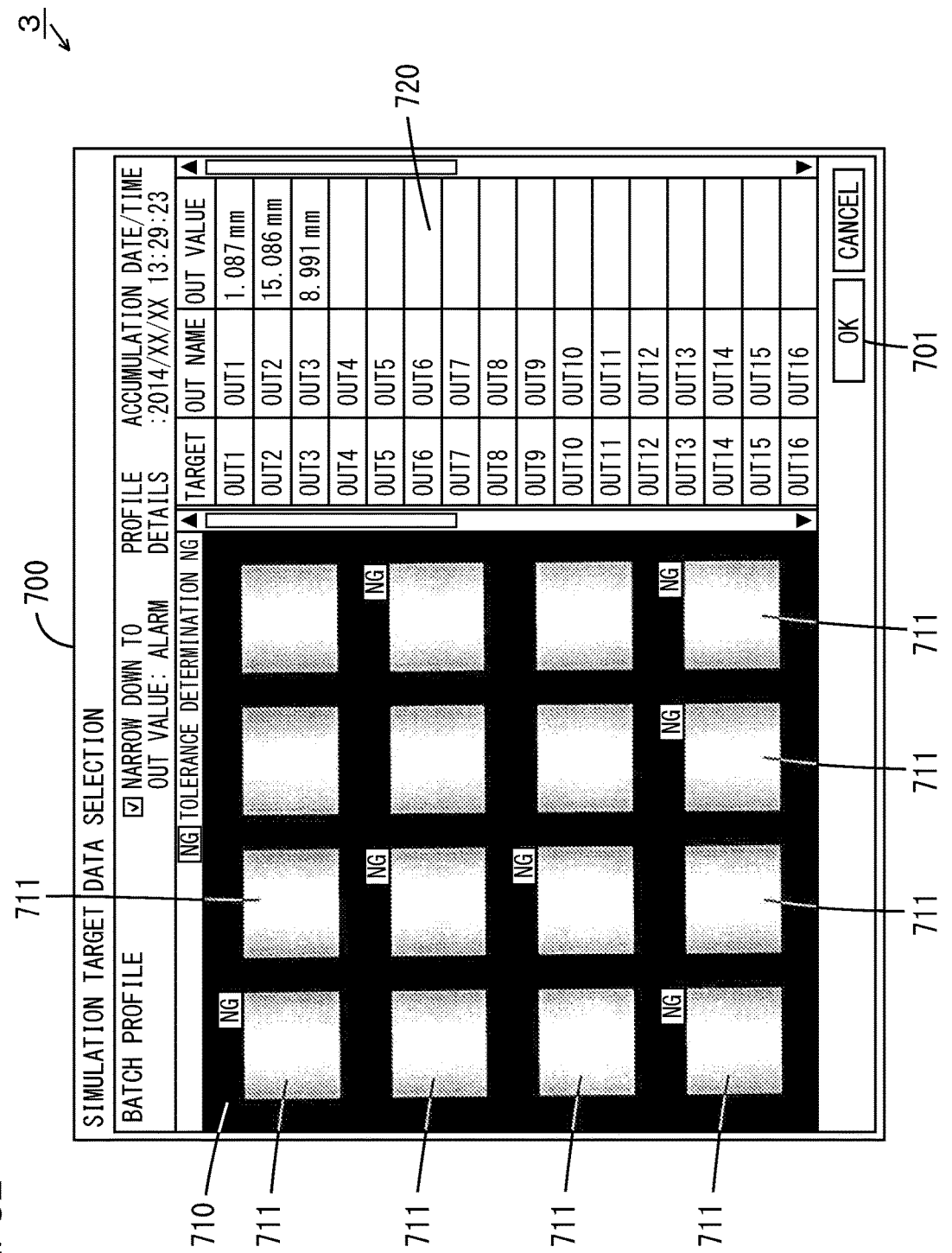
FIG. 32 is a diagram showing a simulation target data selection screen displayed by the display unit.

FIG. 32 is a diagram showing a simulation target data selection screen displayed by the display unit 3. A user can cause the display unit 3 to display a simulation target data selection screen 700 in FIG. 32 by performing a predetermined operation on the display unit 3. As shown in FIG. 32, a range image display region 710 and a selected result display region 720 are displayed horizontally next to each other in the simulation target data selection screen 700. Also, an OK button 701 is displayed in the simulation target data selection screen 700.

A plurality of range image display fields 711 are displayed in the range image display region 710. A range image is displayed in each range image display field 711. Also, an indicator indicating that a determination result is not satisfactory (in this example, an "NG" mark) is displayed in the range image display field 711 displaying a range image whose measurement result is not satisfactory.

When one of the range image display fields 711 is operated, the range image corresponding to the operated range image display field 711 is selected. A list of measurement results of range images selected from the range image display region 710 is displayed in the selected result display region 720. A user can determine the range image whose measurement method is to be changed in the above manner by operating the OK button 701 while operating one of the range image display fields 711.

(4) Measurement Simulation Process

Figure 33:
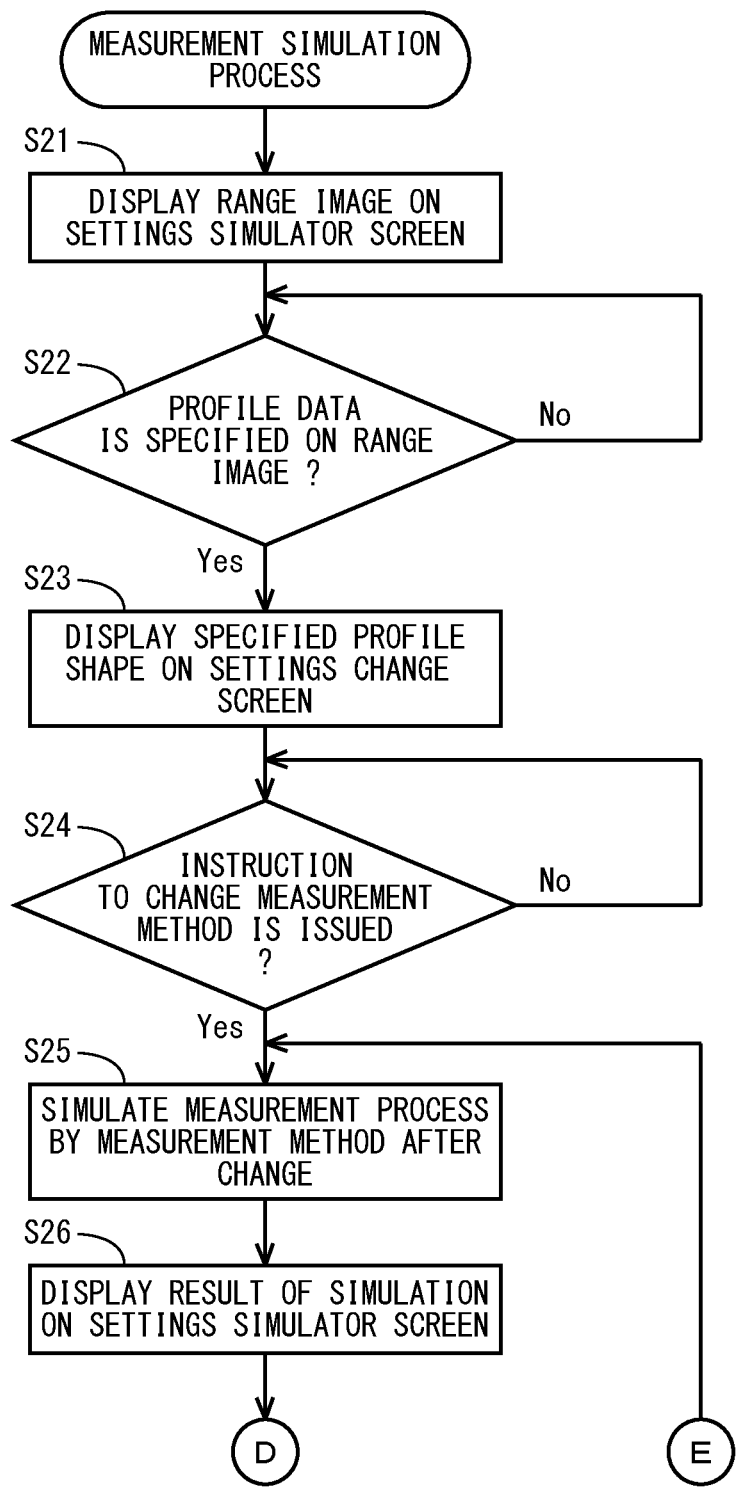
FIG. 33 is a flow chart showing a measurement simulation process.
Figure 34:
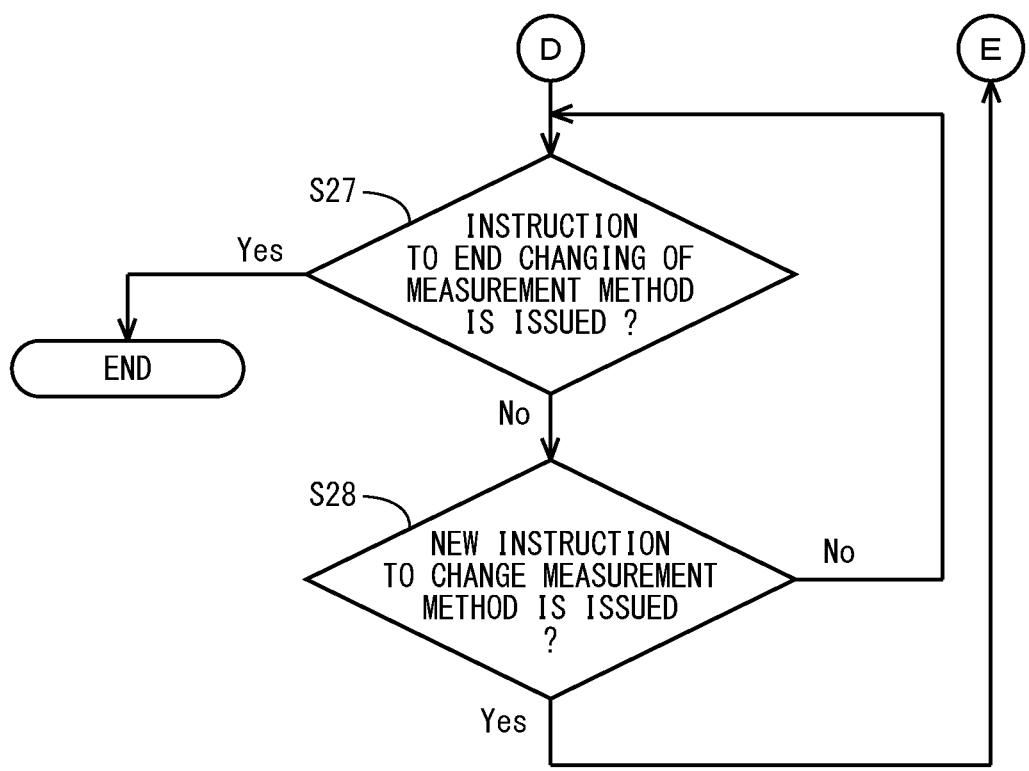
FIG. 34 is a flow chart showing the measurement simulation process.

FIGS. 33 and 34 are flow charts showing a measurement simulation process. In the following, a measurement simulation process by the PC 900 will be described with reference to FIGS. 1, 2, 33, and 34.

First, the PC 900 displays a desired range image in the range image display field 621 in the settings simulator screen 600 in FIG. 28 (step S21). By performing predetermined operations by using the operation unit 910, a user can display the settings simulator screen 600 on the display unit 3, and can select the range image to be displayed in the range image display field 621. Alternatively, the user can select a desired range image from the simulation target data selection screen 700 in FIG. 32.

Next, the PC 900 determines whether or not profile data is specified on the range image (step S22). The user can specify profile data on the range image by moving the cursor 621c in the range image display field 621.

When it is determined in step S22 that profile data is not specified, the PC 900 stands by until profile data is specified. When it is determined in step S22 that profile data is specified, the PC 900 causes a profile shape PR corresponding to the specified profile data to be displayed in the image display field 321 in the settings change screen 300A in FIGS. 29 to 31 (step S23).

Next, the PC 900 determines whether or not an instruction to change the measurement method is issued (step S24). The user can issue an instruction to change the measurement method, by operating the setting input field 322 in the settings change screen 300A.

When it is determined in step S24 that an instruction to change the measurement method is not issued, the PC 900 stands by until an instruction to change the measurement method is issued. When it is determined in step S24 that an instruction to change the measurement method is issued, the PC 900 simulates the measurement process by the measurement method after change (step S25). Also, the display processing unit 240 displays the result of the simulation in the settings simulator screen 600 (step S26).

Then, the PC 900 determines whether or not an instruction to end changing of the measurement method is issued (step S27). The user can issue an instruction to end changing of the measurement method, by operating an end button, not shown, in the settings simulator screen 600. When it is determined in step S27 that an instruction to end changing of the measurement method is not issued, the PC 900 determines whether or not a new instruction to change the measurement method is issued (step S28). The user can newly issue an instruction to change the measurement method, by operating the setting change button 601 in the settings simulator screen 600.

When it is determined in step S28 that a new instruction to change the measurement method is issued, the PC 900 returns to the process in step S25. When it is determined in step S28 that a new instruction to change the measurement method is not issued, the PC 900 returns to the process in step S27. The processes from step S25 to S28 are repeated until an instruction to end changing of the measurement method is issued. When it is determined in step S27 that an instruction to end changing of the measurement method is issued, the PC 900 ends the measurement simulation process.

(5) Effects

According to the optical displacement measurement system 1 of the present embodiment, a measurement method of a measurement result regarding a profile shape is set in the measurement processing unit 231. Profile data indicating the profile shape is generated by the profile generation unit 222 based on the captured image data generated by the light receiving unit 120. A measurement result is calculated by the measurement processing unit 231 based on the generated profile data.

A plurality of pieces of profile data are generated by the profile generation unit 222 by a plurality of times of detection of a profile shape. A range image showing the change over time of the plurality of pieces of generated profile data is generated by the range image generation unit 232. The generated range image is displayed in the range image display field 621 in the settings simulator screen 600. A user can visually check whether or not the set measurement method is appropriate by observing the range image displayed in the range image display field 621.

In the case where the set measurement method is not appropriate, any of the plurality of pieces of profile data can be selected on the range image displayed in the range image display field 621. A profile shape is displayed in the image display field 321 in the settings change screen 300A based on the selected profile data. Here, the user can change the set measurement method, by operating the setting input field 322 in the settings change screen 300A. When the measurement method is changed, measurement results for the plurality of pieces of profile data are calculated by the simulation unit 936 by the measurement method after change, based on the plurality of pieces of profile data generated in the plurality of times of detection of the profile shape. Accordingly, the measurement method can be changed in an ex-post manner, and a plurality of measurement results by the measurement method after change can be acquired.

<4> Other Embodiments (1) According to imaging setting of the embodiment described above, a user selects an imaging parameter whose state is to be changed, and specifies a plurality of state to be changed, but the present invention is not limited thereto. In the case where a plurality of states to be changed are already set for each imaging parameter, the user does not have to specify a plurality of states to be changed for the selected imaging parameter.

Also, in the case where an imaging parameter whose state is to be changed is set in advance, a user does not have to select an imaging parameter whose state is to be changed. Accordingly, an imaging parameter which is retrieved frequently, such as the exposure time of the photodetector 121, may be set in advance as an imaging parameter whose state is to be changed. An optimal imaging condition may thus be set in a short time.

(2) In the imaging setting of the embodiment described above, an indicator corresponding to the degree of reliability is preferably displayed in the imaging condition optimization screen 400, as shown in FIG. 16, but the present invention is not limited thereto. An indicator corresponding to the degree of reliability does not have to be displayed in the imaging condition optimization screen 400.

Furthermore, a plurality of indicators and a plurality of profile shapes are preferably displayed in the descending order or in the ascending order of the degree of reliability, but the present invention is not limited thereto. A plurality of indicators and a plurality of profile shapes can be displayed in the order of acquisition, or in any other order.

(3) In the imaging setting of the embodiment described above, the custom search screen 500 displays check boxes for selection of the light sensitivity, the exposure time, the peak detection sensitivity, the method for selecting a peak position, the peak width filter, and the imaging mode, but the present invention is not limited thereto. The custom search screen 500 may display a check box for selecting an arbitrary imaging parameter.

(4) In the imaging setting of the embodiment described above, a score display field 411c for displaying an indicator corresponding to the degree of reliability calculated by the reliability calculation unit 934 is provided on the imaging condition optimization screen 400, but the present invention is not limited thereto. In the case where the PC 900 selects an imaging condition with the highest degree of reliability as the most preferable imaging condition, a user does not have to visually check the indicator, and thus the score display field 411c does not have to be provided in the imaging condition optimization screen 400.

(5) In the measurement setting of the embodiment described above, the range image generation unit 232 generates range image data for displaying relationships between identifiers of a plurality of pieces of profile data and a plurality of measurement results, but the present invention is not limited thereto. The range image generation unit 232 may generate image data for displaying other images for showing change over time of a plurality of pieces of profile data.

(6) In the correction process for measurement setting of the embodiment described above, a master profile shape MP is moved to coincide with another profile shape PR, and the relative positions of the measurement range and the mask range with respect to the profile shape PR are thereby corrected, but the present invention is not limited thereto. The relative positions of the measurement range and the mask range with respect to the profile shape PR may be corrected by the profile shape PR being moved to coincide with the master profile shape MP.

<5> Correspondence Between Structural Elements in Claims and Units in Embodiment In the following, an example correspondence between structural elements in claims and units in the embodiment will be described, but the present invention is not limited to the example below.

In the embodiment described above, the workpiece W is an example of a measurement target, the light projection unit 110 is an example of a light projection unit, the light receiving unit 120 is an example of a light receiving unit, and the optical displacement measurement system 1 is an example of an optical displacement measurement system. The imaging setting unit 931 is an example of an imaging setting unit, the imaging control unit 210 is an example of an imaging control unit, the profile generation unit 222 is an example of a profile generation unit, and the reliability calculation unit 934 is an example of a reliability calculation unit. The operation unit 910 is an example of first and second operation units, the result display region 410 and the selected image display region 420 are examples of first and second display units, respectively, and the processing device 200 and the PC 900 are examples of a processing device.

As the structural elements in the claims, various other structural elements having the configuration or function described in the claims may be used in addition to the structural elements described in the embodiment described above.

The present invention can be effectively used in optimization of an imaging condition of an optical displacement measurement system for detecting displacement of a measurement target.

What is claimed is:
1. An optical displacement measurement system of an optical cutting method for measuring a profile shape of a measurement target by a triangulation method, the optical displacement measurement system comprising:
 a light projection unit for radiating light on the measurement target along one direction;
 a light receiving unit for receiving reflected light from the measurement target and for generating captured image data indicating an image of the measurement target based on an amount of received light;

an imaging setting unit configured to set states of a plurality of imaging parameters for setting an imaging condition;

an imaging control unit for controlling the light projection unit and/or the light receiving unit to generate a plurality of pieces of captured image data corresponding respectively to a plurality of imaging conditions by changing a state of any of the plurality of imaging parameters set by the imaging setting unit;

a profile generation unit for generating profile data indicating a profile shape based on each piece of generated captured image data; and a reliability calculation unit for calculating, based on each piece of generated profile data or captured image data corresponding to the profile data, a degree of reliability of a profile shape indicated by the profile data.

2. The optical displacement measurement system according to claim 1, wherein the imaging setting unit changes a state of one or more imaging parameters selected as an imaging parameter to be changed, among the plurality of imaging parameters.

3. The optical displacement measurement system according to claim 2, wherein one or more imaging parameters to be changed, among the plurality of imaging parameters, are set as recommendations in the imaging setting unit, and a plurality of states to be changed of the one or more imaging parameters to be changed that are set as recommendations are set as recommendations in the imaging setting unit, and the optical displacement measurement system further comprises a first operation unit to be operated by a user to change the one or more imaging parameters to be changed that are set as recommendations or the plurality of states to be changed that are set as recommendations.

4. The optical displacement measurement system according to claim 3, wherein the first operation unit is configured to be able to specify one or more imaging parameters, and the imaging setting unit selects one or more imaging parameters as the imaging parameter to be changed, based on specification by the user by operation of the first operation unit.

5. The optical displacement measurement system according to claim 4, wherein the first operation unit is configured to be able to specify a plurality of states of each of the selected imaging parameters, and the imaging setting unit changes the states of each of the selected imaging parameters to a plurality of states specified by operation of the first operation unit.

6. The optical displacement measurement system according to claim 3, wherein the plurality of imaging parameters include a first imaging parameter and a second imaging parameter that is dependent on the first imaging parameter, the first operation unit is configured to be able to set a state of the first imaging parameter, and the imaging setting unit changes a state of the second imaging parameter within a range where the state of the first imaging parameter set by the first operation unit is maintained.

7. The optical displacement measurement system according to claim 6, wherein the imaging control unit operates in synchronization with a periodic reference signal, the first imaging parameter is a period of the reference signal, and the second imaging parameter is an exposure time of the light receiving unit.

8. The optical displacement measurement system according to claim 1, wherein the imaging setting unit determines an imaging condition corresponding to a profile shape with a highest degree of reliability among a plurality of degrees of reliability calculated by the reliability calculation unit as an imaging condition for the light projection unit and the light receiving unit.

9. The optical displacement measurement system according to claim 1, further comprising:

a first display unit for displaying, based on a plurality of pieces of profile data generated by the profile generation unit, a plurality of profile shapes according, respectively, to a plurality of imaging conditions; and a second operation unit to be operated by a user to specify any of the plurality of profile shapes displayed by the first display unit, wherein the imaging setting unit determines an imaging condition corresponding to the profile shape specified by operation of the second operation unit as an imaging condition for the light projection unit and the light receiving unit.

10. The optical displacement measurement system according to claim 9, wherein the first display unit displays an indicator indicating the degree of reliability calculated by the reliability calculation unit, together with a corresponding profile shape.

11. The optical displacement measurement system according to claim 10, wherein the first display unit displays, in descending order or ascending order of degrees of reliability, a plurality of indicators indicating a plurality of degrees of reliability calculated by the reliability calculation unit and a plurality of profile shapes.

12. The optical displacement measurement system according to claim 8, wherein the imaging control unit controls the light projection unit and the light receiving unit so as to perform generation of captured image data according to a determined imaging condition a plurality of times, the profile generation unit sequentially generates profile data based on the captured image data obtained by generation of a plurality of times by the light receiving unit, and the optical displacement measurement system further comprises a second display unit for displaying, while sequentially updating, a profile shape based on a plurality of pieces of profile data sequentially generated by the profile generation unit.

13. An imaging condition optimization method of an optical displacement measurement system of an optical cutting method for measuring a profile shape of a measurement target by a triangulation method, the optical displacement measurement system including a light projection unit for radiating light on the measurement target along one direction and a light receiving unit for receiving reflected light from the measurement target and for generating captured image data indicating an image of the measurement target based on an amount of received light, the imaging condition optimization method comprising the steps of:

setting states of a plurality of imaging parameters for setting an imaging condition;

controlling the light projection unit and/or the light receiving unit to generate a plurality of pieces of captured image data corresponding respectively to a plurality of imaging conditions by changing a set state of any of the plurality of imaging parameters;

generating profile data indicating a profile shape based on each piece of generated captured image data; and calculating, based on each piece of generated profile data or captured image data corresponding to the profile data, a degree of reliability of a profile shape indicated by the profile data.

14. A non-transitory storage medium comprising instructions which when executed causes a processing device to optimize an imaging condition of an optical displacement measurement system of an optical cutting method for measuring a profile shape of a measurement target by a triangulation method, the optical displacement measurement system including a light projection unit for radiating light on the measurement target along one direction and a light receiving unit for receiving reflected light from the measurement target and for generating captured image data indicating an image of the measurement target based on an amount of received light, the non-transitory storage medium causing the processing device to execute the processes of:

setting states of a plurality of imaging parameters for setting an imaging condition;

controlling the light projection unit and/or the light receiving unit to generate a plurality of pieces of captured image data corresponding respectively to a plurality of imaging conditions by changing a set state of any of the plurality of imaging parameters;

generating profile data indicating a profile shape based on each piece of generated captured image data; and calculating, based on each piece of generated profile data or captured image data corresponding to the profile data, a degree of reliability of a profile shape indicated by the profile data.

* * * * *